US012003673B2

(12) United States Patent
Dickins et al.

(10) Patent No.: US 12,003,673 B2
(45) Date of Patent: Jun. 4, 2024

(54) ACOUSTIC ECHO CANCELLATION CONTROL FOR DISTRIBUTED AUDIO DEVICES

(71) Applicants: Dolby Laboratories Licensing Corporation, San Francisco, CA (US); DOLBY INTERNATIONAL AB, Amsterdam Zuidoost (NL)

(72) Inventors: Glenn N. Dickins, Sydney (AU); Christopher Graham Hines, Sydney (AU); David Gunawan, Sydney (AU); Richard J. Cartwright, Killara (AU); Alan J. Seefeldt, Alameda, CA (US); Daniel Arteaga, Barcelona (ES); Mark R. P. Thomas, Walnut Creek, CA (US); Joshua B. Lando, Mill Valley, CA (US)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 177 days.

(21) Appl. No.: 17/628,732

(22) PCT Filed: Jul. 29, 2020

(86) PCT No.: PCT/US2020/043958
§ 371 (c)(1),
(2) Date: Jan. 20, 2022

(87) PCT Pub. No.: WO2021/021857
PCT Pub. Date: Feb. 4, 2021

(65) Prior Publication Data
US 2023/0319190 A1    Oct. 5, 2023

Related U.S. Application Data

(60) Provisional application No. 62/705,897, filed on Jul. 21, 2020, provisional application No. 62/705,410, (Continued)

(30) Foreign Application Priority Data

Jul. 30, 2019  (ES) .............................. ES201930702
Nov. 29, 2019  (EP) ..................................... 19212391

(51) Int. Cl.
*H04M 9/08*    (2006.01)
*G10L 15/22*    (2006.01)

(52) U.S. Cl.
CPC ............. *H04M 9/082* (2013.01); *G10L 15/22* (2013.01); *G10L 2015/223* (2013.01)

(58) Field of Classification Search
CPC ..... H04M 9/082; H04M 1/6033; G10L 15/22; G10L 2015/223; G10L 21/034;
(Continued)

(56) References Cited

U.S. PATENT DOCUMENTS 9,008,686 B2    4/2015  Hannuksela
9,237,225 B2 *  1/2016  Garcia ................. H04M 3/002
(Continued)

FOREIGN PATENT DOCUMENTS

EP    1983799 B1    7/2010
EP    2874411 A1 *  5/2015  ............. H04R 1/403
(Continued)

OTHER PUBLICATIONS

Choi, H. et al: "Subband Adaptive Filters with Pre-whitening Scheme for Acoustic Echo Cancellation" 12th European Conference on Computer Vision, ECCV 2012, Jan. 1, 2006 (Jan. 1, 2006).
(Continued)

*Primary Examiner* — Akelaw Teshale

(57) ABSTRACT

An audio processing method may involve receiving output signals from each microphone of a plurality of microphones in an audio environment, the output signals corresponding to a current utterance of a person and determining, based on the output signals, one or more aspects of context information relating to the person, including an estimated current proximity of the person to one or more microphone locations. The method may involve selecting two or more loudspeaker-equipped audio devices based, at least in part, on the one or more aspects of the context information, determining one or more types of audio processing changes to apply to audio data being rendered to loudspeaker feed signals for the audio devices and causing one or more types of audio processing changes to be applied. In some examples, the audio pro-
(Continued)

cessing changes have the effect of increasing a speech to echo ratio at one or more microphones.

24 Claims, 25 Drawing Sheets

Related U.S. Application Data filed on Jun. 25, 2020, provisional application No. 62/971,421, filed on Feb. 7, 2020, provisional application No. 62/950,004, filed on Dec. 18, 2019, provisional application No. 62/880,113, filed on Jul. 30, 2019, provisional application No. 62/880,122, filed on Jul. 30, 2019.

(58) Field of Classification Search
CPC ............ G10L 21/0316; G10L 21/0208; G10L 21/0216; G10L 21/0232; G10L 2021/02082; G10L 2021/02166; G01S 5/18; H04R 3/02; H04R 3/005; H04R 3/12; H04R 27/00; H04R 2227/005; H04R 2227/007; H04R 2420/01; H04R 2430/01; H04R 2430/03; H04R 2227/009; H04S 7/303; H04S 7/305; H04S 2400/13; H04S 2420/07

See application file for complete search history.

(56) References Cited

U.S. PATENT DOCUMENTS

| | | | |
|---|---|---|---|
| 9,357,080 B2 * | 5/2016 | Beaucoup | H04M 9/082 |
| 9,432,768 B1 | 8/2016 | O'Neill | |
| 9,633,671 B2 | 4/2017 | Giacobello | |
| 9,743,204 B1 | 8/2017 | Welch | |
| 9,865,265 B2 | 1/2018 | Ramprashad | |
| 9,953,647 B2 | 4/2018 | Mun | |
| 9,972,339 B1 | 5/2018 | Sundaram | |
| 10,013,981 B2 * | 7/2018 | Ramprashad | G10L 15/20 |
| 10,121,494 B1 | 11/2018 | Sundaram | |
| 10,147,439 B1 | 12/2018 | Kristjansson | |
| 10,192,546 B1 | 1/2019 | Piersol | |
| 10,299,278 B1 | 5/2019 | Jorgovanovic | |
| 10,304,475 B1 | 5/2019 | Wang | |
| 2006/0029368 A1 | 2/2006 | Harville | |
| 2010/0074433 A1 * | 3/2010 | Zhang | H04M 9/082 379/406.08 |
| 2010/0189274 A1 | 7/2010 | Thaden | |
| 2014/0039888 A1 | 2/2014 | Taubman | |
| 2014/0142927 A1 | 5/2014 | Campbell | |
| 2014/0328490 A1 * | 11/2014 | Mohammad | H04M 9/082 381/66 |
| 2015/0078566 A1 | 3/2015 | Kumar | |
| 2015/0131966 A1 | 5/2015 | Zurek | |
| 2015/0195649 A1 | 7/2015 | Vogt | |
| 2015/0271616 A1 | 9/2015 | Kechichian | |
| 2016/0039356 A1 | 2/2016 | Talwar | |
| 2016/0125891 A1 | 5/2016 | Nyshadham | |
| 2016/0134988 A1 | 5/2016 | Gorzel | |
| 2016/0140981 A1 | 5/2016 | Niedermeier | |
| 2016/0227336 A1 | 8/2016 | Sakri | |
| 2017/0012591 A1 | 1/2017 | Rider | |
| 2017/0125023 A1 | 5/2017 | Oh | |
| 2017/0236512 A1 | 8/2017 | Williams | |
| 2017/0270919 A1 | 9/2017 | Parthasarathi | |
| 2017/0280264 A1 | 9/2017 | Wang | |
| 2017/0330563 A1 | 11/2017 | Daley | |
| 2018/0033428 A1 | 2/2018 | Kim | |
| 2018/0041639 A1 | 2/2018 | Gunawan | |
| 2018/0061404 A1 | 3/2018 | Devaraj | |
| 2018/0108351 A1 | 4/2018 | Beckhardt | |
| 2018/0197534 A1 | 7/2018 | Li | |
| 2018/0357038 A1 | 12/2018 | Olivieri | |
| 2019/0096419 A1 | 3/2019 | Giacobello | |
| 2019/0115040 A1 | 4/2019 | Kamdar | |
| 2019/0124458 A1 | 4/2019 | Sheen | |
| 2019/0124462 A1 * | 4/2019 | Lindahl | H04R 3/005 |
| 2019/0156818 A1 | 5/2019 | Piersol | |
| 2019/0158974 A1 | 5/2019 | Tsingos | |
| 2019/0166447 A1 | 5/2019 | Seldess | |

FOREIGN PATENT DOCUMENTS

| | | |
|---|---|---|
| EP | 2874411 A1 | 5/2015 |
| EP | 3209034 A1 | 8/2017 |
| EP | 2804177 B1 | 10/2017 |
| EP | 3280123 | 2/2018 |
| EP | 3484184 A1 | 5/2019 |
| EP | 3223542 B1 | 4/2021 |
| GB | 2561844 A | 10/2018 |
| JP | 2000115351 A | 4/2000 |
| JP | 2005151356 A | 6/2005 |
| KR | 101915322 B1 | 11/2018 |
| WO | 1995005047 A1 | 2/1995 |
| WO | 2012109019 A1 | 8/2012 |
| WO | 2014007724 A1 | 1/2014 |
| WO | 2014085050 A1 | 6/2014 |
| WO | 2015017037 | 2/2015 |
| WO | 2016048381 A1 | 3/2016 |
| WO | 2016093971 A1 | 6/2016 |
| WO | 2018064410 A1 | 4/2018 |
| WO | 2018202324 A1 | 11/2018 |
| WO | 2018213401 A1 | 11/2018 |
| WO | 2019067620 A1 | 4/2019 |
| WO | 2019089322 A1 | 5/2019 |
| WO | 2019143867 A1 | 7/2019 |
| WO | 2021021460 | 2/2021 |
| WO | 2021021682 | 2/2021 |
| WO | 2021021707 | 2/2021 |
| WO | 2021021750 | 2/2021 |
| WO | 2021021752 A1 | 2/2021 |
| WO | 2021021766 A1 | 2/2021 |
| WO | 2021021960 A1 | 2/2021 |
| WO | 2021127286 | 6/2021 |

OTHER PUBLICATIONS

Mardeni, R. et al "Node Positioning in ZigBee Network Using Trilateration Method Based on the Received Signal Strength Indicator (RSSI)" European Journal of Scientific Reseasrch, vol. 46, No. 1, pp. 048-061, 2010.

Spatial Audio for VR: An overview, Feb. 15, 2018.

Yang, J. et al "Indoor Localization Using Improved RSS-Based Lateration Methods" GLOBECOM 2009, pp. 1-6.

* cited by examiner

*Figure 4*
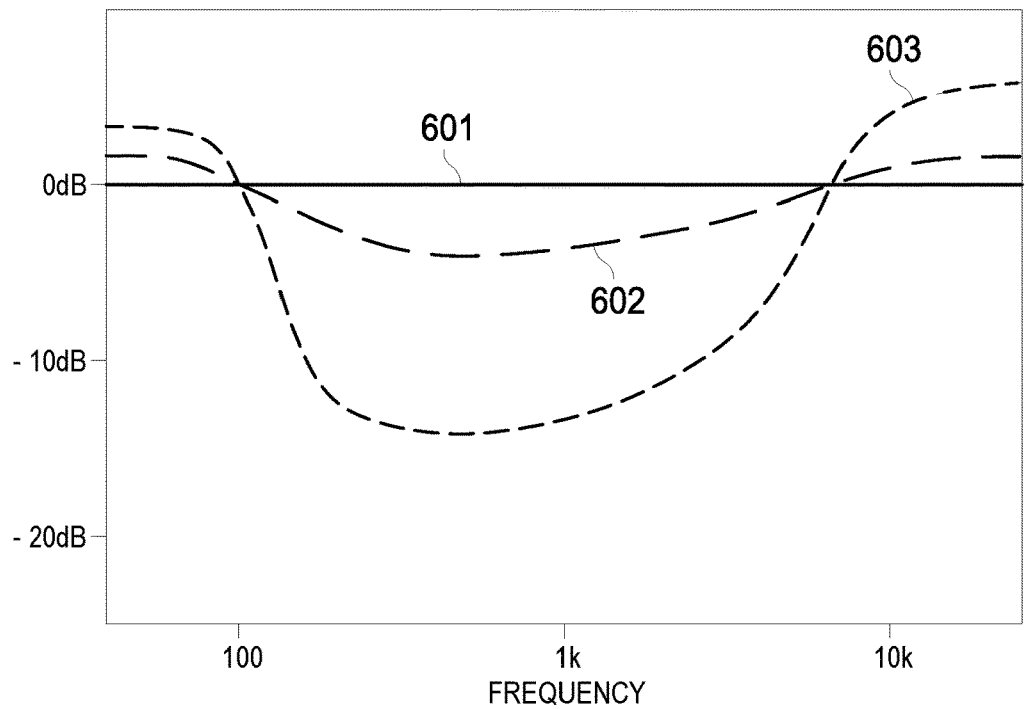
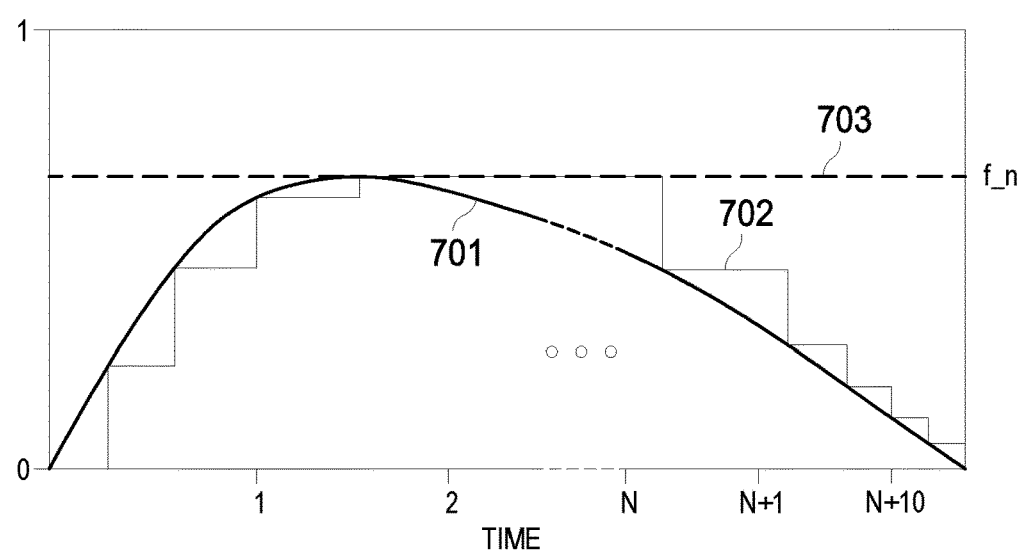
*Figure 5*

```
┌─────────────────────────────────────────────────────────────────────┐
│ Receiving, by a control system and via an interface system, audio   │
│ data, the audio data including one or more audio signals and        │── 1705
│ associated spatial data, the spatial data indicating an intended    │
│ perceived spatial position corresponding to an audio signal         │
└─────────────────────────────────────────────────────────────────────┘
                                    │
                                    ▼
┌─────────────────────────────────────────────────────────────────────┐
│ Rendering, by the control system, the audio data for reproduction   │
│ via a set of loudspeakers of an environment, to produce rendered    │
│ audio signals, wherein rendering each of the one or more audio      │
│ signals included in the audio data comprises determining relative   │
│ activation of a set of loudspeakers in an environment by optimizing │
│ a cost that is a function of: a model of perceived spatial position │
│ of the audio signal played when played back over the set of         │
│ loudspeakers in the environment; a measure of proximity of the      │
│ intended perceived spatial position of the audio signal to a        │── 1710
│ position of each loudspeaker of the set of loudspeakers; and one    │
│ or more additional dynamically configurable functions, wherein the  │
│ one or more additional dynamically configurable functions are based │
│ on one or more of: proximity of loudspeakers to one or more         │
│ listeners; proximity of loudspeakers to an attracting force         │
│ position, wherein an attracting force is a factor that favors       │
│ relatively higher loudspeaker activation in closer proximity to the │
│ attracting force position; proximity of loudspeakers to a repelling │
│ force position, wherein a repelling force is a factor that favors   │
│ relatively lower loudspeaker activation in closer proximity to the  │
│ repelling force position; capabilities of each loudspeaker relative │
│ to other loudspeakers in the environment; synchronization of the    │
│ loudspeakers with respect to other loudspeakers; wakeword           │
│ performance; or echo canceller performance                          │
└─────────────────────────────────────────────────────────────────────┘
                                    │
                                    ▼
┌─────────────────────────────────────────────────────────────────────┐
│ Providing, via the interface system, the rendered audio signals to  │── 1715
│ at least some loudspeakers of the set of loudspeakers of the        │
│ environment                                                         │
└─────────────────────────────────────────────────────────────────────┘
```

ACOUSTIC ECHO CANCELLATION CONTROL FOR DISTRIBUTED AUDIO DEVICES

CROSS-REFERENCE TO RELATED APPLICATION(S)

This application claims priority of U.S. Provisional Patent Application No. 62/705,897, filed Jul. 21, 2020, U.S. Provisional Patent Application No. 62/705,410, filed Jun. 25, 2020, U.S. Provisional Patent Application No. 62/971,421, filed Feb. 7, 2020, U.S. Provisional Patent Application No. 62/950,004, filed Dec. 18, 2019, U.S. Provisional Patent Application No. 62/880,122, filed Jul. 30, 2019, U.S. Provisional Patent Application No. 62/880,113, filed Jul. 30, 2019, EP Patent Application No. 19212391.7, filed Nov. 29, 2019, and ES Patent Application No. P201930702, filed Jul. 30, 2019, all of which are hereby incorporated by reference in their entireties.

TECHNICAL FIELD

The present disclosure pertains to systems and methods for coordinating (orchestrating) and implementing audio devices (e.g., smart audio devices) and controlling rendering of audio by the audio devices.

BACKGROUND

Audio devices, including but not limited to smart audio devices, have been widely deployed and are becoming common features of many homes. Although existing systems and methods for controlling audio devices provide benefits, improved systems and methods would be desirable.

Notation and Nomenclature

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term "couples" or "coupled" is used to mean either a direct or indirect connection. Thus, if a first device couples to a second device, that connection may be through a direct connection, or through an indirect connection via other devices and connections.

As used herein, a "smart device" is an electronic device, generally configured for communication with one or more other devices (or networks) via various wireless protocols such as Bluetooth, Zigbee, near-field communication, Wi-Fi, light fidelity (Li-Fi), 3G, 4G, 5G, etc., that can operate to some extent interactively and/or autonomously. Several notable types of smart devices are smartphones, smart cars, smart thermostats, smart doorbells, smart locks, smart refrigerators, phablets and tablets, smartwatches, smart bands, smart key chains and smart audio devices. The term "smart device" may also refer to a device that exhibits some properties of ubiquitous computing, such as artificial intelligence.

Herein, we use the expression "smart audio device" to denote a smart device which is either a single-purpose audio device or a multi-purpose audio device (e.g., an audio device that implements at least some aspects of virtual assistant functionality). A single-purpose audio device is a device (e.g., a television (TV) or a mobile phone) including or coupled to at least one microphone (and optionally also including or coupled to at least one speaker and/or at least one camera), and which is designed largely or primarily to achieve a single purpose. For example, although a TV typically can play (and is thought of as being capable of playing) audio from program material, in most instances a modern TV runs some operating system on which applications run locally, including the application of watching television. Similarly, the audio input and output in a mobile phone may do many things, but these are serviced by the applications running on the phone. In this sense, a single-purpose audio device having speaker(s) and microphone(s) is often configured to run a local application and/or service to use the speaker(s) and microphone(s) directly. Some single-purpose audio devices may be configured to group together to achieve playing of audio over a zone or user configured area.

One common type of multi-purpose audio device is an audio device that implements at least some aspects of virtual assistant functionality, although other aspects of virtual assistant functionality may be implemented by one or more other devices, such as one or more servers with which the multi-purpose audio device is configured for communication. Such a multi-purpose audio device may be referred to herein as a "virtual assistant." A virtual assistant is a device (e.g., a smart speaker or voice assistant integrated device) including or coupled to at least one microphone (and optionally also including or coupled to at least one speaker and/or at least one camera). In some examples, a virtual assistant may provide an ability to utilize multiple devices (distinct from the virtual assistant) for applications that are in a sense cloud-enabled or otherwise not completely implemented in or on the virtual assistant itself. In other words, at least some aspects of virtual assistant functionality, e.g., speech recognition functionality, may be implemented (at least in part) by one or more servers or other devices with which a virtual assistant may communication via a network, such as the Internet. Virtual assistants may sometimes work together, e.g., in a discrete and conditionally defined way. For example, two or more virtual assistants may work together in the sense that one of them, e.g., the one which is most confident that it has heard a wakeword, responds to the wakeword. The connected virtual assistants may, in some implementations, form a sort of constellation, which may be managed by one main application which may be (or implement) a virtual assistant.

Herein, "wakeword" is used in a broad sense to denote any sound (e.g., a word uttered by a human, or some other sound), where a smart audio device is configured to awake in response to detection of ("hearing") the sound (using at least one microphone included in or coupled to the smart audio device, or at least one other microphone). In this context, to "awake" denotes that the device enters a state in which it awaits (in other words, is listening for) a sound command. In some instances, what may be referred to herein as a "wakeword" may include more than one word, e.g., a phrase.

Herein, the expression "wakeword detector" denotes a device configured (or software that includes instructions for configuring a device) to search continuously for alignment between real-time sound (e.g., speech) features and a trained model. Typically, a wakeword event is triggered whenever it is determined by a wakeword detector that the probability that a wakeword has been detected exceeds a predefined threshold. For example, the threshold may be a predetermined threshold which is tuned to give a reasonable compromise between rates of false acceptance and false rejection. Following a wakeword event, a device might enter a state (which may be referred to as an "awakened" state or a state of "attentiveness") in which it listens for a command and passes on a received command to a larger, more computationally-intensive recognizer.

Herein, the expression "microphone location" denotes a location of one or more microphones. In some examples, a single microphone location may correspond to an array of microphones that reside in a single audio device. For example, the microphone location may be a single location that corresponds to an entire audio device that includes one or more microphones. In some such examples, a microphone location may be a single location that corresponds to a centroid of a microphone array of a single audio device. However, in some instances a microphone location may be a location of a single microphone. In some such examples, an audio device may have only a single microphone.

SUMMARY

Some disclosed embodiments provide an approach for management of the listener or "user" experience to improve a key criterion for successful full duplex at one or more audio devices. This criterion is known as the Signal to Echo ratio (SER), also referred to herein as the Speech to Echo Ratio, which may be defined as the ratio between the voice (or other desired) signal to be captured from an environment (e.g., a room) via one or more microphones, and the echo presented at the audio device that includes the one or more microphones from output program content, interactive content, etc. It is contemplated that many audio devices of an audio environment may have both loudspeakers and microphones built in while serving other functions. However, other audio devices of the audio environment may have one or more loudspeakers but no microphone(s), or one or more microphones but no loudspeaker(s). Some embodiments deliberately avoid use of (or do not use primarily) the nearest loudspeaker(s) to the user in certain use cases or scenarios. Alternatively, or additionally, some embodiments may cause one or more other types of audio processing changes to audio data rendered by one or more loudspeakers of an audio environment in order to increase the SER at one or more microphones of the environment.

Some embodiments are configured to implement a system that includes coordinated (orchestrated) audio devices, which in some implementations may include smart audio devices. According to some such implementations, two or more of the smart audio devices is (or is configured to implement) a wakeword detector. Accordingly, multiple microphones (e.g., asynchronous microphones) are available in such examples. In some instances, each of the microphones may be included in, or configured for communication with, at least one of the smart audio devices. For example, at least some of the microphones may be discrete microphones (e.g., in household appliances) which are not included in any of the smart audio devices, but which are configured for communication with (so that their outputs are capturable by) at least one of the smart audio devices. In some embodiments, each wakeword detector (or each smart audio device including a wakeword detector), or another subsystem (e.g., a classifier) of the system, is configured to estimate a person's zone by applying a classifier driven by multiple acoustic features derived from at least some of the microphones (e.g., asynchronous microphones). In some implementations, the goal may not be to estimate the person's exact location but instead to form a robust estimate of a discrete zone that includes the person's current location.

In some implementations, the person (who also may be referred to herein as a "user"), smart audio devices, and microphones are in an audio environment (e.g., the user's residence, automobile or place of business) in which sound may propagate from the user to the microphones, and the audio environment may include predetermined zones. According to some examples, the environment may include at least the following zones: food preparation area; dining area; open area of a living space; TV area (including TV couch) of the living space; and so on. During operation of the system, it is assumed that the user is physically located in one of the zones (the "user's zone") at any time, and that the user's zone may change from time to time.

In some examples, the microphones may be asynchronous (e.g., digitally sampled using distinct sample clocks) and randomly located (or at least not located in predetermined positions, in a symmetrical arrangement, on a grid, etc.). In some instances, the user's zone may be estimated via a data-driven approach driven by a plurality of high-level features derived, at least partially, from at least one of the wakeword detectors. These features (e.g., wakeword confidence and received level) may, in some examples, consume very little bandwidth and may be transmitted (e.g., asynchronously) to a device that is implementing a classifier with very little network load.

Aspects of some embodiments pertain to implementing smart audio devices, and/or to coordinating smart audio devices.

Aspects of some disclosed implementations include a system configured (e.g., programmed) to perform one or more disclosed methods or steps thereof, and a tangible, non-transitory, computer readable medium which implements non-transitory storage of data (for example, a disc or other tangible storage medium) which stores code for performing (e.g., code executable to perform) one or more disclosed methods or steps thereof. For example, some disclosed embodiments can be or include a programmable general purpose processor, digital signal processor, or microprocessor, programmed with software or firmware and/or otherwise configured to perform any of a variety of operations on data, including one or more disclosed methods or steps thereof. Such a general purpose processor may be or include a computer system including an input device, a memory, and a processing subsystem that is programmed (and/or otherwise configured) to perform one or more disclosed methods (or steps thereof) in response to data asserted thereto.

In some implementations, the control system may be configured for implementing one or more methods disclosed herein, such as one or more audio session management methods. Some such methods involve receiving (e.g., by the control system) output signals from each microphone of a plurality of microphones in an audio environment. In some examples, each microphone of the plurality of microphones resides in a microphone location of the audio environment. In some instances, the output signals include signals corresponding to a current utterance of a person. According to some examples, the output signals include signals corresponding to non-speech audio data, such as noise and/or echo.

Some such methods involve determining (e.g., by the control system), based on the output signals, one or more aspects of context information relating to the person. In some examples, the context information includes an estimated current location of the person and/or an estimated current proximity of the person to one or more microphone locations. Some such methods involve selecting two or more audio devices of the audio environment based, at least in part, on the one or more aspects of the context information. In some implementations, each of the two or more audio devices includes at least one loudspeaker.

Some such methods involve determining (e.g., by the control system) one or more types of audio processing changes to apply to audio data being rendered to loudspeaker feed signals for the two or more audio devices. In some examples, the audio processing changes have an effect of increasing a speech to echo ratio at one or more microphones. Some such methods involve causing the one or more types of audio processing changes to be applied.

According to some implementations, the one or more types of audio processing changes may cause a reduction in loudspeaker reproduction level for the loudspeakers of the two or more audio devices. In some implementations, at least one of the audio processing changes for a first audio device may be different from an audio processing change for a second audio device. In some examples, selecting two or more audio devices of the audio environment (e.g., by the control system) may involve selecting N loudspeaker-equipped audio devices of the audio environment, N being an integer greater than 2.

In some implementations, selecting the two or more audio devices of the audio environment may be based, at least in part, on an estimated current location of the person relative to at least one of a microphone location or a loudspeaker-equipped audio device location. According to some such implementations, the method may involve determining a closest loudspeaker-equipped audio device that is closest to the estimated current location of the person or to the microphone location closest to the estimated current location of the person. In some such examples, the two or more audio devices may include the closest loudspeaker-equipped audio device.

In some examples, the one or more types of audio processing changes involve changing a rendering process to warp a rendering of audio signals away from the estimated current location of the person. In some implementations, the one or more types of audio processing changes may involve spectral modification. According to some such implementations, the spectral modification may involve reducing a level of audio data in a frequency band between 500 Hz and 3 KHz.

In some implementations, the one or more types of audio processing changes may involve inserting at least one gap into at least one selected frequency band of an audio playback signal. In some examples, the one or more types of audio processing changes may involve dynamic range compression.

According to some implementations, selecting the two or more audio devices may be based, at least in part, on a signal-to-echo ratio estimation for one or more microphone locations. For example, selecting the two or more audio devices may be based, at least in part, on determining whether the signal-to-echo ratio estimation is less than or equal to a signal-to-echo ratio threshold. In some instances, determining the one or more types of audio processing changes may be based on an optimization of a cost function that is based, at least in part, on the signal-to-echo ratio estimation. For example, the cost function may be based, at least in part, on rendering performance. In some implementations, selecting the two or more audio devices may be based, at least in part, on a proximity estimation.

In some examples, the method may involve determining (e.g., by the control system) multiple current acoustic features from the output signals of each microphone and applying a classifier to the multiple current acoustic features. According to some implementations, applying the classifier may involve applying a model trained on previously-determined acoustic features derived from a plurality of previous utterances made by the person in a plurality of user zones in the environment.

In some such examples, determining one or more aspects of context information relating to the person may involve determining, based at least in part on output from the classifier, an estimate of a user zone in which the person is currently located. According to some implementations, the estimate of the user zone may be determined without reference to geometric locations of the plurality of microphones. In some instances, the current utterance and the previous utterances may be, or may include, wakeword utterances.

According to some implementations, the one or more microphones may reside in multiple audio devices of the audio environment. However, in other instances, the one or more microphones may reside in a single audio device of the audio environment. In some examples, at least one of the one or more microphone locations may correspond to multiple microphones of a single audio device. Some disclosed methods may involve selecting at least one microphone according to the one or more aspects of the context information.

At least some aspects of the present disclosure may be implemented via methods, such as audio session management methods. As noted elsewhere herein, in some instances the methods may be implemented, at least in part, by a control system such as those disclosed herein. Some such methods involve receiving output signals from each microphone of a plurality of microphones in an audio environment. In some examples, each microphone of the plurality of microphones resides in a microphone location of the audio environment. In some instances, the output signals include signals corresponding to a current utterance of a person. According to some examples, the output signals include signals corresponding to non-speech audio data, such as noise and/or echo.

Some such methods involve determining, based on the output signals, one or more aspects of context information relating to the person. In some examples, the context information includes an estimated current location of the person and/or an estimated current proximity of the person to one or more microphone locations. Some such methods involve selecting two or more audio devices of the audio environment based, at least in part, on the one or more aspects of the context information. In some implementations, each of the two or more audio devices includes at least one loudspeaker.

Some such methods involve determining one or more types of audio processing changes to apply to audio data being rendered to loudspeaker feed signals for the two or more audio devices. In some examples, the audio processing changes have an effect of increasing a speech to echo ratio at one or more microphones. Some such methods involve causing the one or more types of audio processing changes to be applied.

According to some implementations, the one or more types of audio processing changes may cause a reduction in loudspeaker reproduction level for the loudspeakers of the two or more audio devices. In some implementations, at least one of the audio processing changes for a first audio device may be different from an audio processing change for a second audio device. In some examples, selecting two or more audio devices of the audio environment may involve selecting N loudspeaker-equipped audio devices of the audio environment, N being an integer greater than 2.

In some implementations, selecting the two or more audio devices of the audio environment may be based, at least in part, on an estimated current location of the person relative to at least one of a microphone location or a loudspeaker-equipped audio device location. According to some such implementations, the method may involve determining a closest loudspeaker-equipped audio device that is closest to the estimated current location of the person or to the microphone location closest to the estimated current location of the person. In some such examples, the two or more audio devices may include the closest loudspeaker-equipped audio device.

In some examples, the one or more types of audio processing changes involve changing a rendering process to warp a rendering of audio signals away from the estimated current location of the person. In some implementations, the one or more types of audio processing changes may involve spectral modification. According to some such implementations, the spectral modification may involve reducing a level of audio data in a frequency band between 500 Hz and 3 KHz.

In some implementations, the one or more types of audio processing changes may involve inserting at least one gap into at least one selected frequency band of an audio playback signal. In some examples, the one or more types of audio processing changes may involve dynamic range compression.

According to some implementations, selecting the two or more audio devices may be based, at least in part, on a signal-to-echo ratio estimation for one or more microphone locations. For example, selecting the two or more audio devices may be based, at least in part, on determining whether the signal-to-echo ratio estimation is less than or equal to a signal-to-echo ratio threshold. In some instances, determining the one or more types of audio processing changes may be based on an optimization of a cost function that is based, at least in part, on the signal-to-echo ratio estimation. For example, the cost function may be based, at least in part, on rendering performance. In some implementations, selecting the two or more audio devices may be based, at least in part, on a proximity estimation.

In some examples, the method may involve determining multiple current acoustic features from the output signals of each microphone and applying a classifier to the multiple current acoustic features. According to some implementations, applying the classifier may involve applying a model trained on previously-determined acoustic features derived from a plurality of previous utterances made by the person in a plurality of user zones in the environment.

In some such examples, determining one or more aspects of context information relating to the person may involve determining, based at least in part on output from the classifier, an estimate of a user zone in which the person is currently located. According to some implementations, the estimate of the user zone may be determined without reference to geometric locations of the plurality of microphones. In some instances, the current utterance and the previous utterances may be, or may include, wakeword utterances.

According to some implementations, the one or more microphones may reside in multiple audio devices of the audio environment. However, in other instances, the one or more microphones may reside in a single audio device of the audio environment. In some examples, at least one of the one or more microphone locations may correspond to multiple microphones of a single audio device. Some disclosed methods may involve selecting at least one microphone according to the one or more aspects of the context information.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves receiving output signals from each microphone of a plurality of microphones in an audio environment. In some examples, each microphone of the plurality of microphones resides in a microphone location of the audio environment. In some instances, the output signals include signals corresponding to a current utterance of a person. According to some examples, the output signals include signals corresponding to non-speech audio data, such as noise and/or echo.

Some such methods involve determining, based on the output signals, one or more aspects of context information relating to the person. In some examples, the context information includes an estimated current location of the person and/or an estimated current proximity of the person to one or more microphone locations. Some such methods involve selecting two or more audio devices of the audio environment based, at least in part, on the one or more aspects of the context information. In some implementations, each of the two or more audio devices includes at least one loudspeaker.

Some such methods involve determining one or more types of audio processing changes to apply to audio data being rendered to loudspeaker feed signals for the two or more audio devices. In some examples, the audio processing changes have an effect of increasing a speech to echo ratio at one or more microphones. Some such methods involve causing the one or more types of audio processing changes to be applied.

According to some implementations, the one or more types of audio processing changes may cause a reduction in loudspeaker reproduction level for the loudspeakers of the two or more audio devices. In some implementations, at least one of the audio processing changes for a first audio device may be different from an audio processing change for a second audio device. In some examples, selecting two or more audio devices of the audio environment may involve selecting N loudspeaker-equipped audio devices of the audio environment, N being an integer greater than 2.

In some implementations, selecting the two or more audio devices of the audio environment may be based, at least in part, on an estimated current location of the person relative to at least one of a microphone location or a loudspeaker-equipped audio device location. According to some such implementations, the method may involve determining a closest loudspeaker-equipped audio device that is closest to the estimated current location of the person or to the microphone location closest to the estimated current location of the person. In some such examples, the two or more audio devices may include the closest loudspeaker-equipped audio device.

In some examples, the one or more types of audio processing changes involve changing a rendering process to warp a rendering of audio signals away from the estimated current location of the person. In some implementations, the one or more types of audio processing changes may involve spectral modification. According to some such implementations, the spectral modification may involve reducing a level of audio data in a frequency band between 500 Hz and 3 KHz.

In some implementations, the one or more types of audio processing changes may involve inserting at least one gap into at least one selected frequency band of an audio playback signal. In some examples, the one or more types of audio processing changes may involve dynamic range compression.

According to some implementations, selecting the two or more audio devices may be based, at least in part, on a signal-to-echo ratio estimation for one or more microphone locations. For example, selecting the two or more audio devices may be based, at least in part, on determining whether the signal-to-echo ratio estimation is less than or equal to a signal-to-echo ratio threshold. In some instances, determining the one or more types of audio processing changes may be based on an optimization of a cost function that is based, at least in part, on the signal-to-echo ratio estimation. For example, the cost function may be based, at least in part, on rendering performance. In some implementations, selecting the two or more audio devices may be based, at least in part, on a proximity estimation.

In some examples, the method may involve determining multiple current acoustic features from the output signals of each microphone and applying a classifier to the multiple current acoustic features. According to some implementations, applying the classifier may involve applying a model trained on previously-determined acoustic features derived from a plurality of previous utterances made by the person in a plurality of user zones in the environment.

In some such examples, determining one or more aspects of context information relating to the person may involve determining, based at least in part on output from the classifier, an estimate of a user zone in which the person is currently located. According to some implementations, the estimate of the user zone may be determined without reference to geometric locations of the plurality of microphones. In some instances, the current utterance and the previous utterances may be, or may include, wakeword utterances.

According to some implementations, the one or more microphones may reside in multiple audio devices of the audio environment. However, in other instances, the one or more microphones may reside in a single audio device of the audio environment. In some examples, at least one of the one or more microphone locations may correspond to multiple microphones of a single audio device. Some disclosed methods may involve selecting at least one microphone according to the one or more aspects of the context information.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 4 is a graph that illustrates examples of audio processing that may increase a speech to echo ratio at one or more microphones of an audio environment.

FIG. 5 is a graph that illustrates another type of audio processing that may increase a speech to echo ratio at one or more microphones of an audio environment.

FIG. 17 is a flow diagram that outlines one example of a method that may be performed by an apparatus or system such as that shown in FIG. 2A.

DETAILED DESCRIPTION

At present, designers generally consider audio devices as a single point of interface for audio that may be a blend of entertainment, communications and information services. Using audio for notifications and voice control has the advantage of avoiding visual or physical intrusion. The expanding device landscape is fragmented, with more systems competing for our one pair of ears.

In all forms of interactive audio, the problem of improving full duplex audio ability remains a challenge. When there is audio output in the room that is not relevant for transmission or information-based capture in the room, it is desirable to remove this audio from the captured signal (e.g., by echo cancellation and/or echo suppression). Some disclosed embodiments provide an approach and management of the user experience to improve Signal to Echo ratio (SER), which is a key criterion for successful full duplex at one or more devices.

Such embodiments are expected to be useful in situations where there is more than one audio device within acoustic range of the user, such that each audio device would be able to present audio program material that is suitably loud at the user for a desired entertainment, communications or information service. The value of such embodiments is expected to be particularly high when there are three or more audio devices similarly proximate to the user.

A rendering application is sometimes the primary function of an audio device, and so there is sometimes a desire to use as many audio output devices as possible. If audio devices are closer to the user, the audio devices can be more advantageous in terms of the ability to accurately locate sound or deliver specific audio signalling and imaging to the user. However, if these audio devices include one or more microphones, they also may be preferable for picking up the user's voice. When considered with the challenge of signal to echo ratio, we see that the signal to echo ratio is dramatically improved if we implement the use of a device closer to the user in simplex (input only) mode or move towards this.

Figure 1A:
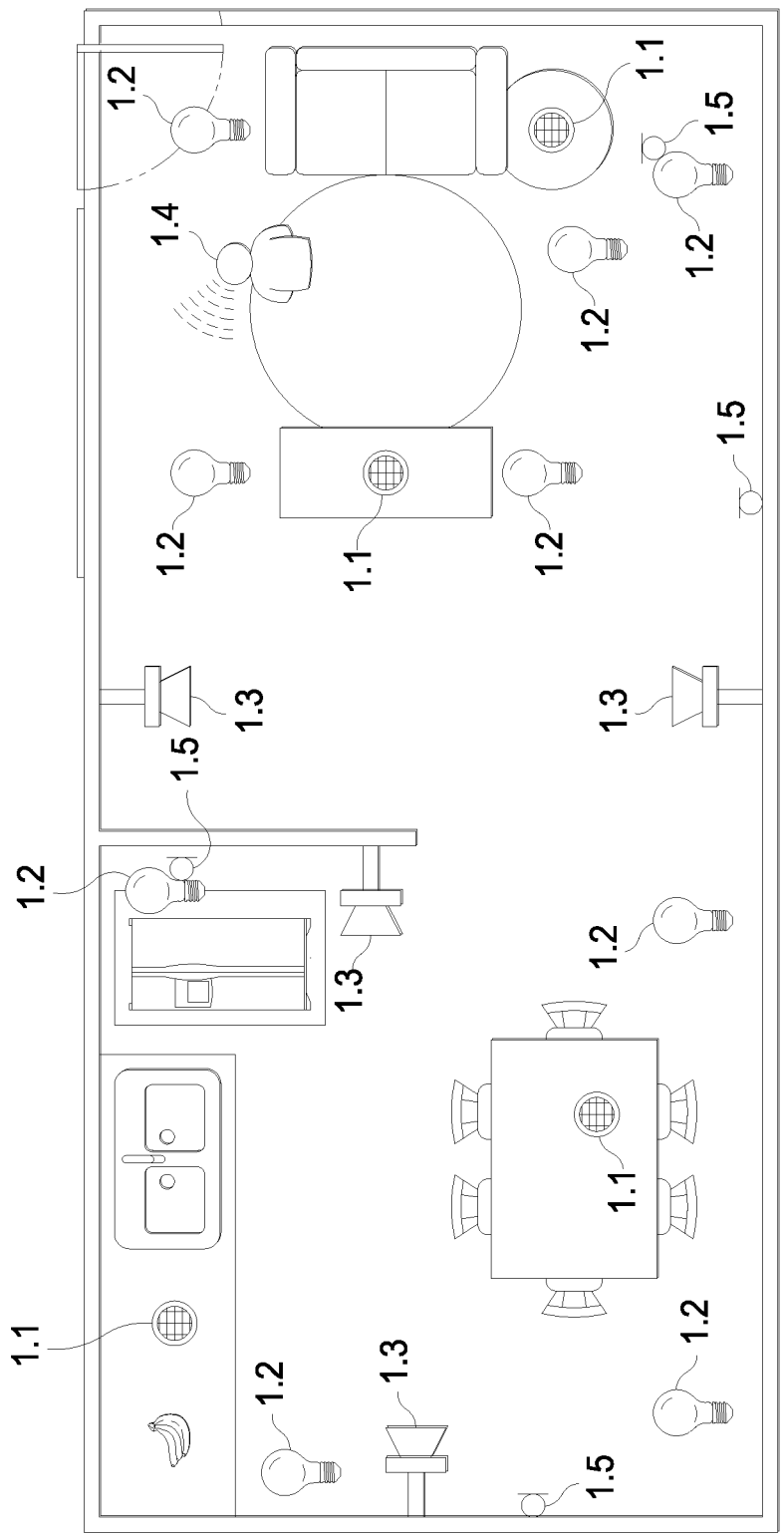
FIG. 1A represents an audio environment according to one example.

In various disclosed embodiments, audio devices may have both speakers and microphones built in while serving other functions (e.g., those shown in FIG. 1A). Some disclosed embodiments implement the concept of deliberately not using primarily the nearest loudspeaker(s) to the user in some circumstances.

It is contemplated that in a connected operating system or disintermediation between applications (e.g., cloud-based applications), devices of many different types (that enable audio input, output and/or real time interaction) may be included. Examples of such devices include wearables, home audio devices, mobile devices, automotive and mobile computing devices, and smart speakers. A smart speaker may include a network-connected speaker and microphone for cloud-based services. Other examples of such devices may incorporate speakers and/or microphones, including lights, clocks, televisions, personal assistant devices, refrigerators and rubbish bins. Some embodiments are particularly relevant to situations where there is a common platform for orchestrating multiple audio devices of an audio environment via an orchestrating device such as a smart home hub or another device configured for audio session management, which may be referred to herein as an audio session manager. Some such implementations may involve commands between the audio session manager and locally-implemented software applications in a language that is not device-specific, but that instead involves the orchestrating device routing audio content to and from people and places that are specified by the software applications. Some embodiments implement methods for managing rendering dynamically, e.g., including a constraint for pushing sound away from the nearest device and maintaining spatial imaging, and/or for locating a user in a zone, and/or for mapping and location of devices relative to each other and the user.

Typically, a system that includes multiple smart audio devices needs to indicate when it has heard a "wakeword" (defined above) from a user and is attentive to (in other words, listening for) a command from the user.

FIG. 1A represents an audio environment according to one example. Some disclosed embodiments may be particularly useful in a scenario in which there are numerous audio devices in an environment (e.g., a living or work space) that are able to convey sound and capture audio, for example, as disclosed herein. The system of FIG. 1A may be configured in accordance with various disclosed embodiments.

FIG. 1A is a diagram of an audio environment (a living space) which includes a system including a set of smart audio devices (devices 1.1) for audio interaction, speakers (1.3) for audio output, and controllable lights (1.2). As with other disclosed implementations, the type, number and arrangement of elements in FIG. 1A are merely examples. Other implementations may provide more, fewer and/or different elements. In some instances one or more of the microphones 1.5 may be part of, or associated with one of the devices 1.1, the lights 1.2 or the speakers 1.3. Alternatively, or additionally, one or more of the microphones 1.5 may be attached to another part of the environment, e.g., to a wall, to a ceiling, to furniture, to an appliance or to another device of the environment. In an example, each of the devices 1.1 includes (and/or is coupled to) at least one microphone 1.5. Although not shown in FIG. 1A, some audio environments may include one or more cameras. According to some disclosed implementations, one or more devices of the audio environment (e.g., a device configured for audio session management, such as one or more of the devices 1.1, a device that is implementing an audio session manager, a smart home hub, etc.) may be able to estimate where (e.g., in which zone of the living space) is a user (1.4) who issues a wakeword, a command, etc. One or more devices of the system shown in FIG. 1A (e.g., devices 1.1 thereof) may be configured to implement various disclosed embodiments. Using various methods, information may be obtained collectively from the devices of FIG. 3 to provide a positional estimate of the user who utters a wakeword. According to some disclosed methods, information may be obtained collectively from the microphones 1.5 of FIG. 1A and provided to a device (e.g., a device configured for audio session management,) implementing a classifier configured to provide a positional estimate of a user who speaks a wakeword.

In a living space (e.g., that of FIG. 1A), there are a set of natural activity zones where a person would be performing a task or activity, or crossing a threshold. These areas, which may be referred to herein as user zones, may be defined by a user, in some examples, without specifying coordinates or other indicia of a geometric location. According to some examples, the "context" of a person may include, or may correspond with, the user zone in which the person is currently located or an estimate thereof. In the FIG. 1A example, user zones include:

1. The kitchen sink and food preparation area (in the upper left region of the living space);
2. The refrigerator door (to the right of the sink and food preparation area);
3. The dining area (in the lower left region of the living space);
4. The open area of the living space (to the right of the sink and food preparation area and dining area);
5. The television (TV) couch (at the right of the open area);
6. The TV itself;
7. Tables; and
8. The door area or entry way (in the upper right region of the living space). Other audio environments may include more, fewer and/or other types of user zones, such as one or more bedroom zones, garage zones, patio or deck zones, etc.

In accordance with some embodiments, a system that estimates (e.g., determines an uncertain estimate of) where a sound (e.g., a wakeword or other signal for attention) arises or originates may have some determined confidence in (or multiple hypotheses for) the estimate. E.g., if a person happens to be near a boundary between user zones of an audio environment, an uncertain estimate of location of the person may include a determined confidence that the person is in each of the zones. In some conventional implementations of voice interfaces it is required that the voice assistant's voice is only issued from one location at a time, thus forcing a single choice for the single location (e.g., one of the eight speaker locations, 1.1 and 1.3, in FIG. 1A). However, based on simple imaginary role play, it is apparent that (in such conventional implementations) the likelihood of the selected location of the source of the assistant's voice (i.e., the location of a speaker included in or coupled to the assistant) being the focus point or natural return response for expressing attention may be low.

Figure 1B:
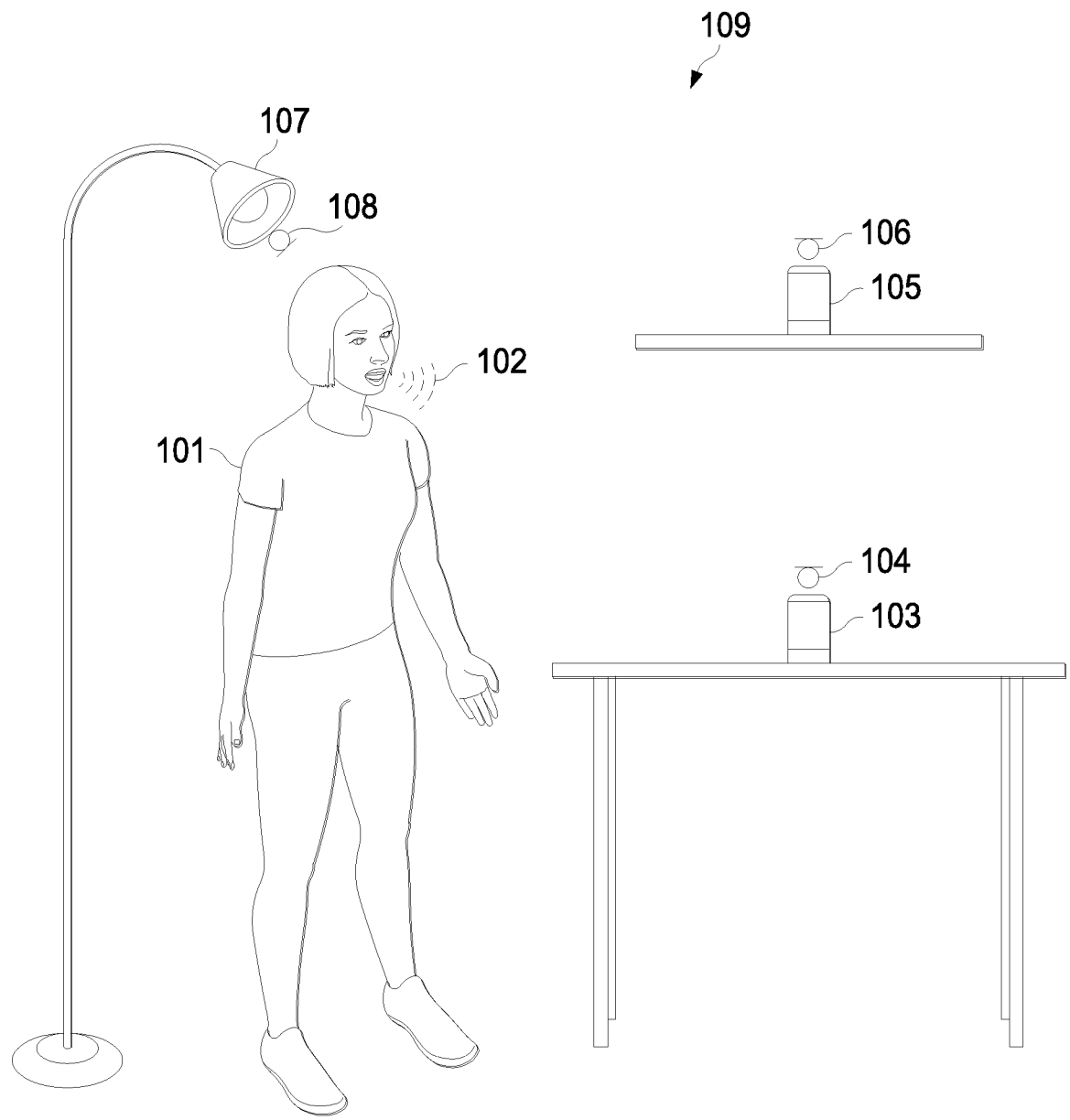
FIG. 1B shows another example of an audio environment.

FIG. 1B shows another example of an audio environment. FIG. 1B depicts another audio environment that includes a user 101 who utters direct speech 102, and a system including a set of smart audio devices 103 and 105, speakers for audio output, and microphones. The system may be configured in accordance with some disclosed implementations. The speech uttered by user 101 (sometimes referred to herein as a talker) may be recognized by one or more elements of the system as a wakeword.

More specifically, elements of the FIG. 1B system include:

- 102: direct local voice (produced by the user 101);
- 103: voice assistant device (coupled to a one or more loudspeakers). Device 103 is positioned nearer to the user 101 than is device 105, and thus device 103 is sometimes referred to as a "near" device, and device 105 is referred to as a "distant" device;
- 104: plurality of microphones in (or coupled to) the near device 103;
- 105: voice assistant device (coupled to one or more loudspeakers);
- 106: plurality of microphones in (or coupled to) the distant device 105;
- 107: Household appliance (e.g. a lamp); and
- 108: Plurality of microphones in (or coupled to) household appliance 107. In some examples, each of the microphones 108 may be configured for communication with a device configured for implementing a classifier, which may in some instances be at least one of devices 103 or 105. In some implementations, the device configured for implementing the classifier also may be a device configured for audio session management, such as a device configured for implementing a CHASM or a smart home hub.

The FIG. 1B system may also include at least one classifier (e.g., classifier 1107 of FIG. 11 described below). For example, device 103 (or device 105) may include a classifier. Alternatively, or additionally, the classifier may be implemented by another device that may be configured for communication with devices 103 and/or 105. In some examples, a classifier may be implemented by another local device (e.g., a device within the environment 109), whereas in other examples a classifier may be implemented by a remote device that is located outside of the environment 109 (e.g., a server).

According to some implementations, at least two devices (e.g., devices 1.1 of FIG. 1A, devices 103 and 105 of FIG. 1B, etc.) are in some way working together (e.g., under the control of an orchestrating device, such as a device configured for audio session management) to deliver sound in that the audio can be jointly controlled across them. For example, the two devices 103 and 105 may either individually or jointly be playing sound. In a simple case the devices 103 and 105 are acting as a joint pair to each render part of the audio (e.g., without loss of generality, a stereo signal with one rendering substantially L and the other substantially R).

Appliance 107 (or another device) may include one microphone 108 that is closest to the user 101 and that does not include any loudspeakers, in which case we have a situation in which there may already be a preferable Signal to Echo Ratio or Speech to Echo Ratio (SER) for this particular audio environment and this particular location of the user 101 that cannot be improved upon by changing the audio processing for audio reproduced by the speaker(s) of the device 105 and/or 107. In some embodiments, there is no such microphone.

Some disclosed embodiments provide detectable and significant SER performance impact. Some implementations provide such advantages without implementing aspects of zone location and/or dynamically variable rendering. However, some embodiments implement audio processing changes that involve rendering with repelling or "warping" of sound objects (or audio objects) away from devices. The reason for warping audio objects from particular audio devices, locations, etc. may, in some instances, be to improve the Signal to Echo Ratio at a particular microphone that is used for capturing human speech. Such warping may involve, but may not be limited to, turning down the playback level of one, two, three or more nearby audio devices. In some cases, changes in audio processing to improve SER may be informed by a zone detection technique such that the one, two or more nearby audio devices for which changes in audio processing are implemented (e.g., that are turned down) are those closest to the user, closest to a particular microphone that will be used for capturing the user's speech and/or closest to a sound of interest.

Aspects of some embodiments involve a context, a decision and an audio processing change, which may be referred to herein as a "rendering change." In some examples, these aspects are:

CONTEXT (such as location and/or time). In some examples, both location and time are part of a context, and each may be sourced or determined in various ways;

DECISION (which may involve a threshold or a continuous modulation of change(s)). This component may be simple or complex, depending on the particular embodiment. In some embodiments, the decision may be made on a continuous basis, e.g., according to feedback. In some instances, the decision may create system stability, e.g., a virtuous feedback stability such as described below; and RENDER (the nature of the audio processing change(s)). Although denoted herein as "rendering," the audio processing change(s) may or may not involve rendering change(s), depending on the particular implementation. In some implementations, there are several options for audio processing changes, including the implementation of barely perceptible audio processing changes through to the implementation of rendering of severe and overt audio processing changes.

In some examples, "context" may involve information about both location and intent. For example, context information may include at least a rough idea of the location of the user, such as an estimate of a user zone corresponding with the user's current location. Context information may correspond with an audio object location, e.g., an audio object location that corresponds with the user's utterance of a wakeword. In some examples, context information may include information about timing and the likelihood of that object or individual making sound. Examples of context include, but are not limited to, the following:

A. Knowing where the likely location is. This may be based on
  i) weak or low-probability detection (e.g., detection of a sound that may potentially be of interest but that that may or may not be clear enough to act on);
  ii) specific activation (e.g., a wake word spoken and clearly detected);
  iii) habit and patterns (e.g., based on pattern recognition, e.g., that certain locations such as a couch near a television may be associated with one or more people watching video material on the television and listening to the associated audio while sitting on the couch);
  iv) and/or the integration of some other form of proximity sensing based on other modality (such as one or more infrared (IR) sensors, cameras, capacitive sensors, radio frequency (RF) sensors, thermal sensors, pressure sensors (e.g., in or on furniture of the audio environment), a wearable beacon, etc.); and B. Knowing or estimating the likelihood of a sound that a person may want to listen to, e.g., with improved detectability. This may include some or all of:
  i) an event based on some audio detection such as a wakeword detection;
  ii) an event or context based on known activity or sequence of events, for example a pause in the display of video content, space for interaction in scripted automatic speech recognition (ASR) style interactive content, or changes in activity and/or conversational dynamics of full duplex communications activity (such as a pause by one or more participants in a teleconference);
  iii) additional sensory input of other modalities;
  iv) a choice to have continually improved listening in some way—elevated preparedness or improved listening.

A key difference between A (knowing where the likely location is) and B (knowing or estimating the likelihood of a sound we want to listen to, e.g., with improved detectability) is that A may involve specific positional information or knowledge without necessarily knowing if there is something to listen to yet, whereas B may be more focused on specific timing or event information without necessarily knowing exactly where to listen. There can of course be overlap in some aspects of A and B, e.g., the weak or full detection of a wakeword will have information about both location and timing.

For some use cases, what may be important is that the "context" involves information about both the location (e.g., the location of a person and/or of a proximate microphone) and timing of a desire to listen. This contextual information may drive one or more associated decisions and one or more possible audio processing changes (e.g., one or more possible rendering changes). Thus, various embodiments allow for many possibilities based on various types of information that may be used for forming the context.

We next describe the "decision" aspect. This aspect may, for example, involve determining one, two, three or more output devices for which the associated audio processing will be changed. One simple way to frame such a decision is:

Given information from context (e.g., location and/or event (or in some sense a confidence in there being something of significance or importance regarding that location)), in some examples an audio session manager may determine or estimate distance from that location to some or all of the audio devices in an audio environment. In some implementations, the audio session manager also may create a set of activation potentials for each loudspeaker (or set of loudspeakers) for some or all of the audio devices of the audio environment. According to some such examples, the set of activation potentials may be determined as $[f\_1, f\_2, \ldots, f\_n]$ and without loss of generality lying in the range $[0 \ldots 1]$. In another example, the result of a decision may describe a target speech-to-echo ratio improvement $[s\_1, s\_2, \ldots, s\_n]$ per device to the "render" aspect. In a further example, both activation potentials and speech-to-echo ratio improvements could be produced by the "decision" aspect.

In some embodiments, activation potentials impart the degree that the "render" aspect should ensure that the SER improved at the desired microphone location. In some such examples, maximal values of $f\_n$ may indicate that the rendered audio be aggressively ducked or warped, or in the case that a value s_n is provided, that the audio be limited and ducked to achieve a speech-to-echo ratio of s_n. Medium values of f_n closer to 0.5 could in some embodiments indicate that only a moderate degree of render change is required, and that it may be appropriate to warp audio sources to these locations. Furthermore, in some implementations, low values of f_n may be regarded as not critical to attenuate. In some such implementations, f_n values at or below a threshold level may not be asserted. According to some examples, f_n values at or below a threshold level may correspond with locations to warp the rendering of audio content towards. In some instances, loudspeakers corresponding with f_n values at or below a threshold level may even be elevated in playback level in accordance with some later described processes.

According to some implementations, the foregoing method (or one of the alternative methods that are described below) may be used to create a control parameter for each of the selected audio processing changes for all selected audio devices, e.g., for each device of the audio environment, for one or more devices of the audio environment, for two or more devices of the audio environment, for three or more devices of the audio environment etc. The selection of audio processing changes may differ according to the particular implementation. For example, the decision may involve determining:

A set of two or more loudspeakers for which to change the audio processing; and

An extent to change the audio processing for the set of two or more loudspeakers. The extent of change may, in some examples, be determined in the context of a designed or determined range, which may be based at least in part on the capabilities of one or more loudspeakers in the set of loudspeakers. In some instances, the capabilities of each loudspeaker may include frequency response, playback level limits and/or parameters of one or more loudspeaker dynamics processing algorithms.

For example, a design choice may be that the best option in a particular circumstance is to turn a loudspeaker down. In some such examples, a maximum and/or minimum extent of audio processing changes may be determined, e.g., that the extent to which any loudspeaker will be turned down is limited to a particular threshold, e.g., 15 dB, 20 dB, 25 dB, etc. In some such implementations, the decision may be based on a heuristic or logic that selects one, two, three or more loudspeakers, and based on confidence of activity of interest, loudspeaker location, etc. the decision may be to duck the audio reproduced by the one, two, three or more loudspeakers by an amount in the range of a minimum and a maximum value, e.g., between 0 and 20 dB. The decision method (or system element) may, in some instances, create a set of activation potentials for each loudspeaker-equipped audio device.

In one simple example, the decision process may be as simple as determining that all audio devices other than one have rendering activation change 0, and determining that the one audio device has activation change 1. The design of the audio processing change(s) (e.g., duck) and the extent of the audio processing change(s) (e.g., time constants, etc.) may, in some examples, be independent of the decision logic. This approach creates a simple and effective design.

However, alternative implementations may involve selecting two or more loudspeaker-equipped audio devices and changing the audio processing for at least two, at least three (and, in some instances, all) of the two or more loudspeaker-equipped audio devices. In some such examples, at least one of the audio processing changes (e.g., a reduction in playback level) for a first audio device may be different from an audio processing change for a second audio device. The differences between the audio processing changes may, in some examples, be based at least in part on an estimated current location of the person or a microphone location relative to the location of each audio device. According to some such implementations, the audio processing changes may involve applying different speaker activations at different loudspeaker locations as part of changing the rendering process to warp a rendering of audio signals away from the estimated current location of a person of interest. The differences between the audio processing changes may, in some examples, be based at least in part on loudspeaker capabilities. For example, if the audio processing changes involve reducing the level of audio in the bass range, such changes may be applied more aggressively to an audio device that includes one or more loudspeakers that are capable of high-volume reproduction in the bass range.

We next describe the more details regarding audio processing change aspect, which may be referred to herein as the "rendering change" aspect. This disclosure may sometimes refer to this aspect as "turn nearest down" (e.g., reduce the volume at which audio content, to be played by the nearest one, two, three or more speakers, is rendered), though (as noted elsewhere herein) more generally, what may in many implementations be effected is one or more changes to the audio processing which is or are directed toward improving an overall estimation, measure and/or criterion of signal to echo ratio for ability to capture or sense the desired audio emitter (e.g., a person who has spoken a wakeword). In some cases, the audio processing changes (e.g., "turning down" the volume of rendered audio content) are or can be adjusted by some continuous parameter of the amount of the effect. For example, in the context of turning a loudspeaker down some implementations may be capable of applying an adjustable (e.g., continuously adjustable) amount of attenuation (dB). In some such examples, the adjustable amount of attenuation may have a first range (e.g., from 0-3 dB) for a just noticeable change and a second range (e.g., 0-20 dB) for a particularly effective improvement to SER but which may be quite noticeable to a listener.

In some embodiments which implement the noted schema (CONTEXT, DECISION, and RENDER or RENDERING CHANGE), there may not be a specific hard boundary of "nearest" (e.g., for a loudspeaker or device which is "nearest" to a user, or to another individual or system element), and without loss of generality a Rendering Change can be or include varying (e.g., continuously varying) one or more of the following:

A. Mode of changing the output to reduce the audio output from one or more audio devices, where the change(s) in audio output may involve one or more of:

i) decreasing the overall level of audio device output (turning one or more loudspeakers down, turning it or them off;

ii) shaping the spectrum of the output of one or more loudspeakers, e.g., with a substantially linear equalization (EQ) filter that is designed to produce an output that is different from the spectrum of the audio that we wish to detect. In some examples, if the output spectrum is being shaped in order to detect a human voice, a filter may turn down frequencies in the range of approximately 500-3 kHz (e.g., plus or minus 5% or 10% at each end of the frequency range), or shaping the loudness to emphasize low and high frequencies leaving space in the middle bands (e.g., in the range of approximately 500-3 kHz);

iii) changing the upper limits or peaks of the output to either lower the peak level and/or reduce distortion products which may additionally lower the performance of any echo cancellation that is part of the overall system creating the achieved SER for audio detection, e.g., a time domain dynamic range compressor or a multiband frequency-dependent compressor. Such audio signal modifications can effectively reduce the amplitude of an audio signal and can help limit the excursion of a loudspeaker;

iv) spatially steering the audio in a way that would tend to decrease the energy or coupling of the output of the one or more loudspeakers to one or more microphones at which the system (e.g., an audio processing manager) is enabling a higher SER, e.g., as in the "warping" examples that are described herein;

v) Using temporal time slicing or adjustments to create 'gaps' or periods of sparse time-frequency lower output sufficient to obtain glimpses of the audio, as in the gap insertion examples that are described below; and/or vi) Changing the audio in some combination of the above ways; and/or B. Preservation of Energy and/or creating continuity at a specific or broad set of listening locations, e.g., including one or more of the following:

i) In some examples, energy removed from one loudspeaker may be compensated for by providing additional energy in or to another loudspeaker. In some instances, the overall loudness remains the same, or essentially the same. This is not an essential feature, but may be an effective means of allowing more severe changes to the 'nearest' device's, or nearest set of devices', audio processing without the loss of content. However, continuity and/or preservation of energy may be particularly relevant when dealing with complex audio output and audio scenes; and/or ii) Time constants of activation, in particular that changes to audio processing may be applied a bit faster (e.g., 100-200 ms) than they are returned to the normal state (e.g., 1000-10000 ms) such that the change(s) in audio processing, if noticeable, seems deliberate, but the subsequent return from the change (s) may not seem to relate to any actual event or change (from the user's perspective) and, in some instances, may be slow enough to be barely noticeable.

Further examples of how context and decision could be formulated and determined are now presented.

Embodiment A (CONTEXT) As an example, the context information could be mathematically formulated as the following:

H(a, b), the approximate physical distance in meters between devices a and b:

$$H(a,b) \neq 0 \in \mathbb{R}$$

$$\forall a, b \in D$$

where D represents the set of all devices in the system. S, the estimated SER at each device, may be expressed as follows:

$$S(a) \in \mathbb{R} \; \forall a \in D$$

Determining H & S:

H is a property of the physical location of the devices, and thus may be determined or estimated by:

(1) A direct indication by the user, e.g., using a smartphone or tablet apparatus to mark or indicate the approximate locations of the devices on a floorplan or similar diagrammatic representation of the environment. Such digital interfaces are already commonplace in managing the configuration, grouping, name, purpose and identity of smart home devices. For example, such a direct indication may be provided via the Amazon Alexa smartphone application, the Sonos S2 controller application, or a similar application.

(2) Solving the basic trilateration problem using the measured signal strength (sometimes called the Received Signal Strength Indication or RSSI) of common wireless communication technologies such as Bluetooth, Wi-Fi, ZigBee, etc., to produce estimates of physical distance between the devices, e.g., as disclosed in J. Yang and Y. Chen, "Indoor Localization Using Improved RSS-Based Lateration Methods," *GLOBECOM 2009-2009 IEEE Global Telecommunications Conference*, Honolulu, HI, 2009, pp. 1-6, doi: 10.1109/GLOCOM.2009.5425237 and/or as disclosed in Mardeni, R. & Othman, Shaifull & Nizam, (2010) "Node Positioning in ZigBee Network Using Trilateration Method Based on the Received Signal Strength Indicator (RSSI)" 46, both of which are hereby incorporated by reference.

S(a) is an estimate of the speech-to-echo ratio at a device a. By definition, the speech to echo ratio in dB is given by:

$$S(a) = \widehat{\mu_{Sp}} - \widehat{\mu_E}$$

In the foregoing expression, $\widehat{\mu_{Sp}}$ represents an estimate of the speech energy in dB, and $\widehat{\mu_E}$ represents an estimate of the residual echo energy after echo cancellation, in dB. Various methodologies for estimating these quantities are disclosed herein, for example:

(1) Speech energy and residual echo energy may be estimated by an offline measurement process performed for a particular device, taking into consideration the acoustic coupling between the device's microphone and speakers, and performance of the on-board echo cancellation circuitry. In some such examples, an average speech energy level "AvgSpeech" may be determined by the average level of human speech as measured by the device at a nominal distance. For example, speech from a small number of people standing 1m away from a microphone-equipped device may be recorded by the device during production and the energy may be averaged to produce AvgSpeech. According to some such examples, an average residual echo energy level "AvgEcho" may be estimated by playing music content from the device during production and running the on-board echo cancellation circuitry to produce an echo residual signal. Averaging the energy of the echo residual signal for a small sample of music content may be used to estimate AvgEcho. When the device is not playing audio, AvgEcho may be instead set to a nominal low value, such as −96.0 dB. In some such implementations, speech energy and residual echo energy may be expressed as follows:

$$\widehat{\mu_{Sp}} = \text{AvgSpeech}_{dB}$$

$$\widehat{\mu_E} = \text{AvgEcho}_{dB}$$

(2) According to some examples, the average speech energy may be determined by taking the energy of the microphone signals corresponding to a user's utterance as determined by a voice-activity-detector (VAD). In some such examples, the average residual echo energy may be estimated by the energy of the microphone signals when the VAD is not indicating speech. If x represents device a's microphone pulse-code modulation (PCM) samples at some sampling rate, and V represents the VAD flag taking the value 1.0 for samples corresponding to voice activity, and 0.0 otherwise, speech energy and residual echo energy may be expressed as follows:

$$\hat{\mu_{Sp}} = 10 * \log 10 \left( \sum_n V[n] \times [n]^2 \right)$$

$$\hat{\mu_E} = 10 * \log 10 \left( \sum_n (1 - V[n]) \times [n]^2 \right)$$

(3) Further to the previous methods, in some implementations the energy in the microphone may be treated as a random variable and modelled separately based on the VAD determination. Statistical models Sp and E of the speech and echo energy respectively can be estimated using any number of statistical modelling techniques. Mean values in dB for both speech and echo for approximating S(a) may then be drawn from Sp and E respectively. Common methods of achieving this are found within the field of statistical signal processing, for example:

Assuming a Gaussian distribution of energy and computing biased second order statistics $\hat{\mu}$ and $\hat{\sigma}$.

Building a discretely-binned histogram of energy values to yield a potentially multimodal distribution, which after applying a step of expectation-maximization (EM) parameter estimation for a mixture model (e.g., a Gaussian mixture model), the largest mean value $\hat{\mu}$ belonging to any of the sub-distributions in the mixture may be used.

(DECISION) As noted elsewhere herein, in various disclosed implementations the decision aspect determines which devices receive an audio processing modification, such as a rendering modification, and in some embodiments an indication of how much modification is required for a desired SER improvement. Some such embodiments may be configured to improve the SER at the device with the best initial SER value, e.g., as determined by finding the maximum value of S over all the devices in the set D. Other embodiments may be configured to opportunistically improve SER at devices that are regularly addressed by users, determined based on historical usage patterns. Other embodiments may be configured to attempt to improve the SER at multiple microphone locations, e.g., selecting multiple devices for the purposes of the below discussion.

Once one or more microphone locations are determined, in some such implementations a desired SER improvement (SERI) could be determined as follows:

SERI=S(m)−TargetSER [dB]

In the foregoing expression, m represents the device/microphone location being improved, and TargetSER represents a threshold, which may be set by the application in use. For instance, a wake word detection algorithm may tolerate a lower operating SER than a large vocabulary speech recognizer. Typical values for a TargetSER may be in the order of −6 dB to 12 dB. As mentioned, if in some embodiments S(m) is not known or easily estimated, a pre-set value may suffice based on offline measurements of speech and echo recorded in a typical echoic room or setting. Some embodiments may determine the devices for which audio processing (e.g., rendering) is to be modified by specifying f_n ranging from 0 to 1. Other embodiments may involve specifying the degree to which audio processing (e.g., rendering) should be modified in units of speech to echo ratio improvement decibels, s_n, potentially computed according to:

$$s_n = \text{SERI} * f_n$$

Some embodiments may compute f_n directly from the device geometry, e.g., as follows:

$$f_n = 1 - \left( \frac{H(m, m)}{\max_{i \in D} H(m, i)} \right)^2$$

In the foregoing expression, m represents the index of the device that will be selected for the largest audio processing (e.g., rendering) modification, as noted above. Other implementations may involve other choices of easing or smoothing functions over the device geometry.

Embodiment B (Reference to User Zones)

In some embodiments, the context and decision aspects of the present disclosure will be made in the context of one or more user zones. As detailed later in this document, a set of acoustic features $W(j)=[w_1^T(j) \ldots w_N^T(j)]^T$ may be used to estimate posterior probabilities $p(C_k|W(j))$ for some set of zone labels $C_k$, for k={1 ... K}, for K different user zones in an environment. An association of each audio device to each user zone may be provided by the user themselves as part of the training process described within this document, or alternatively through the means of an application, e.g., the Alexa smartphone app or the Sonos S2 controller smartphone app. For instance, some implementations may denote the association of the $j^{th}$ device to the user zone with zone label $C_k$ as $z(C_k,n) \in [0,1]$. In some embodiments, both $z(C_k, n)$ and the posterior probabilities $p(C_k|W(j))$ may be considered context information. Some embodiments may instead consider the acoustic features W(j) themselves to be part of the context. In other embodiments, more than one of these quantities ($z(C_k,n)$, the posterior probabilities $p(C_k|W(j))$ and the acoustic features W(j) themselves) and/or a combination of these quantities may be part of the context information.

The decision aspect of various embodiments may use quantities related to one or more user zones in the device selection. Where both z and p are available, an example decision might be made as:

$$f_n = \max_k \left( z(C_k, n) p(C_k | W(j))^\delta \right) k = \{1 \ldots K\}$$

According to such embodiments, the devices with the highest association with the user zones most likely to contain the user will have the most audio processing (e.g., rendering) change applied to them. In some examples, δ may be a positive number in the range [0.5, 4.0]. According to some such examples, δ may be used to control the scope of a rendering change spatially. In such implementations, if δ is chosen to be 0.5, more devices will receive a larger rendering change, whereas a value of 4.0 will restrict the rendering change to only the devices most proximate to the most likely user zone.

The inventors also envisage another class of embodiments whereby the acoustic features W(j) are directly used in the decision aspect. For instance, if the wake-word confidence scores associated with utterance j are $w_n(j)$, a device selection could be made according to the following expression:

$$f_n = \left( \frac{w_n(j)}{\max_k w_k(j)} \right)^\delta k = \{1 \ldots K\}$$

In the foregoing expression, $\delta$ has the same interpretation as the previous example, and further has the utility of compensating for a typical distribution of wake-word confidences that might arise for a particular wake-word system. If most devices tend to report high wake-word confidences, $\delta$ can be selected to be a relatively higher number such as say, 3.0, to increase the spatial specificity of the rendering change application. If wake-word confidence tends to fall off rapidly as the user is located further away from the devices, $\delta$ can be chosen to be a relatively lower number such as 1.0 or even 0.5 in order to include more devices in the rendering change application. The reader will appreciate that in some alternative implementations, formulae similar to one above for acoustic features, such as an estimate of the speech level at the device's microphone, and/or the direct to reverb ratio of the user's utterance could be substituted for wake-word confidence.

Figure 2A:
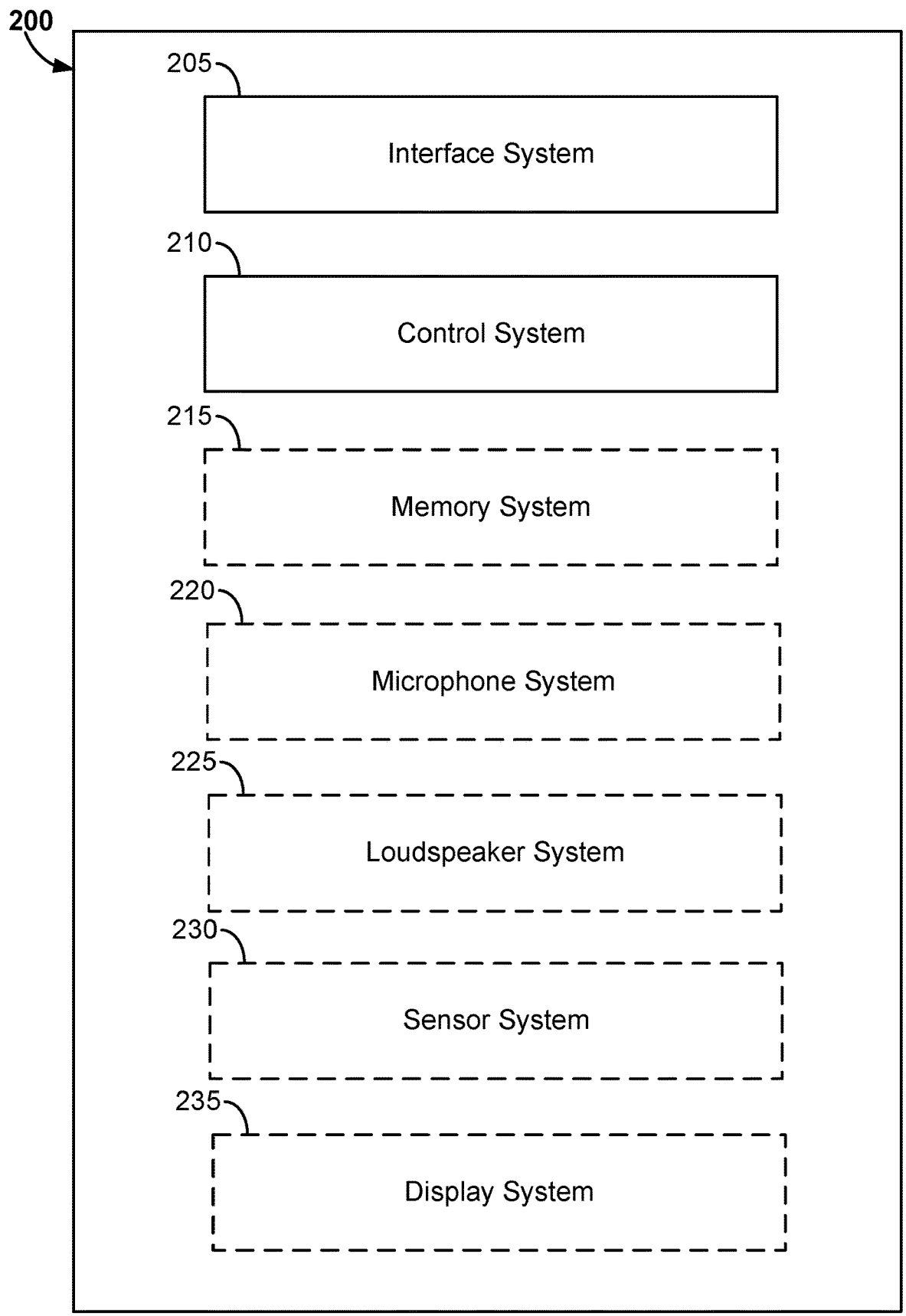
FIG. 2A is a block diagram that shows examples of components of an apparatus capable of implementing various aspects of this disclosure.

FIG. 2A is a block diagram that shows examples of components of an apparatus or system capable of implementing various aspects of this disclosure. As with other figures provided herein, the types and numbers of elements shown in FIG. 2A are merely provided by way of example. Other implementations may include more, fewer and/or different types and numbers of elements. According to some examples, the apparatus 200 may be, or may include, a device that is configured for performing at least some of the methods disclosed herein. In some implementations, the apparatus 200 may be, or may include, a smart speaker, a laptop computer, a cellular telephone, a tablet device, a smart home hub or another device that is configured for performing at least some of the methods disclosed herein. In some implementations the apparatus 200 may be configured to implement an audio session manager. In some such implementations the apparatus 200 may be, or may include, a server.

In this example, the apparatus 200 includes an interface system 205 and a control system 210. The interface system 205 may, in some implementations, be configured for communication with one or more devices that are executing, or configured for executing, software applications. Such software applications may sometimes be referred to herein as "applications" or simply "apps." The interface system 205 may, in some implementations, be configured for exchanging control information and associated data pertaining to the applications. The interface system 205 may, in some implementations, be configured for communication with one or more other devices of an audio environment. The audio environment may, in some examples, be a home audio environment. The interface system 205 may, in some implementations, be configured for exchanging control information and associated data with audio devices of the audio environment. The control information and associated data may, in some examples, pertain to one or more applications with which the apparatus 200 is configured for communication.

The interface system 205 may, in some implementations, be configured for receiving audio data. The audio data may include audio signals that are scheduled to be reproduced by at least some speakers of the audio environment. The audio data may include one or more audio signals and associated spatial data. The spatial data may, for example, include channel data and/or spatial metadata. The interface system 205 may be configured for providing rendered audio signals to at least some loudspeakers of the set of loudspeakers of the environment. The interface system 205 may, in some implementations, be configured for receiving input from one or more microphones in an environment.

The interface system 205 may include one or more network interfaces and/or one or more external device interfaces (such as one or more universal serial bus (USB) interfaces). According to some implementations, the interface system 205 may include one or more wireless interfaces. The interface system 205 may include one or more devices for implementing a user interface, such as one or more microphones, one or more speakers, a display system, a touch sensor system and/or a gesture sensor system. In some examples, the interface system 205 may include one or more interfaces between the control system 210 and a memory system, such as the optional memory system 215 shown in FIG. 2A. However, the control system 210 may include a memory system in some instances.

The control system 210 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 210 may reside in more than one device. For example, a portion of the control system 210 may reside in a device within one of the environments depicted herein and another portion of the control system 210 may reside in a device that is outside the environment, such as a server, a mobile device (e.g., a smartphone or a tablet computer), etc. In other examples, a portion of the control system 210 may reside in a device within one of the environments depicted herein and another portion of the control system 210 may reside in one or more other devices of the environment. For example, control system functionality may be distributed across multiple smart audio devices of an environment, or may be shared by an orchestrating device (such as what may be referred to herein as an audio session manager or a smart home hub) and one or more other devices of the environment. The interface system 205 also may, in some such examples, reside in more than one device.

In some implementations, the control system 210 may be configured for performing, at least in part, the methods disclosed herein. According to some examples, the control system 210 may be configured for implementing audio session management methods, which may in some instances involve determining one or more types of audio processing changes to apply to audio data being rendered to loudspeaker feed signals for two or more audio devices of the audio environment. According to some implementations, the audio processing changes may have the effect of increasing a speech to echo ratio at one or more microphones in the audio environment.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 215 shown in FIG. 2A and/or in the control system 210. Accordingly, various innovative aspects of the subject matter described in this disclosure can be implemented in one or more non-transitory media having software stored thereon. The software may, for example, include instructions for controlling at least one device for implementing audio session management methods. The software may, in some examples, include instructions for controlling one or more audio devices of the audio environment for obtaining, processing and/or providing audio data. The software may, in some examples, include instructions for determining one or more types of audio processing changes to apply to audio data being rendered to loudspeaker feed signals for two or more audio devices of the audio environment. According to some implementations, the audio processing changes may have the effect of increasing a speech to echo ratio at one or more microphones in the audio environment. The software may, for example, be executable by one or more components of a control system such as the control system 210 of FIG. 2A.

In some examples, the apparatus 200 may include the optional microphone system 220 shown in FIG. 2A. The optional microphone system 220 may include one or more microphones. In some implementations, one or more of the microphones may be part of, or associated with, another device, such as a speaker of the speaker system, a smart audio device, etc. In some examples, the apparatus 200 may not include a microphone system 220. However, in some such implementations the apparatus 200 may nonetheless be configured to receive microphone data for one or more microphones in an audio environment via the interface system 210.

According to some implementations, the apparatus 200 may include the optional loudspeaker system 225 shown in FIG. 2A. The optional speaker system 225 may include one or more loudspeakers. Loudspeakers may sometimes be referred to herein as "speakers." In some examples, at least some loudspeakers of the optional loudspeaker system 225 may be arbitrarily located. For example, at least some speakers of the optional loudspeaker system 225 may be placed in locations that do not correspond to any standard prescribed speaker layout, such as Dolby 5.1, Dolby 5.1.2, Dolby 7.1, Dolby 7.1.4, Dolby 9.1, Hamasaki 22.2, etc. In some such examples, at least some loudspeakers of the optional loudspeaker system 225 may be placed in locations that are convenient to the space (e.g., in locations where there is space to accommodate the loudspeakers), but not in any standard prescribed loudspeaker layout. In some examples, the apparatus 200 may not include the optional loudspeaker system 225.

In some implementations, the apparatus 200 may include the optional sensor system 230 shown in FIG. 2A. The optional sensor system 230 may include one or more cameras, touch sensors, gesture sensors, motion detectors, etc. According to some implementations, the optional sensor system 230 may include one or more cameras. In some implementations, the cameras may be free-standing cameras. In some examples, one or more cameras of the optional sensor system 230 may reside in a smart audio device, which may be a single purpose audio device or a virtual assistant. In some such examples, one or more cameras of the optional sensor system 230 may reside in a TV, a mobile phone or a smart speaker. In some examples, the apparatus 200 may not include a sensor system 230. However, in some such implementations the apparatus 200 may nonetheless be configured to receive sensor data for one or more sensors in an audio environment via the interface system 210.

In some implementations, the apparatus 200 may include the optional display system 235 shown in FIG. 2A. The optional display system 235 may include one or more displays, such as one or more light-emitting diode (LED) displays. In some instances, the optional display system 235 may include one or more organic light-emitting diode (OLED) displays. In some examples wherein the apparatus 200 includes the display system 235, the sensor system 230 may include a touch sensor system and/or a gesture sensor system proximate one or more displays of the display system 235. According to some such implementations, the control system 210 may be configured for controlling the display system 235 to present one or more graphical user interfaces (GUIs).

According to some examples the apparatus 200 may be, or may include, a smart audio device. In some such implementations the apparatus 200 may be, or may implement (at least in part), a wakeword detector. For example, the apparatus 200 may be, or may implement (at least in part), a virtual assistant.

Figure 2B:
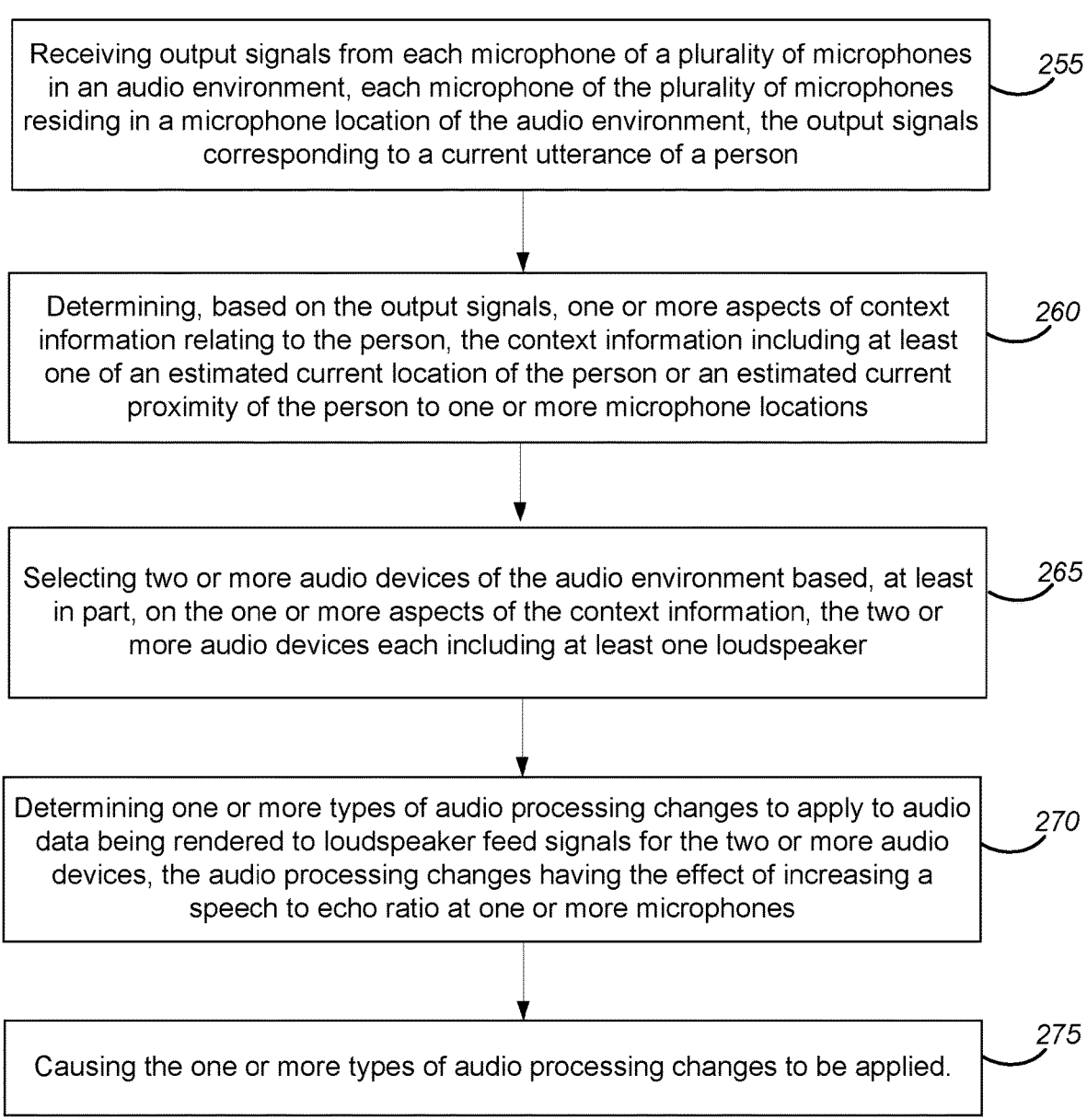
FIG. 2B is a flow diagram that includes blocks of an audio session management method according to some implementations.

FIG. 2B is a flow diagram that includes blocks of an audio session management method according to some implementations. The blocks of method 250, like other methods described herein, are not necessarily performed in the order indicated. In some implementation, one or more of the blocks of method 250 may be performed concurrently. Moreover, some implementations of method 250 may include more or fewer blocks than shown and/or described. The blocks of method 250 may be performed by one or more devices, which may be (or may include) a control system such as the control system 210 that is shown in FIG. 2A and described above, or one of the other disclosed control system examples. According to some implementations, the blocks of method 250 may be performed, at least in part, by a device that is implementing what may be referred to herein as an audio session manager.

According to this example, block 255 involves receiving output signals from each microphone of a plurality of microphones in an audio environment. In this example, each microphone of the plurality of microphones resides in a microphone location of the audio environment and the output signals include signals that correspond to a current utterance of a person. In some instances, the current utterance may be a wakeword utterance. However, the output signals also may include signals that correspond to times during which a person is not speaking. Such signals may, for example, be used to establish baseline levels of echoes, noise, etc.

In this example, block 260 involves determining, based on the output signals, one or more aspects of context information relating to the person. In this implementation, the context information includes an estimated current location of the person and/or an estimated current proximity of the person to one or more microphone locations. As noted above, the expression "microphone location" as used herein indicates a location of one or more microphones. In some examples, a single microphone location may correspond to an array of microphones that reside in a single audio device. For example, the microphone location may be a single location that corresponds to an entire audio device that includes one or more microphones. In some such examples, a microphone location may be a single location that corresponds to a centroid of a microphone array of a single audio device. However, in some instances a microphone location may be a location of a single microphone. In some such examples, an audio device may have only a single microphone.

In some examples, determining the context information may involve making an estimate of a user zone in which the person is currently located. Some such examples may involve determining multiple current acoustic features from the output signals of each microphone and applying a classifier to the multiple current acoustic features. Applying the classifier may, for example, involve applying a model trained on previously-determined acoustic features derived from a plurality of previous utterances made by the person in a plurality of user zones in the environment. In some such examples, determining one or more aspects of context information relating to the person may involve determining, based at least in part on output from the classifier, an estimate of a user zone in which the person is currently located. In some such examples, the estimate of the user zone may be determined without reference to geometric locations of the plurality of microphones. According to some examples, the current utterance and the previous utterances may be, or may include, wakeword utterances.

According to this implementation, block 265 involves selecting two or more audio devices of the audio environment based, at least in part, on the one or more aspects of the context information, the two or more audio devices each including at least one loudspeaker. In some examples, selecting two or more audio devices of the audio environment may involve selecting N loudspeaker-equipped audio devices of the audio environment, N being an integer greater than 2. In some instances, selecting two or more audio devices of the audio environment, or selecting N loudspeaker-equipped audio devices of the audio environment, may involve selecting all loudspeaker-equipped audio devices of the audio environment.

In some examples, selecting the two or more audio devices of the audio environment may be based, at least in part, on an estimated current location of the person relative to a microphone location and/or a loudspeaker-equipped audio device location. Some such examples may involve determining the closest loudspeaker-equipped audio device to the estimated current location of the person or to the microphone location closest to the estimated current location of the person. In some such examples, the two or more audio devices may include the closest loudspeaker-equipped audio device.

According to some implementations, selecting the two or more audio devices may be based, at least in part, on determining whether the signal-to-echo ratio estimation is less than or equal to a signal-to-echo ratio threshold.

According to this example, block 270 involves determining one or more types of audio processing changes to apply to audio data being rendered to loudspeaker feed signals for the two or more audio devices. In this implementation, the audio processing changes have the effect of increasing a speech to echo ratio at one or more microphones. In some examples, the one or more microphones may reside in multiple audio devices of the audio environment. However, according to some implementations, the one or more microphones may reside in a single audio device of the audio environment. In some examples, the audio processing change(s) may cause a reduction in loudspeaker reproduction level for the loudspeakers of the two or more audio devices.

According to some examples, at least one of the audio processing changes for a first audio device may be different from an audio processing change for a second audio device. For example, the audio processing change(s) may cause a first reduction in loudspeaker reproduction level for first loudspeakers of a first audio device and may cause a second reduction in loudspeaker reproduction level for second loudspeakers of a second audio device. In some such examples, the reduction in loudspeaker reproduction level may be relatively greater for the audio device having the greater proximity to the estimated current location of the person (or to the microphone location closest to the estimated current location of the person).

However, the inventors contemplate many types of audio processing changes that may be made in some instances. According to some implementations, the one or more types of audio processing changes may involve changing a rendering process to warp a rendering of audio signals away from the estimated current location of the person (or from the microphone location closest to the estimated current location of the person).

In some implementations, the one or more types of audio processing changes may involve spectral modification. For example, the spectral modification may involve reducing the level of audio data in a frequency band between 500 Hz and 3 KHz. In other examples, the spectral modification may involve reducing the level of audio data in a frequency band that has a higher maximum frequency and/or a lower minimum frequency. According to some implementations, the one or more types of audio processing changes may involve inserting at least one gap into at least one selected frequency band of an audio playback signal.

In some implementations, determining the one or more types of audio processing changes may be based on an optimization of a cost function that is based, at least in part, on a signal-to-echo ratio estimation. In some instances, the cost function may be based, at least in part, on rendering performance.

According to this example, block 275 involves causing the one or more types of audio processing changes to be applied. In some instances, block 275 may involve applying the one or more types of audio processing changes, by one or more devices that are controlling the audio processing in the audio environment. In other instances, block 275 may involve causing (e.g., via commands or control signals from an audio session manager) the one or more types of audio processing changes to be applied by one or more other devices of the audio environment.

Some implementations of method 250 may involve selecting at least one microphone according to the one or more aspects of the context information. In some such implementations, method 250 may involve selecting at least one microphone according to an estimated current proximity of the person to one or more microphone locations. Some implementations of method 250 may involve selecting at least one microphone according to an estimate of a user zone. According to some such implementations, method 250 may involve implementing, at least in part, virtual assistant functionality according to microphone signals received from the selected microphone(s). In some such implementations, method 250 may involve providing teleconference functionality that is based, at least in part, on microphone signals received from the selected microphone(s).

Some embodiments provide a system (including two or more devices, e.g., smart audio devices) which is configured to implement rendering and mapping, and is configured to use software or other manifestations of logic (e.g., to include a system element which implements the logic) for changing the audio processing for (e.g., turning down one, two or more of the nearest loudspeakers). The logic may implement a supervisor, such as a device configured to implement an audio session manager, that may, in some examples, run separately from system elements that are configured for rendering.

Figure 3A:
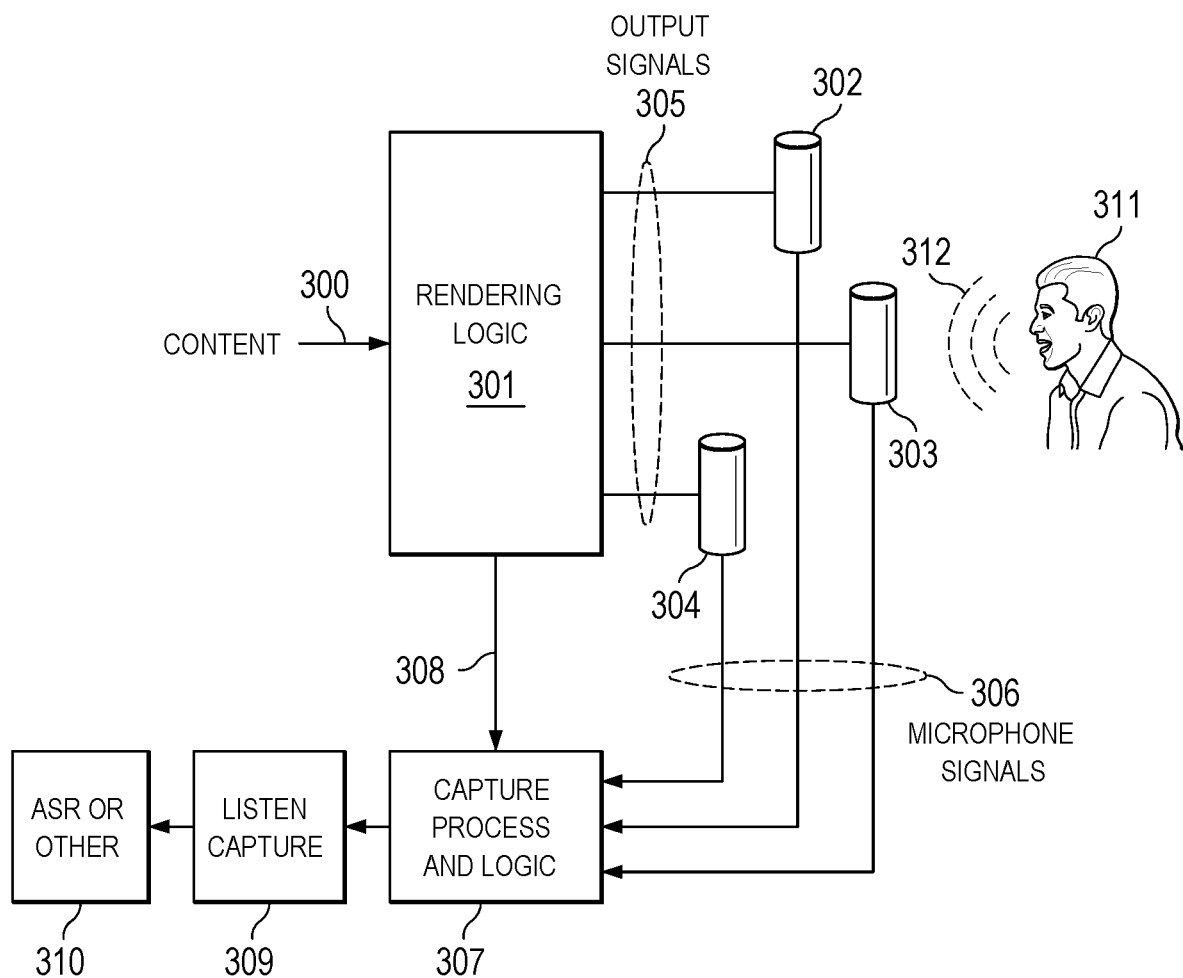
FIG. 3A is a block diagram of a system that is configured to implement separate rendering control and listening or capture logic across multiple devices.

FIG. 3A is a block diagram of a system that is configured to implement separate rendering control and listening or capture logic across multiple devices. The numbers, types and arrangement of elements shown in FIGS. 3A-3C, as with other disclosed figures, are merely examples. Other implementations may include more, fewer and/or different types of elements. For example, other implementations may include more than three audio devices, different types of audio devices, etc.

Figure 3B:
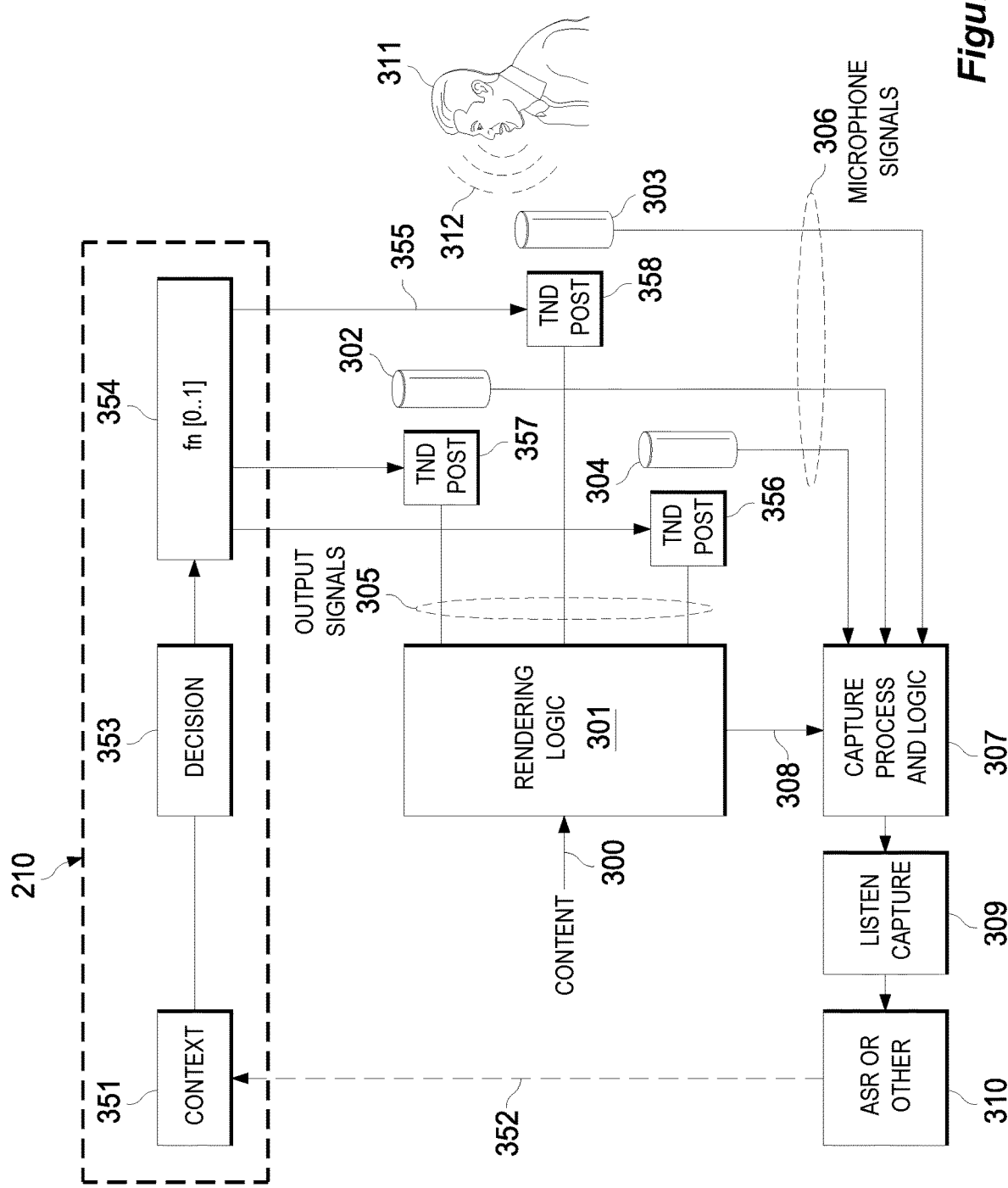
FIG. 3B is a block diagram of a system according to another disclosed implementation.
Figure 3C:
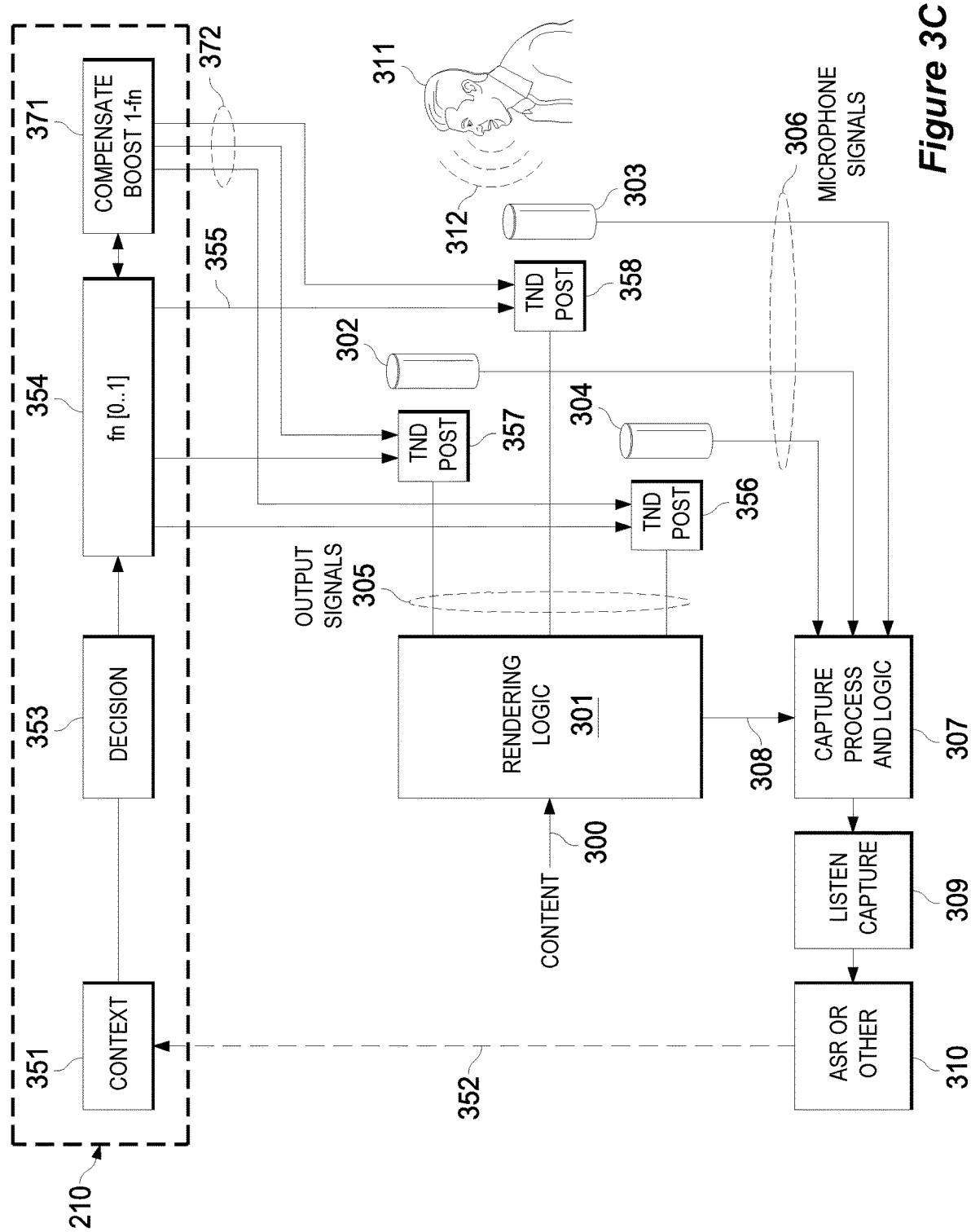
FIG. 3C is a block diagram of an embodiment configured to implement an energy balancing network according to one example.

The modules shown in FIGS. 3A-3C, as with others shown and described in this disclosure, may be implemented via hardware, software, firmware, etc., depending on the particular example. In some implementations, one or more of the disclosed modules (which may in some instances be referred to herein as "elements") may be implemented via a control system such as the control system 210 that is described above with reference to FIG. 2A. In some such examples, one or more of the disclosed modules may be implemented according to software that is executed by one or more such control systems.

Elements of FIG. 3A include:

Audio devices 302, 303, and 304 (which may, in some examples, be smart audio devices). According to this example, each of the audio devices 302, 303, and 304 includes at least one loudspeaker and at least one microphone;

Element 300 represents is a form of content, including audio data, that is to be played across one or more of the audio devices 302, 303 and 304. The content 300 may be linear or interactive content, depending on the particular implementation;

Module 301 is configured for audio processing, including but not limited to rendering according to rendering logic. For example, in some embodiments the module 301 may be configured simply to replicate audio of the content 300 (e.g., mono or stereo) to all three of the audio devices 302, 303 and 304 equally. In some alternative implementations, one or more of the audio devices 302, 303 and 304 may be configured to implement audio processing functionality, including but not limited to rendering functionality;

Element 305 represents the signals distributed out to the audio devices 302, 303, and 304. In some examples, the signals 305 may be, or may include, speaker feed signals. As noted above, in some implementations the functionality of the module 301 may be implemented via one or more of the audio devices 302, 303 and 304, in which case the signals 305 may be local to one or more of the audio devices 302, 303 and 304. However, they are shown in FIG. 3A as a set of speaker feed signals, since some embodiments (e.g., as described below with reference to FIG. 4) implement a simple final interception or post processing of the signals 305;

Element 306 represents raw microphone signals captured by microphones of the audio devices 302, 303 and 304.

Module 307 is configured to implement microphone signal processing logic and, in some examples, microphone signal capturing logic. Because in this example each of the audio devices 302, 303 and 304 has one or more microphones, the captured raw signals 306 are processed by the module 307. In some implementations, as here, the module 307 may be configured to implement echo cancellation and/or echo detection functionality.

Element 308 represents local and/or global echo reference signals that are supplied by the module 301 to the module 307. According to this example, the module 307 is configured to implement the echo cancellation and/or echo detection functionality according to the local and/or global echo reference signals 308. In some implementations, the microphone capture processing and/or processing of raw microphone signals may be distributed with local echo cancellation and or detection logic on each of the audio devices 302, 303, and 304. The particular implementation of capture and capture processing is not material to the concept of calculating and understanding the impact of any changes to rendering on the overall SER and efficacy of the capture processing and logic;

Module 309 is a system element which implements an overall mix or combination of the captured audio (e.g., for the purpose of causing the desired audio to be perceived as emitting from a particular single or broad location). In some implementations, the module 307 may also provide the mixing functionality of the element 309; and Module 310 is a system element which implements the final aspect of processing the detected audio in order to make some decision about what is being said or if there is an activity of interest taking place in the audio environment. Module 310 may, for example, provide automatic speech recognition (ASR) functionality, background noise level and/or type sensing functionality, e.g., for context regarding what people are doing in the audio environment, what the overall noise levels are in the audio environment, etc. In some implementations, some or all of the functionality of the module 310 may be implemented outside of the audio environment in which the audio devices 302, 303, and 304 reside, e.g., in one or more devices (e.g., one or more servers) of a cloud-based service provider.

FIG. 3B is a block diagram of a system according to another disclosed implementation. In this example, the system shown in FIG. 3B includes the elements of the system of FIG. 3A and extends the FIG. 3A system to include functionality in accordance with some disclosed embodiments. The FIG. 3B system includes elements for implementing aspects of CONTEXT, DECISION and RENDERING ACTION, as applied to an operating distributed audio system. According to some examples, feedback to elements for implementing the aspects of CONTEXT, DECISION and RENDERING ACTION may cause either an increase in confidence if there is activity (e.g., detected speech), or the ability to confidently decrease the sense of activity (low likelihood of activity) and therefore return the audio processing to its initial state.

Elements of FIG. 3B include the following:

Module 351 is a system element which represents (and implements) the step of CONTEXT, e.g., to obtain an indication of a location from which it may be desired to detect audio better (e.g., to increase a speech to echo ratio at one or more microphones), and the likelihood or sense that we want to listen (e.g., the likelihood that speech, such as a wakeword or a command, may be captured by the one or more microphones). In this example, the modules 351 and 353 are implemented via a control system, which is the control system 210 of FIG. 2A in this instance. In some implementations, blocks 301 and 307 also may be implemented by a control system, which in some instances may be the control system 210. According to some implementations, blocks 356, 357 and 358 also may be implemented by a control system, which in some instances may be the control system 210;

Element 352 represents a feedback path to module 351. The feedback 352 is provided by module 310 in this example. In some embodiments, the feedback 352 may correspond to the results of audio processing (such as audio processing for ASR) from the capture of microphone signals that may be relevant to determining the context—e.g., the sense of a weak or early detection of wakeword or some low detection of speech activity may be used to start rising the confidence or sense of the context wanting to improve listening (e.g., to increase a speech to echo ratio at one or more microphones);

Module 353 is a system element in (or by) which the decision is formed regarding for which of the audio devices to change audio processing and by what amount. Depending on the particular implementation, the module 353 may or may not use specific audio device information, such as the type and/or capabilities of the audio device (e.g., loudspeaker capabilities, echo suppression capabilities, etc.), the likely orientation of the audio device, etc. As described in some examples below, the decision-making process(es) of the module 353 may be very different for a headphone device as compared to a smart speaker or other loudspeaker;

Element 354 is the output of the module 353, which in this example is a set of control functions, represented in FIG. 3B as f_n values, to individual rendering blocks via the control path 355, which also may be referred to as the signal path 355. The set of control functions may be distributed (e.g., via wireless transmission) such that this signal path 355 is local to the audio environment. In this example, control functions are provided to the modules 356, 357, and 358; and Modules 356, 357, and 358 are system elements that are configured to effect a change in audio processing, potentially including but not limited to the output rendering (the RENDER aspect of some embodiments). In this example, the modules 356, 357, and 358 are controlled in activation by the control functions (in this example, the f_n values) of output 354. In some implementations, the functionality of the modules 356, 357, and 358 may be implemented via block 301.

In the FIG. 3B embodiment and other implementations, a virtuous cycle of feedback may occur. If the output 352 of element 310 (which may implement automatic speech recognition or ASR in some instances) detects speech, even weakly (e.g., with low confidence), according to some examples the CONTEXT element 351 may estimate a location based on which microphone(s) captured sound in the audio environment(e.g., which microphone(s) had the most energy other than echo). According to some such examples, the DECISION block 353 may select one, two, three or more loudspeakers of the audio environment and may activate a small value relating to a change in render (e.g., f_n=0.25). In the case of an overall 20 dB duck, this value would then enact a volume reduction at the device(s) selected of around 5 dB which may just be noticeable to the average human listener. The reduction(s) in level may be less noticeable when combined with time constants and/or event detection, and with other loudspeakers of the audio environment reproducing similar content. In one example, it may be audio device 303 (the audio device nearest to the person 311 who is speaking) that is turned down. In other examples, audio devices 302 and 303 may both be turned down, in some instances by different amounts (e.g., depending on an estimated proximity to the person 311). In other examples, audio devices 302, 303 and 304 may all be turned down, in some instances by different amounts. As a result of reducing the level of playback by one or more loudspeakers of one or more of the audio devices 302, 303 and 304, a speech to echo ratio may be increased at one or more microphones near the person 311 (e.g., one or more microphones of the audio device 303). Accordingly, the system can now "hear" the person 311 better if the person 311 continues to speak (e.g., to repeat the wakeword or to utter a command). In some such implementations, during the next time interval (e.g., during the next few seconds) and, in some instances in a continuous fashion, the system (e.g., an audio session manager that is implemented, at least in part, via blocks 351 and 353) may quickly trend towards turning the volume of one or more loudspeakers near the person 311 off, e.g., by selecting f_2=1.

FIG. 3C is a block diagram of an embodiment configured to implement an energy balancing network according to one example. FIG. 3C is a block diagram of a system which includes the elements of the system of FIG. 3B, and which extends the FIG. 3B system to include elements (e.g., element 371) for implementing the compensation of energy (e.g., to 'turn the other devices up a little').

In some examples, a device configured for audio session management (an audio session manager) of the FIG. 3C system (or a system such as that of FIG. 3C) may evaluate the banded energy at the listener (311) that is lost due to the effect of the audio processing (e.g., the reduction in level of one or more selected loudspeakers (e.g., the loudspeakers of audio devices receiving control signals wherein f_n>0) that is applied to increase the speech to echo ratio at one or more microphones). Then, the audio session manager may apply a boost in level and/or some other form of energy balancing to other speakers of the audio environment in order to compensate for the SER-based audio processing changes.

Quite often when we are rendering content that is somewhat related and there are audio components that are correlated or spectrally similar being reproduced by multiple loudspeakers of an audio environment (the simple example being mono) then it may not be necessary to do much energy balancing. For example, if there were 3 loudspeakers in the audio environment with distances ranging in ratio from 1 to 2, 1 being the closest, then turning down the nearest loudspeaker by 6 dB if there is identical content being reproduced by the loudspeakers will only have a 2-3 dB impact. And turning the nearest loudspeaker off may only have 3-4 dB overall impact in the sound at the listener.

In more complex situations (of, for example, insertion of gaps or spatial steering), in some examples the form of energy preservation and perceptual continuity may be a more multi-factor energy balance.

In FIG. 3C, element(s) for implementing CONTEXT may, in some examples, be just the audio level (reciprocity of proximity) of the wakeword weak detect. In other words, one example of determining CONTEXT may be based on the level of whatever wakeword utterance is detected through the detected echo. Such methods may or may not involve actually determining a speech to echo ratio, depending on the particular implementation. However, simply detecting and evaluating the level of a wakeword utterance that is detected at each of multiple microphone locations may provide a sufficient level of CONTEXT in some examples.

Examples of methods implemented by system elements for implementing CONTEXT (e.g., in the FIG. 3C system) may include, but are not limited to, the following:

On detection of a partial wakeword, the proximity to microphone-equipped audio devices may be inferred from the wakeword confidence. The timing of a wakeword utterance may also inferred from the wakeword confidence; and Some audio activity may be detected over and above the echo cancellation and suppression that is applied to raw microphone signals. Some implementations may use a set of energy levels and classifications to determine how likely the audio activity is to be voice activity (Voice Activity Detection). This process may determine the confidence or likelihood of voice activity. The location of a voice may be based on the probability of the best microphone for similar situations of interaction. For example, a device that is implementing an audio session manager may have prior knowledge that one microphone-equipped audio device is closest to the user, such as a table top device that is at or near a common location of the user, rather than a wall-installed device that is not near a common location of the user.

An example embodiment of a system element for implementing DECISION (e.g., in the FIG. 3C system) is an element that is configured for determining a confidence value regarding voice activity and for determining which is the nearest microphone-equipped audio device.

In the FIG. 3C system (and other embodiments), the amount of audio processing change(s) to apply in order to increase the SER at a location may be a function of distance and confidence regarding voice activity.

Examples of methods for implementing RENDERING (e.g., in the FIG. 3C system) include:

Just a dB turn down; and/or

Speech band equalization (EQ) (e.g., as described below with reference to FIG. 4); and/or Time modulation of the change in rendering (as described with reference to FIG. 5); and/or Using temporal time slicing or adjustments to create (e.g., insert in audio content) "gaps" or periods of sparse time-frequency lower output sufficient to obtain glimpses of the audio of interest. Some examples are described below with reference to FIG. 9.

FIG. 4 is a graph that illustrates examples of audio processing that may increase a speech to echo ratio at one or more microphones of an audio environment. The graph of FIG. 4 provides examples of spectral modification. In FIG. 4, the spectral modification involves reducing the level of frequencies that are known to correspond to speech, which in these examples are frequencies in the range of approximately 200 Hz and 10 KHz (e.g., within 5% or 10% of the upper and/or lower frequency of the range). Other examples may involve reducing the level of frequencies in a different frequency band, e.g., between approximately 500 Hz and 3 KHz (e.g., within 5% or 10% of the upper and/or lower frequency of the range). In some implementations, frequencies outside of this range may be reproduced at a higher level, in order to at least partially compensate for the reduction in loudness caused by the spectral modification.

Elements of FIG. 4 include:

601: a curve representing a flat EQ;

602: a curve representing a partial attenuation of the indicated frequency range. Such a partial attenuation may have a relatively low noticeability but may nonetheless have a useful impact on speech detection; and 603: a curve representing a significantly greater attenuation of the indicated frequency range. A spectral modification like that represented by the curve 603 may have high impact on hearing speech. In some instances, an aggressive spectral modification like that represented by the curve 603 may provide an alternative to significantly reducing the level of all frequencies.

In some examples, an audio session manager may cause audio processing changes that correspond with a time-varying spectral modification, such as a sequence represented by the curves 601, 602 and 603.

According to some examples, one or more spectral modifications may be used in the context of other audio processing changes, such as the context of rendering changes to cause a "warping" of reproduced audio away from a location, such as an office, a bedroom, a sleeping baby, etc. The spectral modification(s) used in connection with such warping may, for example, reduce levels in the bass frequency range, e.g., in the range of 20-250 Hz.

FIG. 5 is a graph that illustrates another type of audio processing that may increase a speech to echo ratio at one or more microphones of an audio environment. In this example, the vertical axis represents "f" values ranging from 0 to 1 and the horizontal axis represents time, in seconds. FIG. 5 is a diagram of trajectory (indicated by curve 701) over time of the activation of a rendering effect. In some examples, one or more of the modules 356, 357 or 358 may implement the type of audio processing that is represented in FIG. 5. According to this example, the asymmetry of the time constant (indicated by curve 701) indicates that the system modulates to the controlled value (f_n) in a short time (e.g., 100 ms to 1 second) but relaxes much more slowly (e.g., 10 seconds or more) from the value f_n (also identified as the value 703) back to zero. In some examples, the time interval between 2 seconds and N seconds may be multiple seconds, e.g., in the range of 4 to 10 seconds.

Also shown FIG. 5 is a second activation curve 702 that has a staircase shape with a maximum value equal to f_n in this example. According to this implementation, the steps up correspond with sudden changes in level of the content itself, e.g., voice onset or syllable rate.

As noted above, in some implementations temporal time slicing or frequency adjustments can create (e.g., by inserting the gaps into audio content) "gaps" or periods of sparse time-frequency output sufficient to obtain glimpses of the audio of interest (e.g., increasing or decreasing the extent of "gappiness" of the audio content and perception thereof).

Figure 6:
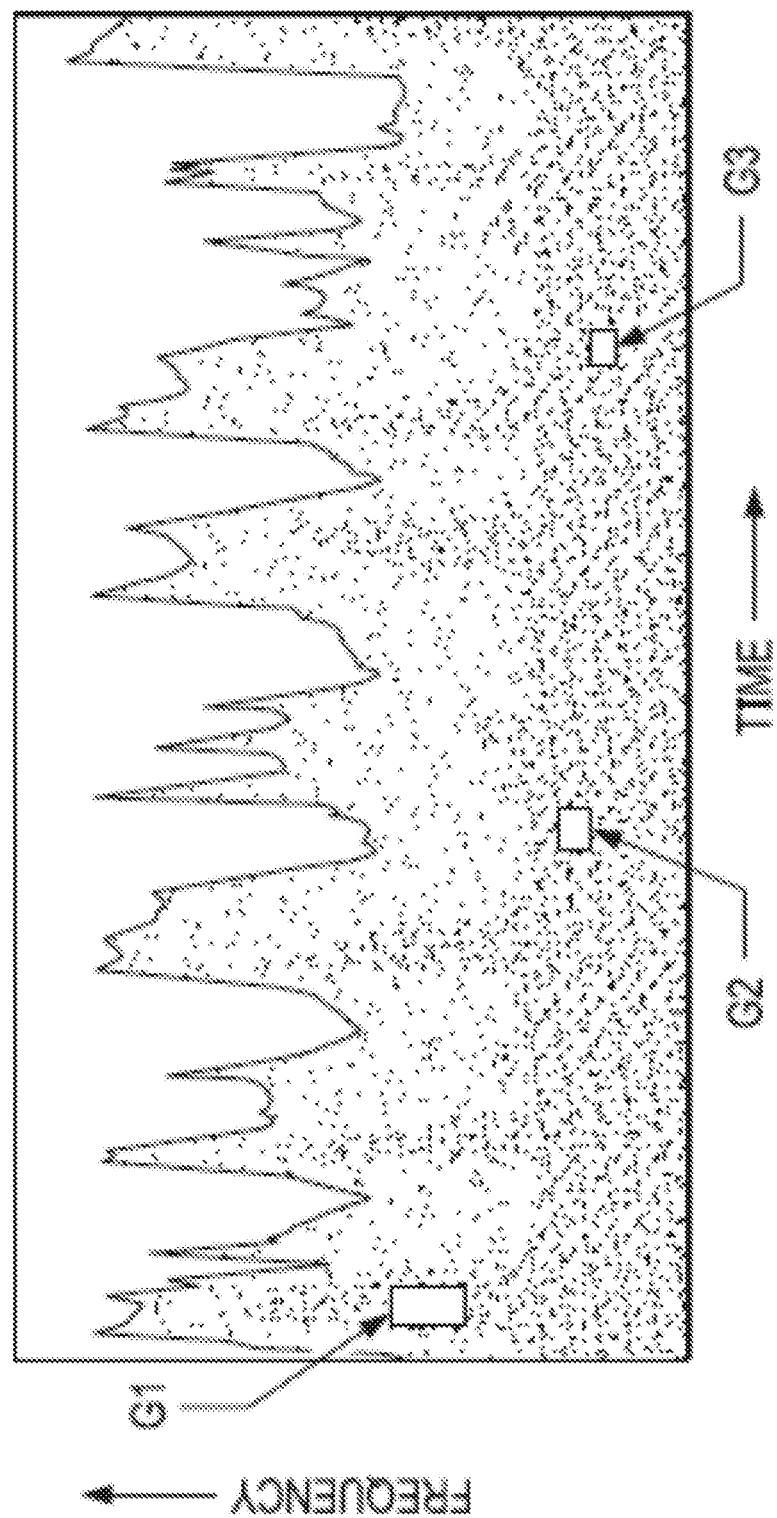
FIG. 6 illustrates another type of audio processing that may increase a speech to echo ratio at one or more microphones of an audio environment.

FIG. 6 illustrates another type of audio processing that may increase a speech to echo ratio at one or more microphones of an audio environment. FIG. 6 is an example of a spectrogram of a modified audio playback signal, into which forced gaps have been inserted according to one example. More specifically, to generate the spectrogram of FIG. 6, forced gaps G1, G2, and G3 were inserted in frequency bands of a playback signal, thereby generating the modified audio playback signal. In the spectrogram shown in FIG. 6, position along the horizontal axis indicates time and position along the vertical axis indicates frequency of the content of the modified audio playback signal at an instant of time.

The density of dots in each small region (each such region centered at a point having a vertical and horizontal coordinate) indicates energy of the content of the modified audio playback signal at the corresponding frequency and instant of time (denser regions indicate content having greater energy, and less dense regions indicate content having lower energy). Thus, the gap G1 occurs at a time (i.e., in a time interval) earlier than the time at which (or the time interval in which) gap G2 or G3 occurs, and gap G1 has been inserted in a higher frequency band than the frequency band in which gap G2 or G3 has been inserted.

Introduction of a forced gap into a playback signal is distinct from simplex device operation in which a device pauses a playback stream of content (e.g., in order to better hear the user and the user's environment). Introduction of forced gaps into a playback signal in accordance some disclosed embodiments may be optimized to significantly reduce (or eliminate) the perceptibility of artifacts resulting from the introduced gaps during playback, preferably so that the forced gaps have no or minimal perceptible impact for the user, but so that the output signal of a microphone in the playback environment is indicative of the forced gaps (e.g., so the gaps can be exploited to implement a pervasive listening method). By using forced gaps which have been introduced in accordance with some disclosed embodiments, a pervasive listening system may monitor non-playback sound (e.g., sound indicative of background activity and/or noise in the playback environment) even without the use of an acoustic echo canceller.

According to some examples, gaps may be inserted in the time spectral output from a single channel, which can create a sparse sense of improved listening ability to "hear through the gaps."

Figure 7:
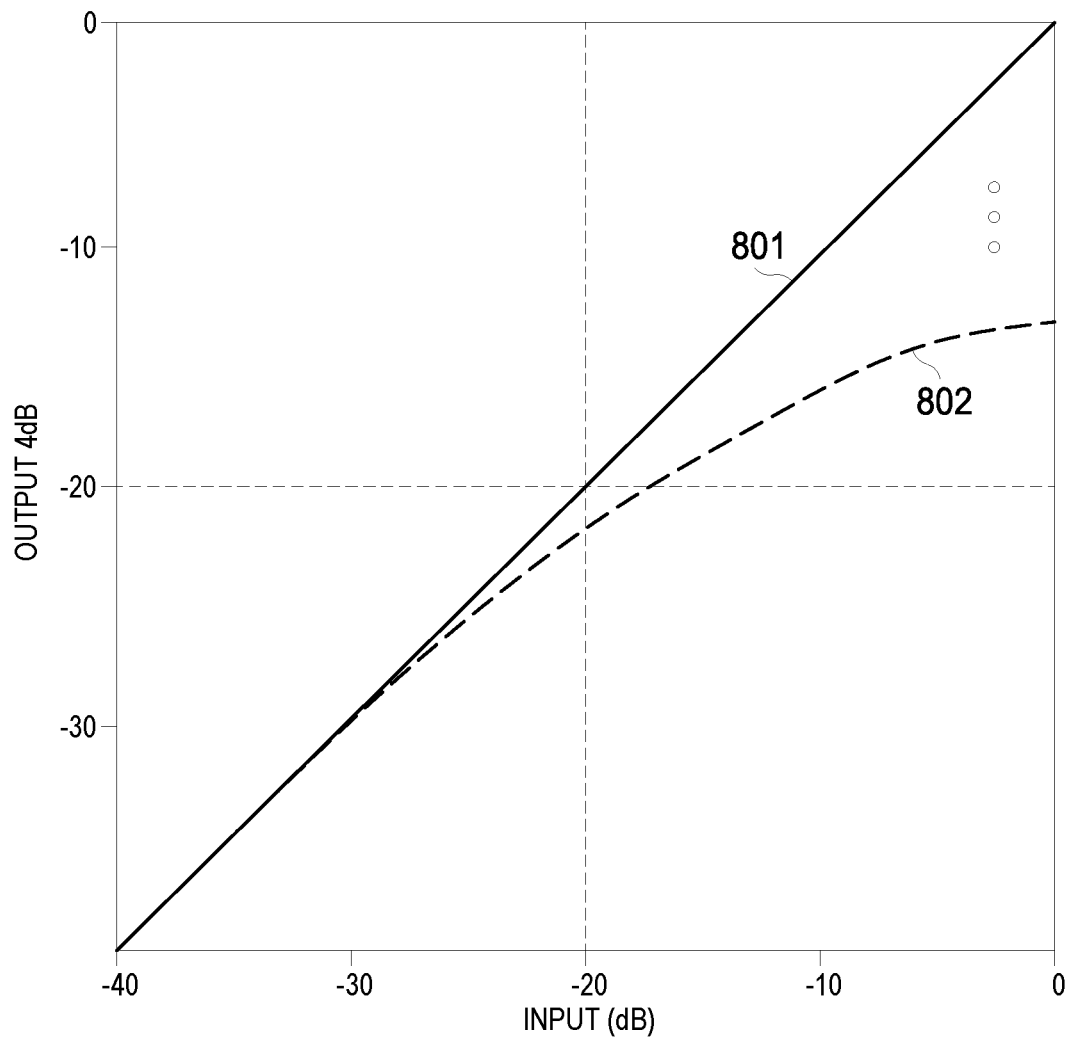
FIG. 7 is a graph that illustrates another type of audio processing that may increase a speech to echo ratio at one or more microphones of an audio environment.

FIG. 7 is a graph that illustrates another type of audio processing that may increase a speech to echo ratio at one or more microphones of an audio environment. In this embodiment, the audio processing changes involve dynamic range compression.

This example involves a transition between two extremes of dynamic range limiting. In one case, represented by the curve 801, the audio session manager causes no dynamic range control to be applied, whilst in the other case, represented by the curve 802, the audio session manager causes a relatively aggressive limiter to be applied. A limiter corresponding to the curve 802 could reduce the peaks of audio output by 10 dB or more. According to some examples, a compression ratio may be of no more than 3:1. In some implementations, the curve 802 (or another dynamic range compression curve) may include a knee at −20 dB, or approximately −20 dB (e.g., within +/−1 dB, within +/−2 dB, within +/−3 dB, etc.) from the peak output of the device.

Next, we describe another example of an embodiment of system elements for implementing RENDERING (audio processing changes having the effect of increasing a speech to echo ratio at one or more microphones, e.g., in the FIG. 3B or the FIG. 3C system). In this embodiment, energy balancing is performed. As noted above, in one simple example, an audio session manager may evaluate the banded energy of audio at the listener's location or zone that is lost due to the effect of other audio processing changes for increasing SER at one or more microphones of an audio environment. Then, the audio session manager may add a boost into the other speakers that makes up for this lost energy at the listener's location or zone.

Quite often when we are rendering content that is somewhat related and there are components that are correlated or spectrally similar in multiple devices (the simple example being mono) then it may not be necessary to do much at all. For example, if there were 3 loudspeakers with distances ranging in ratio from 1 to 2, 1 being the closest, then turning down the nearest loudspeaker by 6 dB (if identical content is being reproduced by the loudspeakers) will only have a 2-3 dB impact. And turning the nearest loudspeaker off will possibly only have 3-4 dB overall impact in the sound at the listener's location.

We next describe aspects of additional embodiments.

1. Second Order Factors in Defining 'Nearest'

As the following two examples will illustrate, the measure of "proximity" or "nearest" may not be a simple measure of distance, but instead may be a scalar ranking that involves an estimated speech to echo ratio. If the audio devices of an audio environment are not identical, each loudspeaker-equipped audio device may have a different coupling from its loudspeaker(s) to its own microphone(s), having a strong influence on the echo level in the ratio. Also, the audio devices may have different arrangements of microphones that are relatively more or relatively less suitable for listening, e.g., for detecting sound from a particular direction, for detecting sound in or from a particular location of the audio environment. Accordingly, in some implementations the calculation (DECISION) may factor in more than proximity and reciprocity of hearing.

Figure 8:
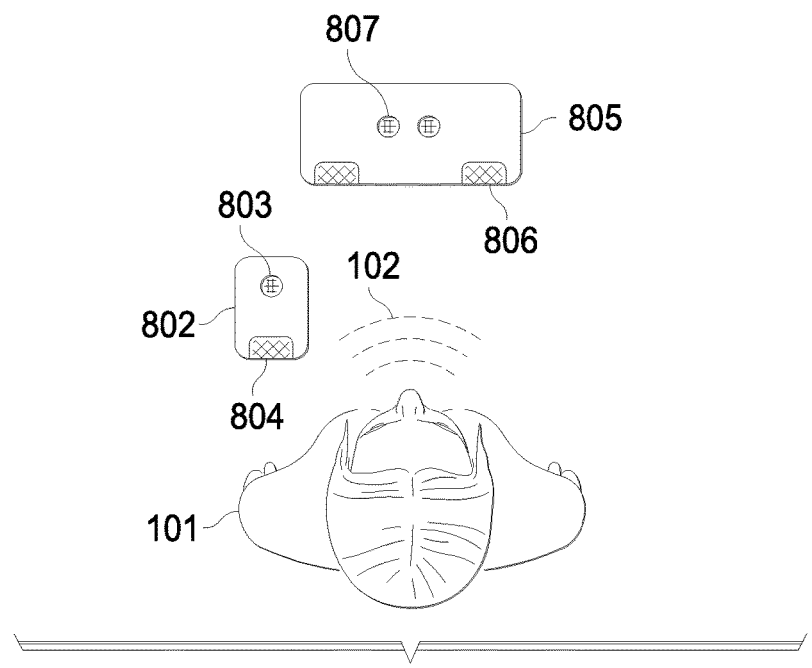
FIG. 8 is a diagram of an example in which an audio device to be turned down may not be the audio device that is closest to a person who is speaking.

FIG. 8 is a diagram of an example in which an audio device to be turned down may not be the audio device that is closest to a person who is speaking. In this example, the audio device 802 is relatively closer to the speaking person 100 than the audio device 805. According to some examples, in situations like that shown in FIG. 8, an audio session manager may consider the different baseline SER and audio device characteristics and turn down the device(s) with the best cost/benefit ratio of the impact of a decrease in output to the audio presentation, versus the benefit of turning down the output to better capture the speech of the person 101.

FIG. 8 shows an example in which there may be complexity and utility in a more functional measure of "nearest." In this instance, there is a person 101 making a sound (the speech 102) that the audio session manager is configured to capture and two audio devices 802 and 805, both with loudspeakers (806 and 804) and microphones (803 and 807). Given that the microphone 803 is so close to the loudspeaker 804 on the audio device 802 that is closer to the person 101, there may be no amount of turning down of the loudspeaker of this device that would yield a viable SER. In this example, the microphones 807 on the audio device 805 are configured for beam forming (yielding on average a more favourable SER), and therefore turning down the loudspeakers of the audio device 805 would have less impact than turning down the loudspeakers of the audio device 802. In some such examples, the optimal DECISION would be to turn down the loudspeakers 806.

Another example will be described with reference to FIG. 9. In this case we consider perhaps the most significant difference in baseline SER that would occur on two devices: one a pair of headphones, and the other a smart speaker.

Figure 9:
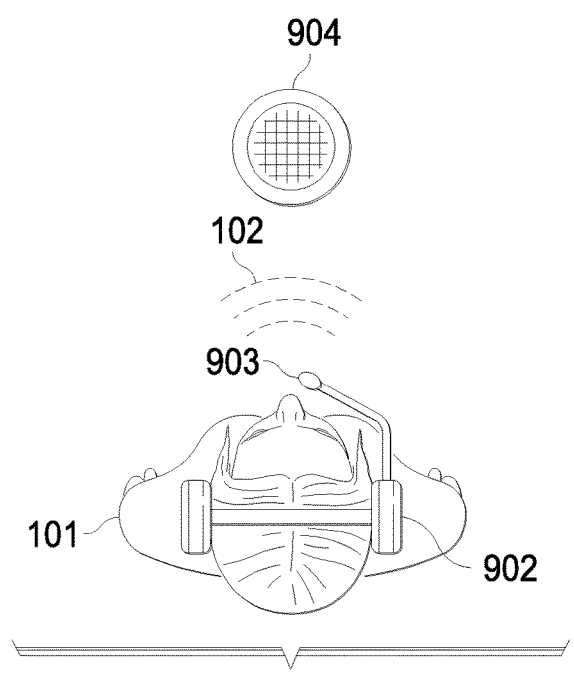
FIG. 9 illustrates a situation in which a very high SER device is very near the user.

FIG. 9 illustrates a situation in which a very high SER device is very near the user. In FIG. 9, the user 101 is wearing headphones 902 and speaking (emitting sound 102 in a way that is captured by both the microphone 903 on the headphones 902 and also by microphones of a smart speaker device 904. In this case, the smart speaker device 904 may also be making some sound to match the headphones (e.g., near/far rendering for immersive sound). Clearly the headphones 902 are the nearest output device to the user 101, however there is almost no echo path from the headphones to the nearest microphone 903, hence the SER for this device would be very high, and huge impact if the device was turned down as the headphones are almost the entire rendering effect to the listener. In this case, turning down the smart speaker 904 would be more beneficial, though only marginally and against the change for overall rendering (other listeners nearby hearing the sound), there may be no actual action decided—in that turning down a speaker, or otherwise changing the audio processing parameters, that could improve the SER of the user pickup in a way that would change the audio provided in the audio environment for the better—in some sense, it is already quite functional due to the inherent device SER in the headphones.

Regarding devices with multiple speakers and distributed microphones, beyond a certain size, we can in some circumstances consider a single audio device with many speakers and many microphones as a constellation of separate devices that just happen to be rigidly connected. In this case, the decision to turn down may apply to individual speakers. Accordingly, in some implementations an audio session manager may consider this type of audio device to be a set of individual microphones and loudspeakers, whereas in other examples an audio session manager may consider this type of audio device to be one device with composite speaker and microphone arrays. Also, it can be seen that there is a duality between treating the speakers on a single device as individual devices and the idea that in a single multi-loudspeaker audio device one approach for rendering is spatial steering, which necessarily imparts a differential change to the outputs of the loudspeakers on a single audio device.

Regarding secondary effects of the nearest audio device(s) avoiding sensitivity of spatial imaging from audio devices that are close to a moving listener, in many cases, even with a loudspeaker being near the moving listener, it may not make sense to reproduce specific audio objects or rendering material out of the nearest loudspeaker(s). This is simply related to the fact that the loudness of the direct audio path changes directly as $1/r^2$, where r is the distance over which the sound propagates, and as a loudspeaker becomes close to any listener (r->0) the stability of the level of sounds being reproduced by this loudspeaker, relative to the overall mix, becomes poor.

In some such instances it may be advantageous to implement an embodiment in which (for example):
CONTEXT is some general listening area (e.g., a couch near a television) in which it is presumed to be always useful to be able to hear the audio for a program that someone is watching on the television;
DECISION: for a device with a speaker on a coffee table in the general listening area (e.g., near the couch), we set f_n=1; and
RENDERING: The device is turned off, and energy rendered elsewhere.

The impact of this audio processing change is better listening for people on the couch. If the coffee table were to one side of the couch, this method would avoid the sensitivity of listener proximity to this audio device. Whilst this audio device may, in some instances have an ideal location for, e.g., a surround channel, the fact that there may be 20 dB level difference or more across the couch to this speaker means that unless we know exactly where the listener/talker is, it may be a good idea to turn this nearest device down or off.

Figure 10:
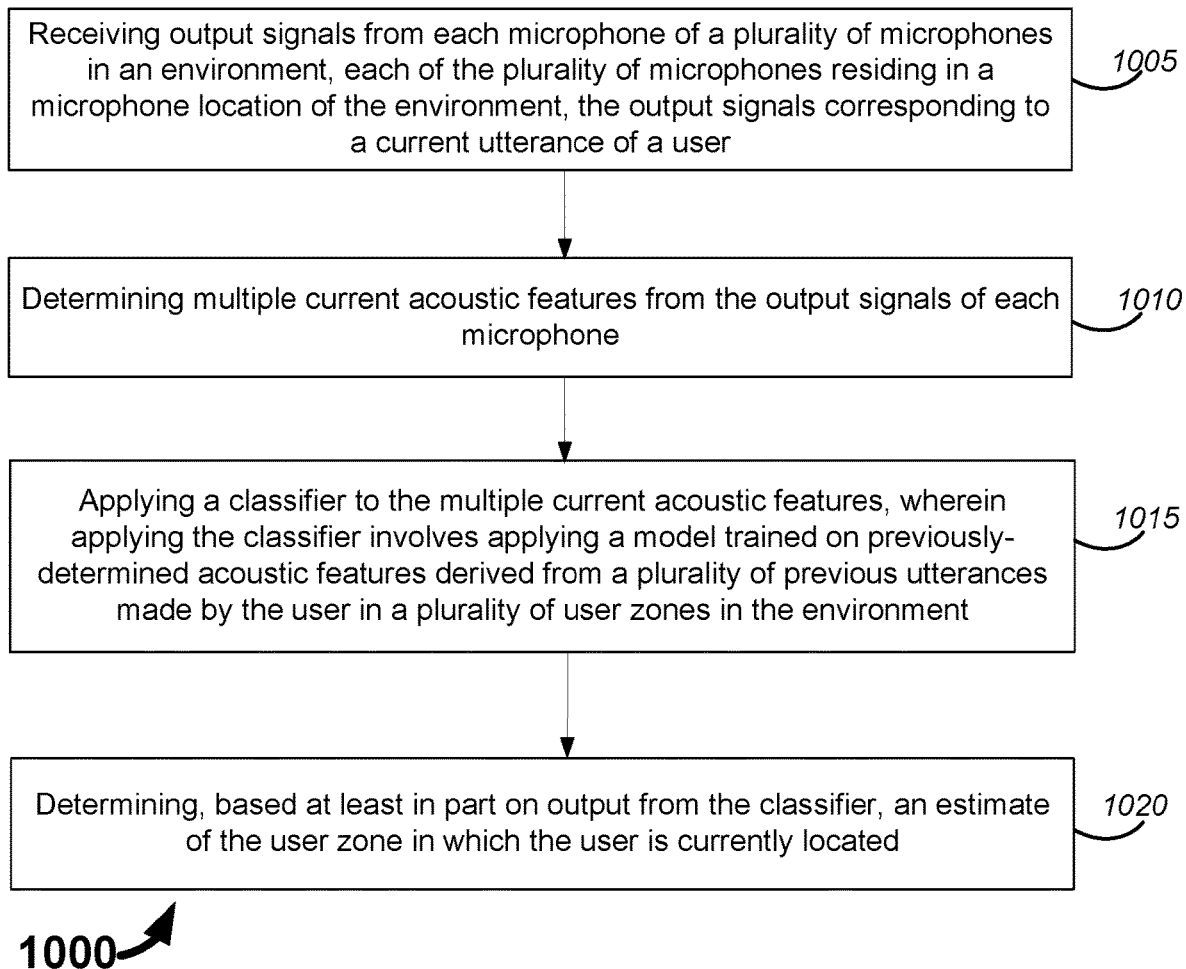
FIG. 10 is a flow diagram that outlines one example of a method that may be performed by an apparatus such as that shown in FIG. 2A.

FIG. 10 is a flow diagram that outlines one example of a method that may be performed by an apparatus such as that shown in FIG. 2A. The blocks of method 1000, like other methods described herein, are not necessarily performed in the order indicated. Moreover, such methods may include more or fewer blocks than shown and/or described. In this implementation, method 1000 involves estimating a user's location in an environment.

In this example, block 1005 involves receiving output signals from each microphone of a plurality of microphones in the environment. In this instance, each of the plurality of microphones resides in a microphone location of the environment. According to this example, the output signals correspond to a current utterance of a user. In some examples, the current utterance may be, or may include, a wakeword utterance. Block 1005 may, for example, involve a control system (such as the control system 120 of FIG. 2A) receiving output signals from each microphone of a plurality of microphones in the environment via an interface system (such as the interface system 205 of FIG. 2A).

In some examples, at least some of the microphones in the environment may provide output signals that are asynchronous with respect to the output signals provided by one or more other microphones. For example, a first microphone of the plurality of microphones may sample audio data according to a first sample clock and a second microphone of the plurality of microphones may sample audio data according to a second sample clock. In some instances, at least one of the microphones in the environment may be included, in or configured for communication with, a smart audio device.

According to this example, block 1010 involves determining multiple current acoustic features from the output signals of each microphone. In this example, the "current acoustic features" are acoustic features derived from the "current utterance" of block 1005. In some implementations, block 1010 may involve receiving the multiple current acoustic features from one or more other devices. For example, block 1010 may involve receiving at least some of the multiple current acoustic features from one or more wakeword detectors implemented by one or more other devices. Alternatively, or additionally, in some implementations block 1010 may involve determining the multiple current acoustic features from the output signals.

Whether the acoustic features are determined by a single device or multiple devices, the acoustic features may be determined asynchronously. If the acoustic features are determined by multiple devices, the acoustic features would generally be determined asynchronously unless the devices were configured to coordinate the process of determining acoustic features. If the acoustic features are determined by a single device, in some implementations the acoustic features may nonetheless be determined asynchronously because the single device may receive the output signals of each microphone at different times. In some examples, the acoustic features may be determined asynchronously because at least some of the microphones in the environment may provide output signals that are asynchronous with respect to the output signals provided by one or more other microphones.

In some examples, the acoustic features may include a wakeword confidence metric, a wakeword duration metric and/or at least one received level metric. The received level metric may indicate a received level of a sound detected by a microphone and may correspond to a level of a microphone's output signal.

Alternatively, or additionally, the acoustic features may include one or more of the following:
Mean state entropy (purity) for each wakeword state along the 1-best (Viterbi) alignment with the acoustic model.
CTC-loss (Connectionist Temporal Classification Loss) against the acoustic models of the wakeword detectors.
A wakeword detector may be trained to provide an estimate of distance of the talker from the microphone and/or an RT60 estimate in addition to the wakeword confidence. The distance estimate and/or the RT60 estimate may be acoustic features.

Instead of, or in addition to, broadband received level/power at a microphone, an acoustic feature may be the received level in a number of log/Mel/Bark-spaced frequency bands. The frequency bands may vary according to the particular implementation (e.g., 2 frequency bands, 5 frequency bands, 20 frequency bands, 50 frequency bands, 1 octave frequency bands or ⅓ octave frequency bands).

Cepstral representation of the spectral information in the preceding point, computed by taking the DCT (discrete cosine transform) of the logarithm of the band powers.

Band powers in frequency bands weighted for human speech. For example, acoustic features may be based upon only a particular frequency band (for example, 400 Hz-1.5 kHz). Higher and lower frequencies may, in this example, be disregarded.

Per-band or per-bin voice activity detector confidence.

Acoustic features may be based, at least in part, on a long-term noise estimate so as to ignore microphones that have a poor signal-to-noise ratio.

Kurtosis as a measure of speech "peakiness." Kurtosis can be an indicator of smearing by a long reverberation tail.

Estimated wakeword onset times. One would expect onset and duration to be equal within a frame or so across all microphones. An outlier can give a clue of an unreliable estimate. This assumes some level of synchrony—not necessarily to the sample—but, e.g., to the frame of a few tens of milliseconds.

According to this example, block 1015 involves applying a classifier to the multiple current acoustic features. In some such examples, applying the classifier may involve applying a model trained on previously-determined acoustic features derived from a plurality of previous utterances made by the user in a plurality of user zones in the environment. Various examples are provided herein.

In some examples, the user zones may include a sink area, a food preparation area, a refrigerator area, a dining area, a couch area, a television area, a bedroom area and/or a doorway area. According to some examples, one or more of the user zones may be a predetermined user zone. In some such examples, one or more predetermined user zones may have been selectable by a user during a training process.

In some implementations, applying the classifier may involve applying a Gaussian Mixture Model trained on the previous utterances. According to some such implementations, applying the classifier may involve applying a Gaussian Mixture Model trained on one or more of normalized wakeword confidence, normalized mean received level, or maximum received level of the previous utterances. However, in alternative implementations applying the classifier may be based on a different model, such as one of the other models disclosed herein. In some instances, the model may be trained using training data that is labelled with user zones. However, in some examples applying the classifier involves applying a model trained using unlabelled training data that is not labelled with user zones.

In some examples, the previous utterances may have been, or may have included, wakeword utterances. According to some such examples, the previous utterances and the current utterance may have been utterances of the same wakeword.

In this example, block 1020 involves determining, based at least in part on output from the classifier, an estimate of the user zone in which the user is currently located. In some such examples, the estimate may be determined without reference to geometric locations of the plurality of microphones. For example, the estimate may be determined without reference to the coordinates of individual microphones. In some examples, the estimate may be determined without estimating a geometric location of the user.

Some implementations of the method 1000 may involve selecting at least one speaker according to the estimated user zone. Some such implementations may involve controlling at least one selected speaker to provide sound to the estimated user zone. Alternatively, or additionally, some implementations of the method 1000 may involve selecting at least one microphone according to the estimated user zone. Some such implementations may involve providing signals output by at least one selected microphone to a smart audio device.

Figure 11:
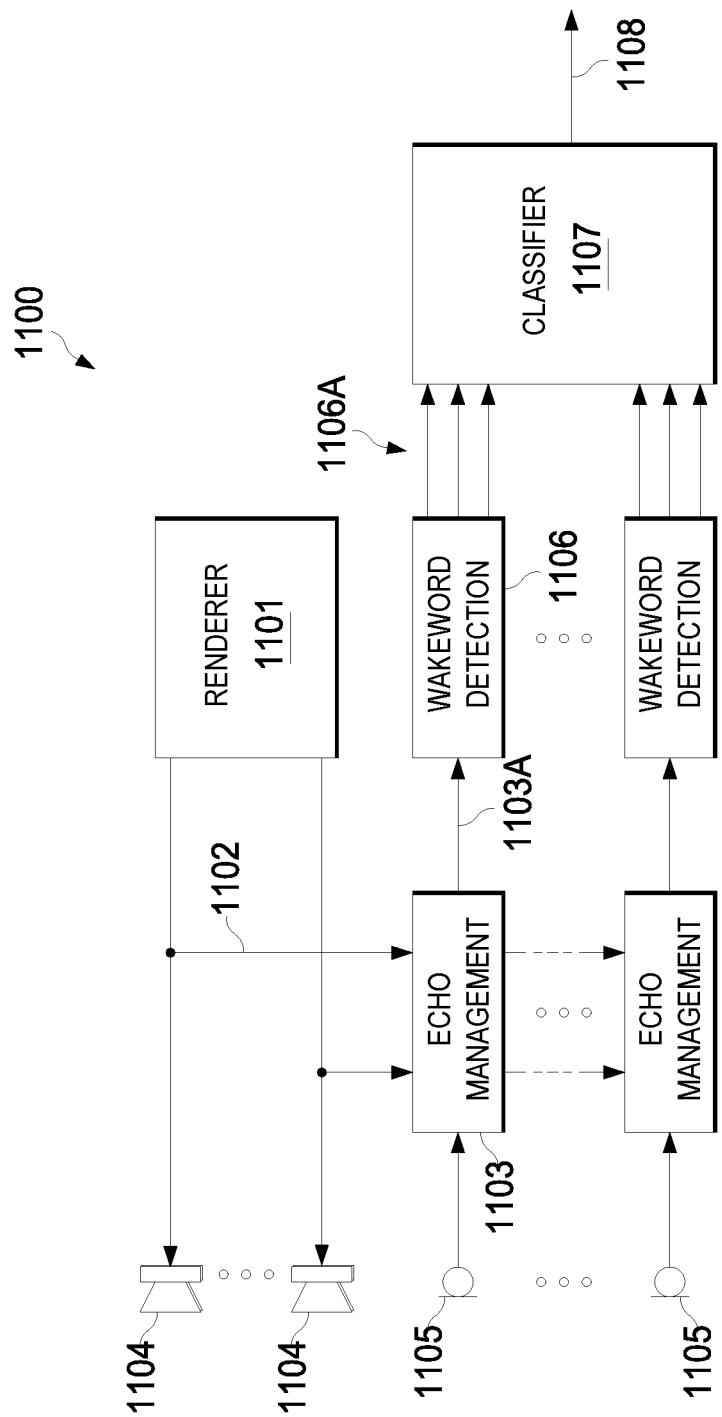
FIG. 11 is a block diagram of elements of one example of an embodiment that is configured to implement a zone classifier.

FIG. 11 is a block diagram of elements of one example of an embodiment that is configured to implement a zone classifier. According to this example, system 1100 includes a plurality of loudspeakers 1104 distributed in at least a portion of an environment (e.g., an environment such as that illustrated in FIG. 1A or FIG. 1B). In this example, the system 1100 includes a multichannel loudspeaker renderer 1101. According to this implementation, the outputs of the multichannel loudspeaker renderer 1101 serve as both loudspeaker driving signals (speaker feeds for driving speakers 1104) and echo references. In this implementation, the echo references are provided to echo management subsystems 1103 via a plurality of loudspeaker reference channels 1102, which include at least some of the speaker feed signals output from renderer 1101.

In this implementation, the system 1100 includes a plurality of echo management subsystems 1103. According to this example, the echo management subsystems 1103 are configured to implement one or more echo suppression processes and/or one or more echo cancellation processes. In this example, each of the echo management subsystems 1103 provides a corresponding echo management output 1103A to one of the wakeword detectors 1106. The echo management output 1103A has attenuated echo relative to the input to the relevant one of the echo management subsystems 1103.

According to this implementation, the system 1100 includes N microphones 1105 (N being an integer) distributed in at least a portion of the environment (e.g., the environment illustrated in FIG. 1A or FIG. 1B). The microphones may include array microphones and/or spot microphones. For example, one or more smart audio devices located in the environment may include an array of microphones. In this example, the outputs of microphones 1105 are provided as input to the echo management subsystems 1103. According to this implementation, each of echo management subsystems 1103 captures the output of an individual microphone 1105 or an individual group or subset of the microphones 1105).

In this example, the system 1100 includes a plurality of wakeword detectors 1106. According to this example, each of the wakeword detectors 1106 receives the audio output from one of the echo management subsystems 1103 and outputs a plurality of acoustic features 1106A. The acoustic features 1106A output from each echo management subsystem 1103 may include (but are not limited to): wakeword confidence, wakeword duration and measures of received level. Although three arrows, depicting three acoustic features 1106A, are shown as being output from each echo management subsystem 1103, more or fewer acoustic features 1106A may be output in alternative implementations. Moreover, although these three arrows are impinging on the classifier 1107 along a more or less vertical line, this does not indicate that the classifier 1107 necessarily receives the acoustic features 1106A from all of the wakeword detectors 1106 at the same time. As noted elsewhere herein, the acoustic features 1106A may, in some instances, be determined and/or provided to the classifier asynchronously.

According to this implementation, the system 1100 includes a zone classifier 1107, which may also be referred to as a classifier 1107. In this example, the classifier receives the plurality of features 1106A from the plurality of wakeword detectors 1106 for a plurality of (e.g., all of) the microphones 1105 in the environment. According to this example, the output 1108 of the zone classifier 1107 corresponds to an an estimate of the user zone in which the user is currently located. According to some such examples, the output 1108 may correspond to one or more posterior probabilities. An estimate of the user zone in which the user is currently located may be, or may correspond to, a maximum a posteriori probability according to Bayesian statistics.

We next describe example implementations of a classifier, which may in some examples correspond with the zone classifier 1107 of FIG. 11. Let $x_i(n)$ be the ith microphone signal, $i=\{1 \ldots N\}$, at discrete time n (i.e., the microphone signals $x_i(n)$ are the outputs of the N microphones 1105). Processing of the N signals $x_i(n)$ in echo management subsystems 1103 generates 'clean' microphone signals $e_i(n)$, where $i=\{1 \ldots N\}$, each at a discrete time n. Clean signals $e_i(n)$, referred to as 1103A in FIG. 11, are fed to wakeword detectors 1106 in this example. Here, each wakeword detector 1106 produces a vector of features $w_i(j)$, referred to as 1106A in FIG. 11, where $j=\{1 \ldots J\}$ is an index corresponding to the jth wakeword utterance. In this example, the classifier 1107 takes as input an aggregate feature set $W(j)=[w_1^T(j) \ldots w_N^T(j)]^T$.

According to some implementations, a set of zone labels $C_k$, for $k=\{1 \ldots K\}$, may correspond to a number, K, of different user zones in an environment. For example, the user zones may include a couch zone, a kitchen zone, a reading chair zone, etc. Some examples may define more than one zone within a kitchen or other room. For example, a kitchen area may include a sink zone, a food preparation zone, a refrigerator zone and a dining zone. Similarly, a living room area may include a couch zone, a television zone, a reading chair zone, one or more doorway zones, etc. The zone labels for these zones may be selectable by a user, e.g., during a training phase.

In some implementations, classifier 1107 estimates posterior probabilities $p(C_k|W(j))$ of the feature set $W(j)$, for example by using a Bayesian classifier. Probabilities $p(C_k|W(j))$ indicate a probability (for the $j^{th}$ utterance and the $k^{th}$ zone, for each of the zones $C_k$, and each of the utterances) that the user is in each of the zones $C_k$, and are an example of output 1108 of classifier 1107.

According to some examples, training data may be gathered (e.g., for each user zone) by prompting a user to select or define a zone, e.g., a couch zone. The training process may involve prompting the user make a training utterance, such as a wakeword, in the vicinity of a selected or defined zone. In a couch zone example, the training process may involve prompting the user to make the training utterance at the center and extreme edges of a couch. The training process may involve prompting the user to repeat the training utterance several times at each location within the user zone. The user may then be prompted to move to another user zone and to continue until all designated user zones have been covered.

Figure 12:
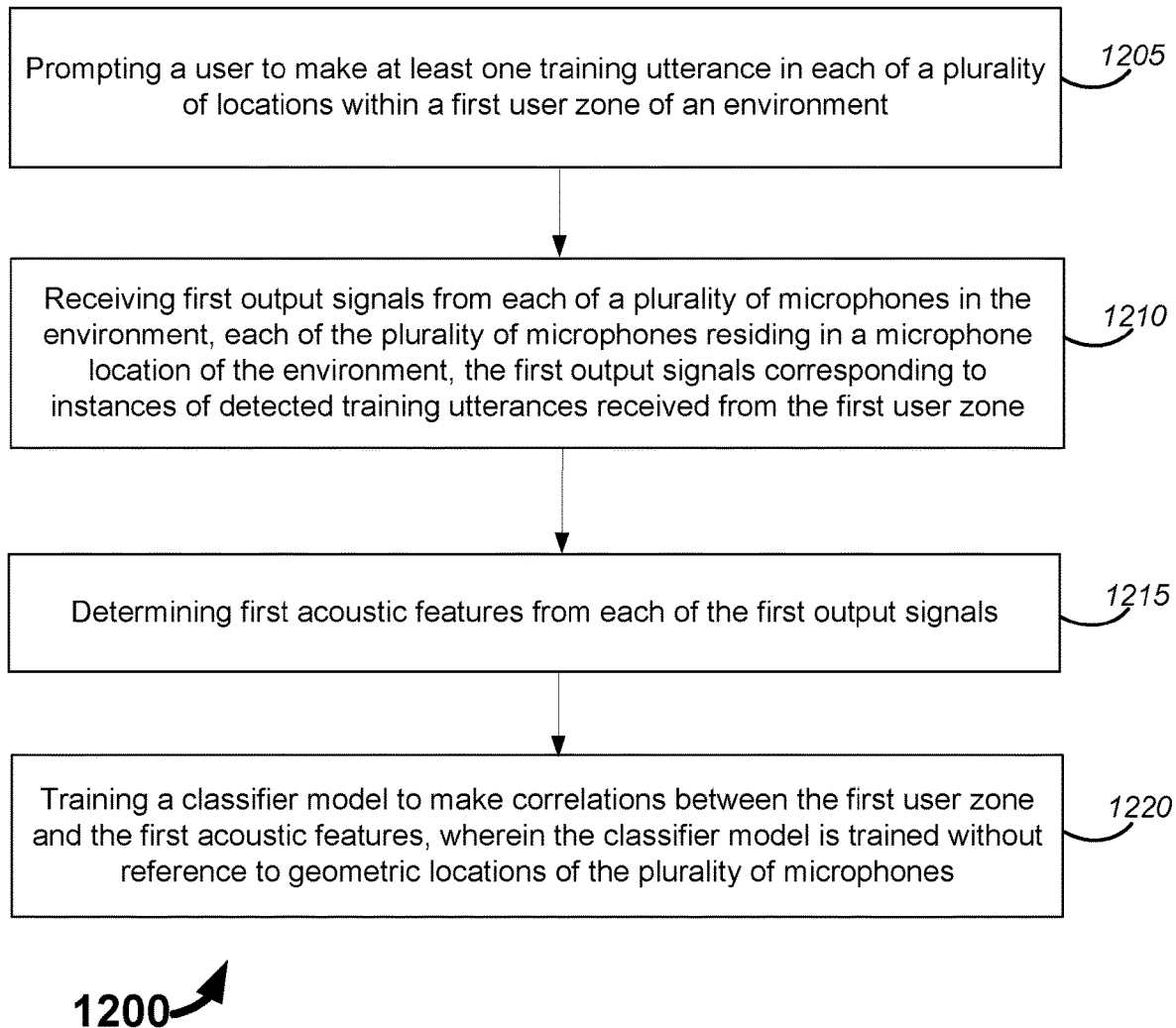
FIG. 12 is a flow diagram that outlines one example of a method that may be performed by an apparatus such as apparatus 200 of FIG. 2A.

FIG. 12 is a flow diagram that outlines one example of a method that may be performed by an apparatus such as apparatus 200 of FIG. 2A. The blocks of method 1200, like other methods described herein, are not necessarily performed in the order indicated. Moreover, such methods may include more or fewer blocks than shown and/or described. In this implementation, method 1200 involves training a classifier for estimating a user's location in an environment.

In this example, block 1205 involves prompting a user to make at least one training utterance in each of a plurality of locations within a first user zone of an environment. The training utterance(s) may, in some examples, be one or more instances of a wakeword utterance. According to some implementations, the first user zone may be any user zone selected and/or defined by a user. In some instances, a control system may create a corresponding zone label (e.g., a corresponding instance of one of the zone labels $C_k$ described above) and may associate the zone label with training data obtained for the first user zone.

An automated prompting system may be used to collect these training data. As noted above, the interface system 205 of apparatus 200 may include one or more devices for implementing a user interface, such as one or more microphones, one or more speakers, a display system, a touch sensor system and/or a gesture sensor system. For example, the apparatus 200 may provide the user with the following prompts on a screen of the display system or hear them announced via one or more speakers during the training process:

"Move to the couch."
"Say the wakeword ten times while moving your head about."
"Move to a position halfway between the couch and the reading chair and say the wakeword ten times."
"Stand in the kitchen as if cooking and say the wakeword ten times."

In this example, block 1210 involves receiving first output signals from each of a plurality of microphones in the environment. In some examples, block 1210 may involve receiving the first output signals from all of the active microphones in the environment, whereas in other examples block 1210 may involve receiving the first output signals from a subset of all of the active microphones in the environment. In some examples, at least some of the microphones in the environment may provide output signals that are asynchronous with respect to the output signals provided by one or more other microphones. For example, a first microphone of the plurality of microphones may sample audio data according to a first sample clock and a second microphone of the plurality of microphones may sample audio data according to a second sample clock.

In this example, each microphone of the plurality of microphones resides in a microphone location of the environment. In this example, the first output signals correspond to instances of detected training utterances received from the first user zone. Because block 1205 involves prompting the user to make at least one training utterance in each of a plurality of locations within the first user zone of an environment, in this example the term "first output signals" refers to a set of all output signals corresponding to training utterances for the first user zone. In other examples the term "first output signals" may refer to a subset of all output signals corresponding to training utterances for the first user zone.

According to this example, block 1215 involves determining one or more first acoustic features from each of the first output signals. In some examples, the first acoustic features may include a wakeword confidence metric and/or a received level metric. For example, the first acoustic features may include a normalized wakeword confidence metric, an indication of normalized mean received level and/or an indication of maximum received level.

As noted above, because block 1205 involves prompting the user to make at least one training utterance in each of a plurality of locations within the first user zone of an environment, in this example the term "first output signals" refers to a set of all output signals corresponding to training utterances for the first user zone. Accordingly, in this example the term "first acoustic features" refers to a set of acoustic features derived from the set of all output signals corresponding to training utterances for the first user zone. Therefore, in this example the set of first acoustic features is at least as large as the set of first output signals. If, for example, two acoustic features were determined from each of the output signals, the set of first acoustic features would be twice as large as the set of first output signals.

In this example, block 1220 involves training a classifier model to make correlations between the first user zone and the first acoustic features. The classifier model may, for example, be any of those disclosed herein. According to this implementation, the classifier model is trained without reference to geometric locations of the plurality of microphones. In other words, in this example, data regarding geometric locations of the plurality of microphones (e.g., microphone coordinate data) is not provided to the classifier model during the training process.

Figure 13:
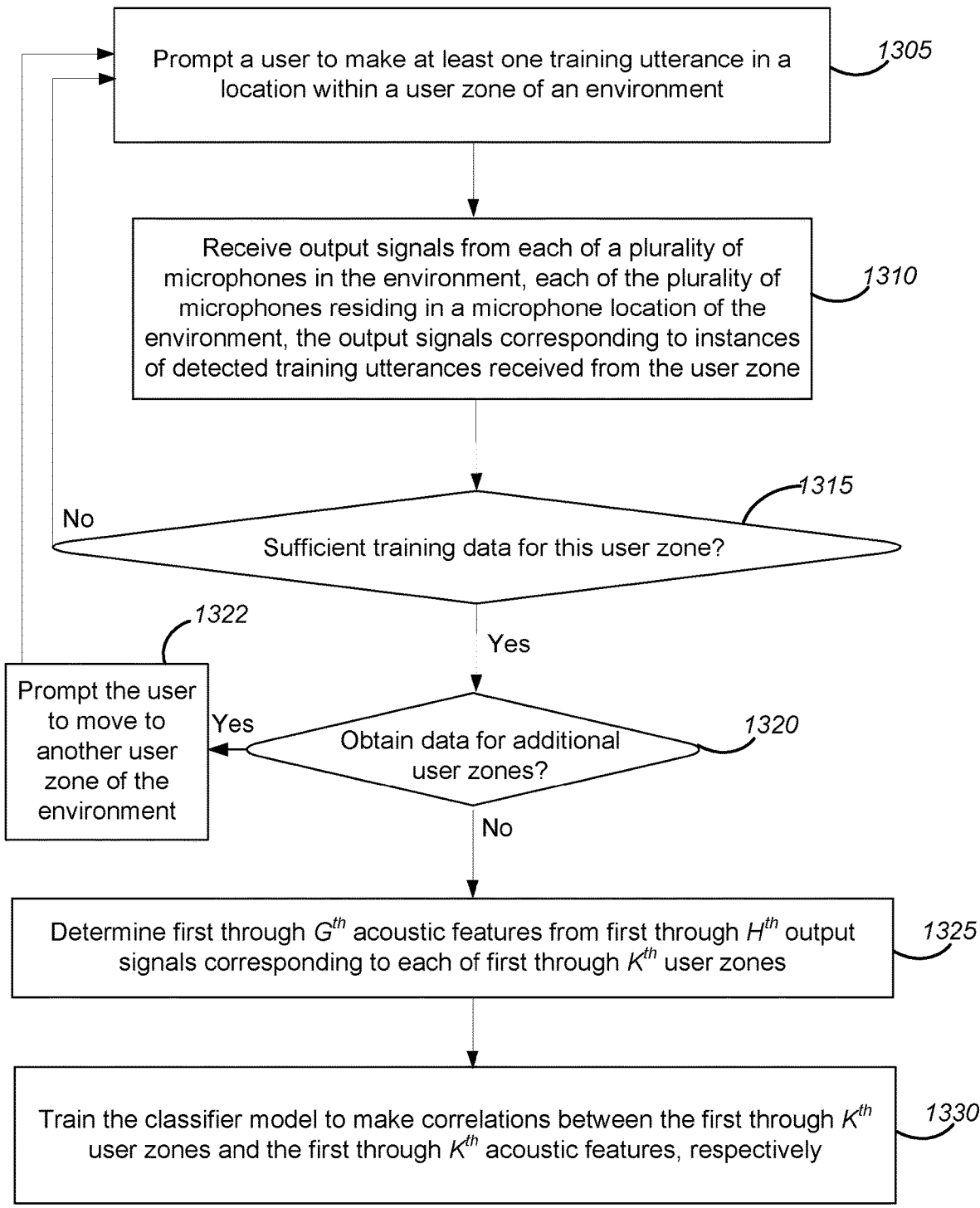
FIG. 13 is a flow diagram that outlines another example of a method that may be performed by an apparatus such as apparatus 200 of FIG. 2A.

FIG. 13 is a flow diagram that outlines another example of a method that may be performed by an apparatus such as apparatus 200 of FIG. 2A. The blocks of method 1300, like other methods described herein, are not necessarily performed in the order indicated. For example, in some implementations at least a portion of the acoustic feature determination process of block 1325 may be performed prior to block 1315 or block 1320. Moreover, such methods may include more or fewer blocks than shown and/or described. In this implementation, method 1300 involves training a classifier for estimating a user's location in an environment. Method 1300 provides an example of extending method 1200 to multiple user zones of the environment.

In this example, block 1305 involves prompting a user to make at least one training utterance in a location within a user zone of an environment. In some instances, block 1305 may be performed in the manner described above with reference to block 1205 of FIG. 12, except that block 1305 pertains to a single location within a user zone. The training utterance(s) may, in some examples, be one or more instances of a wakeword utterance. According to some implementations, the user zone may be any user zone selected and/or defined by a user. In some instances, a control system may create a corresponding zone label (e.g., a corresponding instance of one of the zone labels $C_k$ described above) and may associate the zone label with training data obtained for the user zone.

According to this example, block 1310 is performed substantially as described above with reference to block 1210 of FIG. 12. However, in this example the process of block 1310 is generalized to any user zone, not necessarily the first user zone for which training data are acquired. Accordingly, the output signals received in block 1310 are "output signals from each of a plurality of microphones in the environment, each of the plurality of microphones residing in a microphone location of the environment, the output signals corresponding to instances of detected training utterances received from the user zone." In this example, the term "output signals" refers to a set of all output signals corresponding to one or more training utterances in a location of the user zone. In other examples the term "output signals" may refer to a subset of all output signals corresponding to one or more training utterances in a location of the user zone.

According to this example, block 1315 involves determining whether sufficient training data have been acquired for the current user zone. In some such examples, block 1315 may involve determining whether output signals corresponding to a threshold number of training utterances have been obtained for the current user zone. Alternatively, or additionally, block 1315 may involve determining whether output signals corresponding to training utterances in a threshold number of locations within the current user zone have been obtained. If not, method 1300 reverts to block 1305 in this example and the user is prompted to make at least one additional utterance at a location within the same user zone.

However, if it is determined in block 1315 that sufficient training data have been acquired for the current user zone, in this example the process continues to block 1320. According to this example, block 1320 involves determining whether to obtain training data for additional user zones. According to some examples, block 1320 may involve determining whether training data have been obtained for each user zone that a user has previously identified. In other examples, block 1320 may involve determining whether training data have been obtained for a minimum number of user zones. The minimum number may have been selected by a user. In other examples, the minimum number may be a recommended minimum number per environment, a recommended minimum number per room of the environment, etc.

If it is determined in block 1320 that training data should be obtained for additional user zones, in this example the process continues to block 1322, which involves prompting the user to move to another user zone of the environment. In some examples, the next user zone may be selectable by the user. According to this example, the process continues to block 1305 after the prompt of block 1322. In some such examples, the user may be prompted to confirm that the user has reached the new user zone after the prompt of block 1322. According to some such examples, the user may be required to confirm that the user has reached the new user zone before the prompt of block 1305 is provided.

If it is determined in block 1320 that training data should not be obtained for additional user zones, in this example the process continues to block 1325. In this example, method 1300 involves obtaining training data for K user zones. In this implementation, block 1325 involves determining first through $G^{th}$ acoustic features from first through $H^{th}$ output signals corresponding to each of the first through $K^{th}$ user zones for which training data has been obtained. In this example, the term "first output signals" refers to a set of all output signals corresponding to training utterances for a first user zone and the term "$H^{th}$ output signals" refers to a set of all output signals corresponding to training utterances for a $K^{th}$ user zone. Similarly, the term "first acoustic features" refers to a set of acoustic features determined from the first output signals and the term "$G^{th}$ acoustic features" refers to a set of acoustic features determined from the $H^{th}$ output signals.

According to these examples, block 1330 involves training a classifier model to make correlations between the first through $K^{th}$ user zones and the first through $K^{th}$ acoustic features, respectively. The classifier model may, for example, be any of the classifier models disclosed herein.

In the foregoing example, the user zones are labeled (e.g., according to a corresponding instance of one of the zone labels $C_k$ described above). However, the model may either be trained according to labeled or unlabeled user zones, depending on the particular implementation. In the labeled case, each training utterance may be paired with a label corresponding to a user zone, e.g., as follows:

$$p(C_k | W(j)) = \begin{cases} 1 & k = k' \\ 0 & \text{otherwise} \end{cases},$$

Training the classifier model may involve determining a best fit for the labeled training data. Without loss of generality, appropriate classification approaches for a classifier model may include:
- A Bayes' Classifier, for example with per-class distributions described by multivariate normal distributions, full-covariance Gaussian Mixture Models or diagonal-covariance Gaussian Mixture Models;
- Vector Quantization;
- Nearest Neighbor (k-means);
- A Neural Network having a SoftMax output layer with one output corresponding to each class;
- A Support Vector Machine (SVM); and/or
- Boosting techniques, such as Gradient Boosting Machines (GBMs)

In one example of implementing the unlabeled case, data may be automatically split into K clusters, where K may also be unknown. The unlabeled automatic splitting can be performed, for example, by using a classical clustering technique, e.g., the k-means algorithm or Gaussian Mixture Modelling.

In order to improve robustness, regularization may be applied to the classifier model training and model parameters may be updated over time as new utterances are made.

We next describe further aspects of an embodiment.

An example acoustic feature set (e.g., acoustic features 1106A of FIG. 11) may include the likelihood of wakeword confidence, mean received level over the estimated duration of the most confident wakeword, and maximum received level over the duration of the most confident wakeword. Features may be normalized relative to their maximum values for each wakeword utterance. Training data may be labeled and a full covariance Gaussian Mixture Model (GMM) may be trained to maximize expectation of the training labels. The estimated zone may be the class that maximizes posterior probability.

The above description of some embodiments discusses learning an acoustic zone model from a set of training data collected during a prompted collection process. In that model, training time (or configuration mode) and run time (or regular mode) can be considered two distinct modes that the microphone system may be placed in. An extension to this scheme is online learning, in which some or all of the acoustic zone model is learnt or adapted online (e.g., at run time or in regular mode). In other words, even after the classifier is being applied in a "run time" process to make an estimate of a user zone in which the user is currently located (e.g., pursuant to method 1000 of FIG. 10, in some implementations the process of training the classifier may continue.

Figure 14:
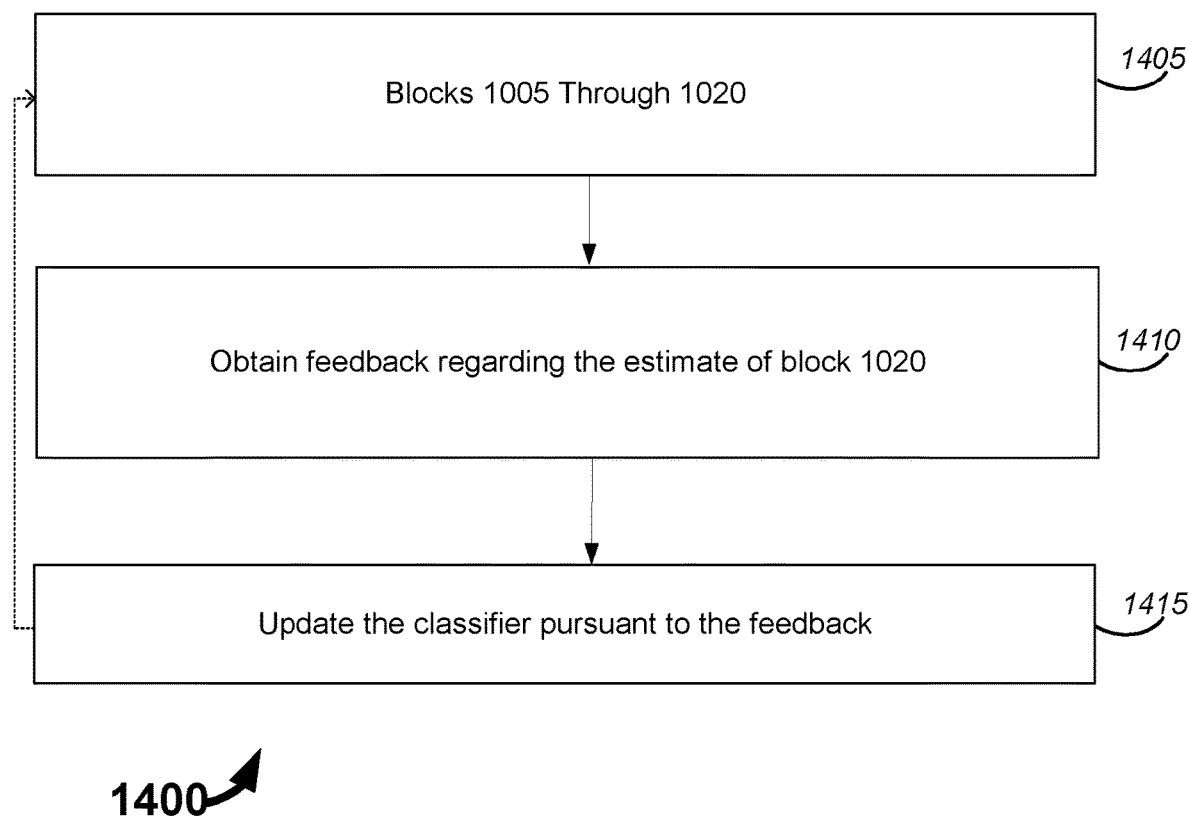
FIG. 14 is a flow diagram that outlines another example of a method that may be performed by an apparatus such as apparatus 200 of FIG. 2A.

FIG. 14 is a flow diagram that outlines another example of a method that may be performed by an apparatus such as apparatus 200 of FIG. 2A. The blocks of method 1400, like other methods described herein, are not necessarily performed in the order indicated. Moreover, such methods may include more or fewer blocks than shown and/or described. In this implementation, method 1400 involves ongoing training of a classifier during a "run time" process of estimating a user's location in an environment. Method 1400 is an example of what is referred to herein as an online learning mode.

In this example, block 1405 of method 1400 corresponds to blocks 1005-1020 of method 1000. Here, block 1405 involves providing in an estimate, based at least in part on output from the classifier, of a user zone in which the user is currently located. According to this implementation, block 1410 involves obtaining implicit or explicit feedback regarding the estimate of block 1405. In block 1415, the classifier is updated pursuant to the feedback received in block 1405. Block 1415 may, for example, involve one or more reinforcement learning methods. As suggested by the dashed arrow from block 1415 to block 1405, in some implementations method 1400 may involve reverting to block 1405. For example, method 1400 may involve providing future estimates of a user zone in which the user is located at that future time, based on applying the updated model.

Explicit techniques for obtaining feedback may include:
- Asking the user whether the prediction was correct using a voice user interface (UI). For example, a sound indicative of the following may be provided to the user: "I think you are on the couch, please say 'right' or 'wrong'").
- Informing the user that incorrect predictions may be corrected at any time using the voice UI. (e.g., sound indicative of the following may be provided to the user: "I am now able to predict where you are when you speak to me. If I predict wrongly, just say something like 'Amanda, I'm not on the couch. I'm in the reading chair'").
- Informing the user that correct predictions may be rewarded at any time using the voice UI. (e.g., sound indicative of the following may be provided to the user: "I am now able to predict where you are when you speak to me. If I predict correctly you can help to further improve my predictions by saying something like 'Amanda, that's right. I am on the couch.'").
- Including physical buttons or other UI elements that a user can operate in order to give feedback (e.g., a thumbs up and/or thumbs down button on a physical device or in a smartphone app).

The goal of predicting the user zone in which the user is located may be to inform a microphone selection or adaptive beamforming scheme that attempts to pick up sound from the acoustic zone of the user more effectively, for example, in order to better recognize a command that follows the wakeword. In such scenarios, implicit techniques for obtaining feedback on the quality of zone prediction may include:
- Penalizing predictions that result in misrecognition of the command following the wakeword. A proxy that may indicate misrecognition may include the user cutting short the voice assistant's response to a command, for example, by utterance a counter-command like, for example, "Amanda, stop!";
- Penalizing predictions that result in low confidence that a speech recognizer has successfully recognized a command. Many automatic speech recognition systems have the capability to return a confidence level with their result that can be used for this purpose;
- Penalizing predictions that result in failure of a second-pass wakeword detector to retrospectively detect the wakeword with high confidence; and/or Reinforcing predictions that result in highly confident recognition of the wakeword and/or correct recognition of the user's command.

Following is an example of a failure of a second-pass wakeword detector to retrospectively detect the wakeword with high confidence. Suppose that after obtaining output signals corresponding to a current utterance from microphones in an environment and after determining acoustic features based on the output signals (e.g., via a plurality of first pass wakeword detectors configured for communication with the microphones), the acoustic features are provided to a classifier. In other words, the acoustic features are presumed to correspond to a detected wakeword utterance. Suppose further that the classifier determines that the person who made the current utterance is most likely to be in zone 3, which corresponds to a reading chair in this example. There may, for example, be a particular microphone or learned combination of microphones that is known to be best for listening to the person's voice when the person is in zone 3, e.g., to send to a cloud-based virtual assistant service for voice command recognition.

Suppose further that after determining which microphone(s) will be used for speech recognition, but before the person's speech is actually sent to the virtual assistant service, a second-pass wakeword detector operates on microphone signals corresponding to speech detected by the chosen microphone(s) for zone 3 that you are about to submit for command recognition. If that second pass wakeword detector disagrees with your plurality of first pass wakeword detectors that the wakeword was actually uttered it is probably because the classifier incorrectly predicted the zone. Therefore, the classifier should be penalized.

Techniques for the a posteriori updating of the zone mapping model after one or more wakewords have been spoken may include:

Maximum a posteriori (MAP) adaptation of a Gaussian Mixture Model (GMM) or nearest neighbor model; and/or Reinforcement learning, for example of a neural network, for example by associating an appropriate "one-hot" (in the case of correct prediction) or "one-cold" (in the case of incorrect prediction) ground truth label with the SoftMax output and applying online back propagation to determine new network weights.

Some examples of a MAP adaptation in this context may involve adjusting the means in the GMM each time a wakeword is spoken. In this manner, the means may become more like the acoustic features that are observed when subsequent wakewords are spoken. Alternatively, or additionally, such examples may involve adjusting the variance/covariance or mixture weight information in the GMM each time a wakeword is spoken.

For example, a MAP adaptation scheme may be as follows:

$$\mu_{i,new} = \mu_{i,old} * \alpha + x * (1-\alpha)$$

In the foregoing equation, $\mu_{i,old}$ represents the mean of the $i^{th}$ Gaussian in the mixture, $\alpha$ represents a parameter which controls how aggressively MAP adaptation should occur ($\alpha$ may be in the range [0.9, 0.999]) and x represents the feature vector of the new wakeword utterance. The index "i" would correspond to the mixture element that returns the highest a priori probability of containing the speaker's location at wakeword time.

Alternatively, each of the mixture elements may be adjusted according to their a priori probability of containing the wakeword, e.g., as follows:

$$M_{i,new} = \mu_{i,old} * \beta_i * x(1-B_i)$$

In the foregoing equation, $\beta_i = \alpha*(1-P(i))$, wherein P(i) represents the a priori probability that the observation x is due to mixture element i.

In one reinforcement learning example, there may be three user zones. Suppose that for a particular wakeword, the model predicts the probabilities as being [0.2, 0.1, 0.7] for the three user zones. If a second source of information (for example, a second-pass wakeword detector) confirms that the third zone was correct, then the ground truth label could be [0, 0, 1] ("one hot"). The a posteriori updating of the zone mapping model may involve back-propagating the error through a neural network, effectively meaning that the neural network will more strongly predict zone 3 if shown the same input again. Conversely, if the second source of information shows that zone 3 was an incorrect prediction, the ground truth label could be [0.5, 0.5, 0.0] in one example. Back-propagating the error through the neural network would make the model less likely to predict zone 3 if shown the same input in the future.

Flexible rendering allows spatial audio to be rendered over an arbitrary number of arbitrarily placed speakers. In view of the widespread deployment of audio devices, including but not limited to smart audio devices (e.g., smart speakers) in the home, there is a need for realizing flexible rendering technology that allows consumer products to perform flexible rendering of audio, and playback of the so-rendered audio.

Several technologies have been developed to implement flexible rendering. They cast the rendering problem as one of cost function minimization, where the cost function consists of two terms: a first term that models the desired spatial impression that the renderer is trying to achieve, and a second term that assigns a cost to activating speakers. To date this second term has focused on creating a sparse solution where only speakers in close proximity to the desired spatial position of the audio being rendered are activated.

Playback of spatial audio in a consumer environment has typically been tied to a prescribed number of loudspeakers placed in prescribed positions: for example, 5.1 and 7.1 surround sound. In these cases, content is authored specifically for the associated loudspeakers and encoded as discrete channels, one for each loudspeaker (e.g., Dolby Digital, or Dolby Digital Plus, etc.) More recently, immersive, object-based spatial audio formats have been introduced (Dolby Atmos) which break this association between the content and specific loudspeaker locations. Instead, the content may be described as a collection of individual audio objects, each with possibly time varying metadata describing the desired perceived location of said audio objects in three-dimensional space. At playback time, the content is transformed into loudspeaker feeds by a renderer which adapts to the number and location of loudspeakers in the playback system. Many such renderers, however, still constrain the locations of the set of loudspeakers to be one of a set of prescribed layouts (for example 3.1.2, 5.1.2, 7.1.4, 9.1.6, etc. with Dolby Atmos).

Moving beyond such constrained rendering, methods have been developed which allow object-based audio to be rendered flexibly over a truly arbitrary number of loudspeakers placed at arbitrary positions. These methods require that the renderer have knowledge of the number and physical locations of the loudspeakers in the listening space. For such a system to be practical for the average consumer, an automated method for locating the loudspeakers would be desirable. One such method relies on the use of a multitude of microphones, possibly co-located with the loudspeakers. By playing audio signals through the loudspeakers and recording with the microphones, the distance between each loudspeaker and microphone is estimated. From these distances the locations of both the loudspeakers and microphones are subsequently deduced.

Simultaneous to the introduction of object-based spatial audio in the consumer space has been the rapid adoption of so-called "smart speakers", such as the Amazon Echo line of products. The tremendous popularity of these devices can be attributed to their simplicity and convenience afforded by wireless connectivity and an integrated voice interface (Amazon's Alexa, for example), but the sonic capabilities of these devices has generally been limited, particularly with respect to spatial audio. In most cases these devices are constrained to mono or stereo playback. However, combining the aforementioned flexible rendering and auto-location technologies with a plurality of orchestrated smart speakers may yield a system with very sophisticated spatial playback capabilities and that still remains extremely simple for the consumer to set up. A consumer can place as many or few of the speakers as desired, wherever is convenient, without the need to run speaker wires due to the wireless connectivity, and the built-in microphones can be used to automatically locate the speakers for the associated flexible renderer.

Conventional flexible rendering algorithms are designed to achieve a particular desired perceived spatial impression as closely as possible. In a system of orchestrated smart speakers, at times, maintenance of this spatial impression may not be the most important or desired objective. For example, if someone is simultaneously attempting to speak to an integrated voice assistant, it may be desirable to momentarily alter the spatial rendering in a manner that reduces the relative playback levels on speakers near certain microphones in order to increase the signal to noise ratio and/or the signal to echo ratio (SER) of microphone signals that include the detected speech. Some embodiments described herein may be implemented as modifications to existing flexible rendering methods, to allow such dynamic modification to spatial rendering, e.g., for the purpose of achieving one or more additional objectives.

Existing flexible rendering techniques include Center of Mass Amplitude Panning (CMAP) and Flexible Virtualization (FV). From a high level, both these techniques render a set of one or more audio signals, each with an associated desired perceived spatial position, for playback over a set of two or more speakers, where the relative activation of speakers of the set is a function of a model of perceived spatial position of said audio signals played back over the speakers and a proximity of the desired perceived spatial position of the audio signals to the positions of the speakers. The model ensures that the audio signal is heard by the listener near its intended spatial position, and the proximity term controls which speakers are used to achieve this spatial impression. In particular, the proximity term favors the activation of speakers that are near the desired perceived spatial position of the audio signal. For both CMAP and FV, this functional relationship is conveniently derived from a cost function written as the sum of two terms, one for the spatial aspect and one for proximity:

$$C(g) = C_{spatial}(g, \vec{o}, \{\vec{s}_i\}) + C_{proximity}(g, \vec{o}, \{\vec{s}_i\}) \quad (1)$$

Here, the set $\{\vec{s}_i\}$ denotes the positions of a set of M loudspeakers, $\vec{o}$ denotes the desired perceived spatial position of the audio signal, and g denotes an M dimensional vector of speaker activations. For CMAP, each activation in the vector represents a gain per speaker, while for FV each activation represents a filter (in this second case g can equivalently be considered a vector of complex values at a particular frequency and a different g is computed across a plurality of frequencies to form the filter). The optimal vector of activations is found by minimizing the cost function across activations:

$$g_{opt} = \min_g C(g, \vec{o}, \{\vec{s}_i\}) \quad (2a)$$

With certain definitions of the cost function, it is difficult to control the absolute level of the optimal activations resulting from the above minimization, though the relative level between the components of $g_{opt}$ is appropriate. To deal with this problem, a subsequent normalization of $g_{opt}$ may be performed so that the absolute level of the activations is controlled. For example, normalization of the vector to have unit length may be desirable, which is in line with a commonly used constant power panning rules:

$$\bar{g}_{opt} = \frac{g_{opt}}{\|g_{opt}\|} \quad (2b)$$

The exact behavior of the flexible rendering algorithm is dictated by the particular construction of the two terms of the cost function, $C_{spatial}$ and $C_{proximity}$. For CMAP, $C_{spatial}$ is derived from a model that places the perceived spatial position of an audio signal playing from a set of loudspeakers at the center of mass of those loudspeakers' positions weighted by their associated activating gains $g_i$ (elements of the vector g):

$$\vec{o} = \frac{\sum_{i=1}^{M} g_i \vec{s}_i}{\sum_{i=1}^{M} g_i} \quad (3)$$

Equation 3 is then manipulated into a spatial cost representing the squared error between the desired audio position and that produced by the activated loudspeakers:

$$C_{spatial}(g, \vec{o}, \{\vec{s}_i\}) = \|(\Sigma_{i=1}^{M} g_i) \vec{o} - \Sigma_{i=1}^{M} g_i \vec{s}_i\|^2 = \|\Sigma_{i=1}^{M} g_i (\vec{o} - \vec{s}_i)\|^2 \quad (4)$$

With FV, the spatial term of the cost function is defined differently. There the goal is to produce a binaural response b corresponding to the audio object position $\vec{o}$ at the left and right ears of the listener. Conceptually, b is a 2×1 vector of filters (one filter for each ear) but is more conveniently treated as a 2×1 vector of complex values at a particular frequency. Proceeding with this representation at a particular frequency, the desired binaural response may be retrieved from a set of HRTFs indexed by object position:

$$b = \text{HRTF}\{\vec{o}\} \quad (5)$$

At the same time, the 2×1 binaural response e produced at the listener's ears by the loudspeakers is modelled as a 2×M acoustic transmission matrix H multiplied with the M×1 vector g of complex speaker activation values:

$$e = Hg \quad (6)$$

The acoustic transmission matrix H is modelled based on the set of loudspeaker positions $\{\vec{s}_i\}$ with respect to the listener position. Finally, the spatial component of the cost function is defined as the squared error between the desired binaural response (Equation 5) and that produced by the loudspeakers (Equation 6):

$$C_{spatial}(g, \vec{o}, \{\vec{s}_i\}) = (b-Hg)^*(b-Hg) \quad (7)$$

Conveniently, the spatial term of the cost function for CMAP and FV defined in Equations 4 and 7 can both be rearranged into a matrix quadratic as a function of speaker activations g:

$$C_{spatial}(g, \vec{o}, \{\vec{s}_i\}) = g^*Ag + Bg + C \quad (8)$$

where A is an M×M square matrix, B is a 1×M vector, and C is a scalar. The matrix A is of rank 2, and therefore when M>2 there exist an infinite number of speaker activations g for which the spatial error term equals zero. Introducing the second term of the cost function, $C_{proximity}$, removes this indeterminacy and results in a particular solution with perceptually beneficial properties in comparison to the other possible solutions. For both CMAP and FV, $C_{proximity}$ is constructed such that activation of speakers whose position $\vec{s}_i$ is distant from the desired audio signal position $\vec{o}$ is penalized more than activation of speakers whose position is close to the desired position. This construction yields an optimal set of speaker activations that is sparse, where only speakers in close proximity to the desired audio signal's position are significantly activated, and practically results in a spatial reproduction of the audio signal that is perceptually more robust to listener movement around the set of speakers.

To this end, the second term of the cost function, $C_{proximity}$, may be defined as a distance-weighted sum of the absolute values squared of speaker activations. This is represented compactly in matrix form as:

$$C_{proximity}(g, \vec{o}, \{\vec{s}_i\}) = g^*Dg \quad (9a)$$

where D is a diagonal matrix of distance penalties between the desired audio position and each speaker:

$$D = \begin{bmatrix} d_1 & \cdots & 0 \\ \vdots & \ddots & \vdots \\ 0 & \cdots & d_M \end{bmatrix}, d_i = \text{distance}(\vec{o}, \vec{s}_i) \quad (9b)$$

The distance penalty function can take on many forms, but the following is a useful parameterization $$\text{distance}(\vec{o}, \vec{s}_i) = \alpha d_0^2 \left( \frac{\|\vec{o} - \vec{s}_i\|}{d_0} \right)^\beta \quad (9c)$$

where $\|\vec{o} - \vec{s}_i\|$ is the Euclidean distance between the desired audio position and speaker position and $\alpha$ and $\beta$ are tunable parameters. The parameter $\alpha$ indicates the global strength of the penalty; $d_0$ corresponds to the spatial extent of the distance penalty (loudspeakers at a distance around $d_0$ or further away will be penalized), and $\beta$ accounts for the abruptness of the onset of the penalty at distance $d_0$.

Combining the two terms of the cost function defined in Equations 8 and 9a yields the overall cost function $$C(g) = g^*Ag + Bg + C + g^*Dg = g^*(A+D)g + Bg + C \quad (10)$$

Setting the derivative of this cost function with respect to g equal to zero and solving for g yields the optimal speaker activation solution:

$$g_{opt} = \frac{1}{2}(A+D)^{-1}B \quad (11)$$

In general, the optimal solution in Equation 11 may yield speaker activations that are negative in value. For the CMAP construction of the flexible renderer, such negative activations may not be desirable, and thus Equation (11) may be minimized subject to all activations remaining positive.

Figure 15:
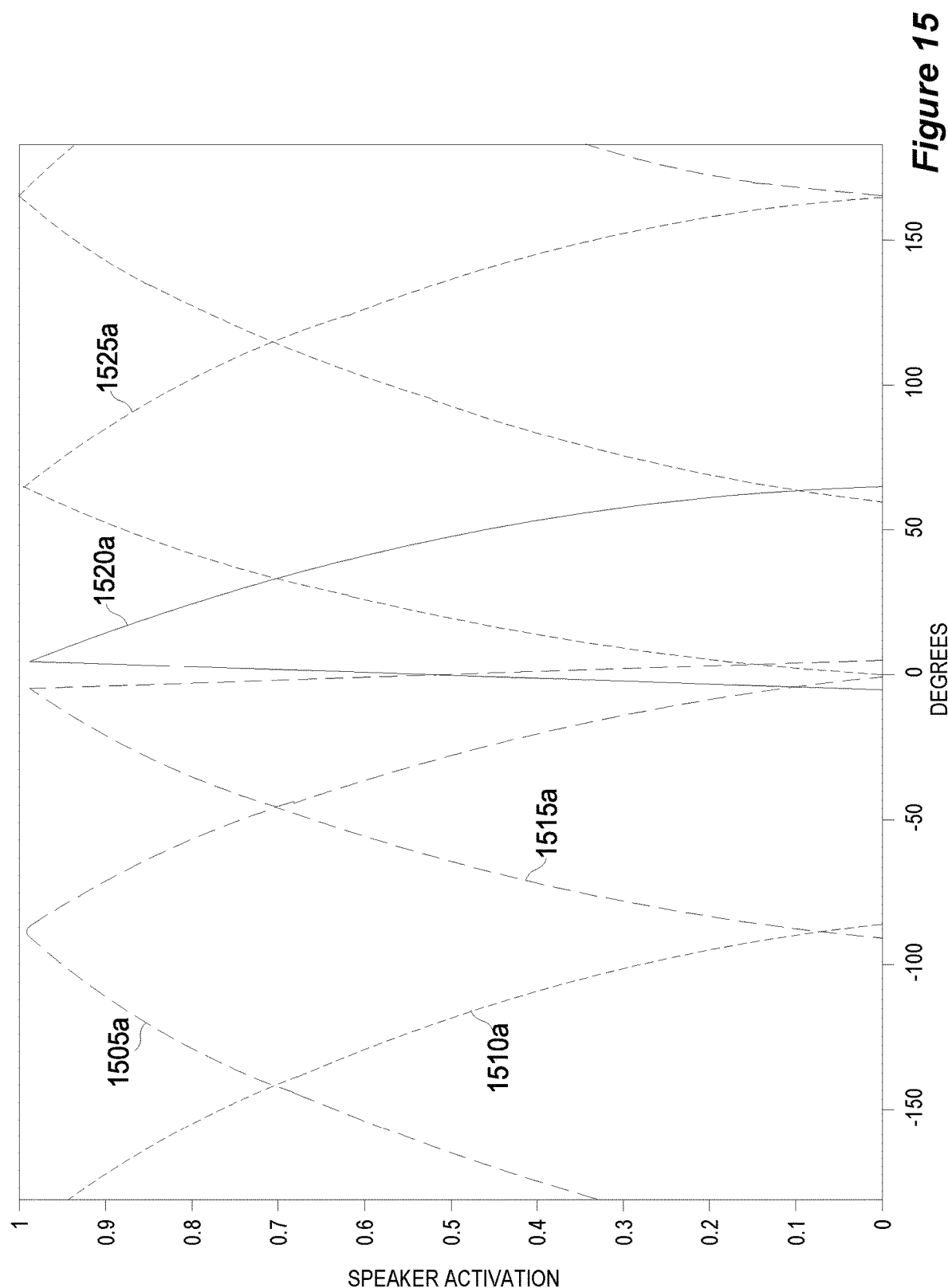
FIGS. 15 and 16 are diagrams which illustrate an example set of speaker activations and object rendering positions.
Figure 16:
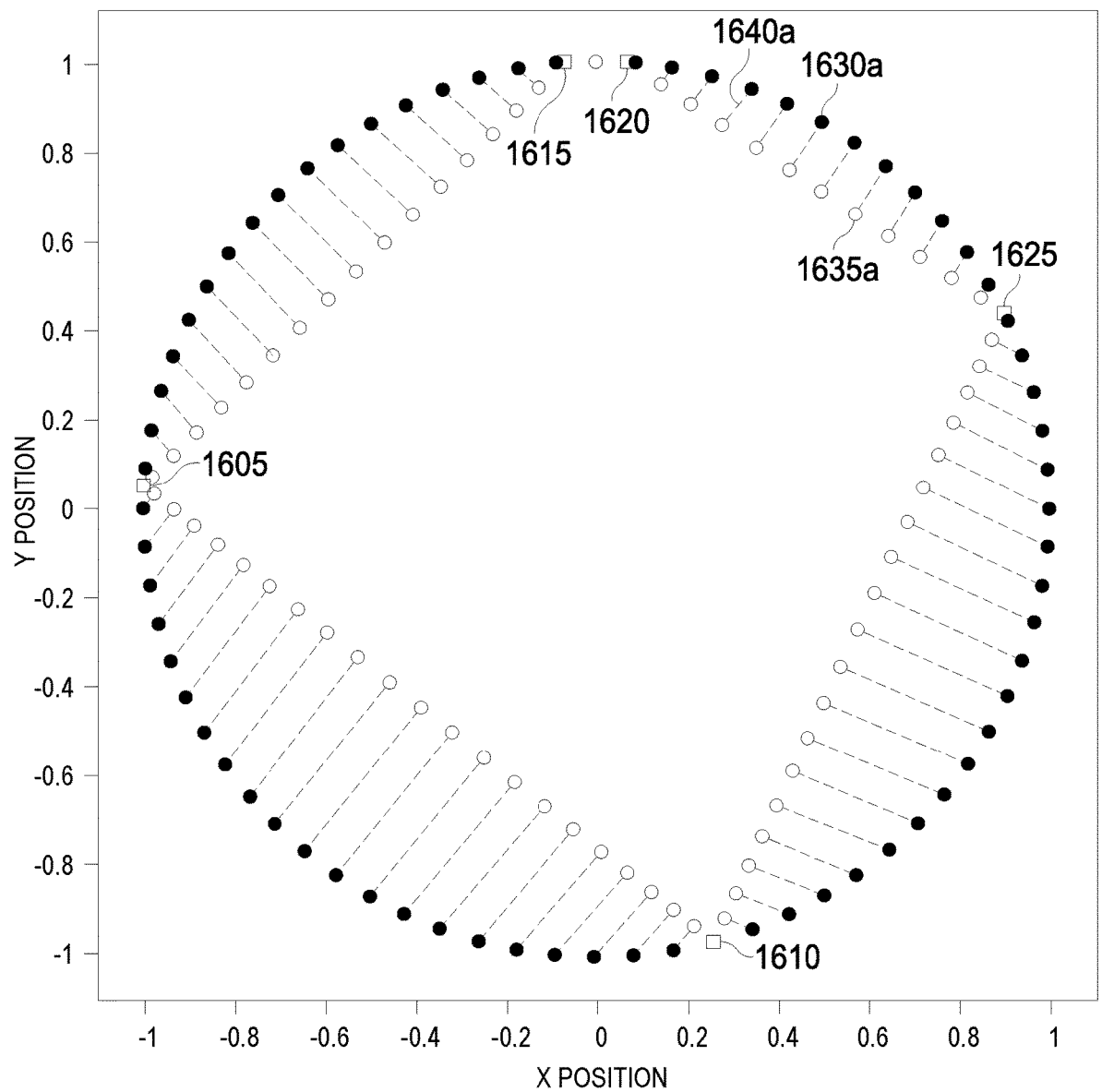

FIGS. 15 and 16 are diagrams which illustrate an example set of speaker activations and object rendering positions. In these examples, the speaker activations and object rendering positions correspond to speaker positions of 4, 64, 165, −87, and −4 degrees. FIG. shows the speaker activations 1505a, 1510a, 1515a, 1520a and 1525a, which comprise the optimal solution to Equation 11 for these particular speaker positions. FIG. 16 plots the individual speaker positions as dots 1605, 1610, 1615, 1620 and 1625, which correspond to speaker activations 1505a, 1510a, 1515a, 1520a and 1525a, respectively. FIG. 16 also shows ideal object positions (in other words, positions at which audio objects are to be rendered) for a multitude of possible object angles as dots 1630a and the corresponding actual rendering positions for those objects as dots 1635a, connected to the ideal object positions by dotted lines 1640a.

A class of embodiments involves methods for rendering audio for playback by at least one (e.g., all or some) of a plurality of coordinated (orchestrated) smart audio devices. For example, a set of smart audio devices present (in a system) in a user's home may be orchestrated to handle a variety of simultaneous use cases, including flexible rendering (in accordance with an embodiment) of audio for playback by all or some (i.e., by speaker(s) of all or some) of the smart audio devices. Many interactions with the system are contemplated which require dynamic modifications to the rendering. Such modifications may be, but are not necessarily, focused on spatial fidelity.

Some embodiments are methods for rendering of audio for playback by at least one (e.g., all or some) of the smart audio devices of a set of smart audio devices (or for playback by at least one (e.g., all or some) of the speakers of another set of speakers). The rendering may include minimization of a cost function, where the cost function includes at least one dynamic speaker activation term. Examples of such a dynamic speaker activation term include (but are not limited to):

Proximity of speakers to one or more listeners;
Proximity of speakers to an attracting or repelling force;
Audibility of the speakers with respect to some location (e.g., listener position, or baby room);
Capability of the speakers (e.g., frequency response and distortion);
Synchronization of the speakers with respect to other speakers;
Wakeword performance; and
Echo canceller performance.

The dynamic speaker activation term(s) may enable at least one of a variety of behaviors, including warping the spatial presentation of the audio away from a particular smart audio device so that its microphone can better hear a talker or so that a secondary audio stream may be better heard from speaker(s) of the smart audio device.

Some embodiments implement rendering for playback by speaker(s) of a plurality of smart audio devices that are coordinated (orchestrated). Other embodiments implement rendering for playback by speaker(s) of another set of speakers.

Pairing flexible rendering methods (implemented in accordance with some embodiments) with a set of wireless smart speakers (or other smart audio devices) can yield an extremely capable and easy-to-use spatial audio rendering system. In contemplating interactions with such a system it becomes evident that dynamic modifications to the spatial rendering may be desirable in order to optimize for other objectives that may arise during the system's use. To achieve this goal, a class of embodiments augment existing flexible rendering algorithms (in which speaker activation is a function of the previously disclosed spatial and proximity terms), with one or more additional dynamically configurable functions dependent on one or more properties of the audio signals being rendered, the set of speakers, and/or other external inputs. In accordance with some embodiments, the cost function of the existing flexible rendering given in Equation 1 is augmented with these one or more additional dependencies according to $$C(g) = C_{spatial}(g, \vec{o}, \{\vec{s}_i\}) + C_{proximity}(g, \vec{o}, \{\vec{s}_i\}) + \Sigma_j C_j(g, \{\{\hat{o}\}, \{\hat{s}_i\}, \{\hat{e}\}\}_j) \quad (12)$$

In Equation 12, the terms $C_j(g, \{\{\hat{o}\}, \{\hat{s}_i\}, \{\hat{e}\}\}_j)$ represent additional cost terms, with $\{\hat{o}\}$ representing a set of one or more properties of the audio signals (e.g., of an object-based audio program) being rendered, $\{\hat{s}_i\}$ representing a set of one or more properties of the speakers over which the audio is being rendered, and $\{\hat{e}\}$ representing one or more additional external inputs. Each term $C_j(g, \{\{\hat{o}\}, \{\hat{s}_i\}, \{\hat{e}\}\}_j)$ returns a cost as a function of activations g in relation to a combination of one or more properties of the audio signals, speakers, and/or external inputs, represented generically by the set $\{\{\hat{o}\}, \{\hat{s}_i\}, \{\hat{e}\}\}_j$. It should be appreciated that the set $\{\{\hat{o}\}, \{\hat{s}_i\}, \{\hat{e}\}\}_j$ contains at a minimum only one element from any of $\{\hat{o}\}$, $\{\hat{s}_i\}$, or $\{\hat{e}\}$.

Examples of $\{\hat{o}\}$ include but are not limited to:
Desired perceived spatial position of the audio signal;
Level (possible time-varying) of the audio signal; and/or
Spectrum (possibly time-varying) of the audio signal.

Examples of $\{\vec{s}_i\}$ include but are not limited to:
Locations of the loudspeakers in the listening space;
Frequency response of the loudspeakers;
Playback level limits of the loudspeakers;
Parameters of dynamics processing algorithms within the speakers, such as limiter gains;
A measurement or estimate of acoustic transmission from each speaker to the others;
A measure of echo canceller performance on the speakers; and/or
Relative synchronization of the speakers with respect to each other.

Examples of $\{\hat{e}\}$ include but are not limited to:
Locations of one or more listeners or talkers in the playback space;
A measurement or estimate of acoustic transmission from each loudspeaker to the listening location;
A measurement or estimate of the acoustic transmission from a talker to the set of loudspeakers;
Location of some other landmark in the playback space; and/or
A measurement or estimate of acoustic transmission from each speaker to some other landmark in the playback space;

With the new cost function defined in Equation 12, an optimal set of activations may be found through minimization with respect to g and possible post-normalization as previously specified in Equations 2a and 2b.

FIG. 17 is a flow diagram that outlines one example of a method that may be performed by an apparatus or system such as that shown in FIG. 2A. The blocks of method 1700, like other methods described herein, are not necessarily performed in the order indicated. Moreover, such methods may include more or fewer blocks than shown and/or described. The blocks of method 1700 may be performed by one or more devices, which may be (or may include) a control system such as the control system 210 shown in FIG. 2A.

In this implementation, block 1705 involves receiving, by a control system and via an interface system, audio data. In this example, the audio data includes one or more audio signals and associated spatial data. According to this implementation, the spatial data indicates an intended perceived spatial position corresponding to an audio signal. In some instances, the intended perceived spatial position may be explicit, e.g., as indicated by positional metadata such as Dolby Atmos positional metadata. In other instances, the intended perceived spatial position may be implicit, e.g., the intended perceived spatial position may be an assumed location associated with a channel according to Dolby 5.1, Dolby 7.1, or another channel-based audio format. In some examples, block 1705 involves a rendering module of a control system receiving, via an interface system, the audio data.

According to this example, block 1710 involves rendering, by the control system, the audio data for reproduction via a set of loudspeakers of an environment, to produce rendered audio signals. In this example, rendering each of the one or more audio signals included in the audio data involves determining relative activation of a set of loudspeakers in an environment by optimizing a cost function. According to this example, the cost is a function of a model of perceived spatial position of the audio signal when played back over the set of loudspeakers in the environment. In this example, the cost is also a function of a measure of proximity of the intended perceived spatial position of the audio signal to a position of each loudspeaker of the set of loudspeakers. In this implementation, the cost is also a function of one or more additional dynamically configurable functions. In this example, the dynamically configurable functions are based on one or more of the following: proximity of loudspeakers to one or more listeners; proximity of loudspeakers to an attracting force position, wherein an attracting force is a factor that favors relatively higher loudspeaker activation in closer proximity to the attracting force position; proximity of loudspeakers to a repelling force position, wherein a repelling force is a factor that favors relatively lower loudspeaker activation in closer proximity to the repelling force position; capabilities of each loudspeaker relative to other loudspeakers in the environment; synchronization of the loudspeakers with respect to other loudspeakers; wakeword performance; or echo canceller performance.

In this example, block 1715 involves providing, via the interface system, the rendered audio signals to at least some loudspeakers of the set of loudspeakers of the environment.

According to some examples, the model of perceived spatial position may produce a binaural response corresponding to an audio object position at the left and right ears of a listener. Alternatively, or additionally, the model of perceived spatial position may place the perceived spatial position of an audio signal playing from a set of loudspeakers at a center of mass of the set of loudspeakers' positions weighted by the loudspeaker's associated activating gains.

In some examples, the one or more additional dynamically configurable functions may be based, at least in part, on a level of the one or more audio signals. In some instances, the one or more additional dynamically configurable functions may be based, at least in part, on a spectrum of the one or more audio signals.

Some examples of the method 1700 involve receiving loudspeaker layout information. In some examples, the one or more additional dynamically configurable functions may be based, at least in part, on a location of each of the loudspeakers in the environment.

Some examples of the method 1700 involve receiving loudspeaker specification information. In some examples, the one or more additional dynamically configurable functions may be based, at least in part, on the capabilities of each loudspeaker, which may include one or more of frequency response, playback level limits or parameters of one or more loudspeaker dynamics processing algorithms.

According to some examples, the one or more additional dynamically configurable functions may be based, at least in part, on a measurement or estimate of acoustic transmission from each loudspeaker to the other loudspeakers. Alternatively, or additionally, the one or more additional dynamically configurable functions may be based, at least in part, on a listener or speaker location of one or more people in the environment. Alternatively, or additionally, the one or more additional dynamically configurable functions may be based, at least in part, on a measurement or estimate of acoustic transmission from each loudspeaker to the listener or speaker location. An estimate of acoustic transmission may, for example be based at least in part on walls, furniture or other objects that may reside between each loudspeaker and the listener or speaker location.

Alternatively, or additionally, the one or more additional dynamically configurable functions may be based, at least in part, on an object location of one or more non-loudspeaker objects or landmarks in the environment. In some such implementations, the one or more additional dynamically configurable functions may be based, at least in part, on a measurement or estimate of acoustic transmission from each loudspeaker to the object location or landmark location.

Numerous new and useful behaviors may be achieved by employing one or more appropriately defined additional cost terms to implement flexible rendering. All example behaviors listed below are cast in terms of penalizing certain loudspeakers under certain conditions deemed undesirable. The end result is that these loudspeakers are activated less in the spatial rendering of the set of audio signals. In many of these cases, one might contemplate simply turning down the undesirable loudspeakers independently of any modification to the spatial rendering, but such a strategy may significantly degrade the overall balance of the audio content. Certain components of the mix may become completely inaudible, for example. With the disclosed embodiments, on the other hand, integration of these penalizations into the core optimization of the rendering allows the rendering to adapt and perform the best possible spatial rendering with the remaining less-penalized speakers. This is a much more elegant, adaptable, and effective solution.

Example use cases include, but are not limited to:
Providing a more balanced spatial presentation around the listening area
  It has been found that spatial audio is best presented across loudspeakers that are roughly the same distance from the intended listening area. A cost may be constructed such that loudspeakers that are significantly closer or further away than the mean distance of loudspeakers to the listening area are penalized, thus reducing their activation;
Moving audio away from or towards a listener or talker
  If a user of the system is attempting to speak to a smart voice assistant of or associated with the system, it may be beneficial to create a cost which penalizes loudspeakers closer to the talker. This way, these loudspeakers are activated less, allowing their associated microphones to better hear the talker;
  To provide a more intimate experience for a single listener that minimizes playback levels for others in the listening space, speakers far from the listener's location may be penalized heavily so that only speakers closest to the listener are activated most significantly;
Moving audio away from or towards a landmark, zone or area
  Certain locations in the vicinity of the listening space may be considered sensitive, such as a baby's room, a baby's bed, an office, a reading area, a study area, etc. In such a case, a cost may be constructed the penalizes the use of speakers close to this location, zone or area;
  Alternatively, for the same case above (or similar cases), the system of speakers may have generated measurements of acoustic transmission from each speaker into the baby's room, particularly if one of the speakers (with an attached or associated microphone) resides within the baby's room itself. In this case, rather than using physical proximity of the speakers to the baby's room, a cost may be constructed that penalizes the use of speakers whose measured acoustic transmission into the room is high; and/or
Optimal use of the speakers' capabilities
  The capabilities of different loudspeakers can vary significantly. For example, one popular smart speaker contains only a single 1.6" full range driver with limited low frequency capability. On the other hand, another smart speaker contains a much more capable 3" woofer. These capabilities are generally reflected in the frequency response of a speaker, and as such, the set of responses associated with the speakers may be utilized in a cost term. At a particular frequency, speakers that are less capable relative to the others, as measured by their frequency response, may be penalized and therefore activated to a lesser degree. In some implementations, such frequency response values may be stored with a smart loudspeaker and then reported to the computational unit responsible for optimizing the flexible rendering;
  Many speakers contain more than one driver, each responsible for playing a different frequency range. For example, one popular smart speaker is a two-way design containing a woofer for lower frequencies and a tweeter for higher frequencies. Typically, such a speaker contains a crossover circuit to divide the full-range playback audio signal into the appropriate frequency ranges and send to the respective drivers. Alternatively, such a speaker may provide the flexible renderer playback access to each individual driver as well as information about the capabilities of each individual driver, such as frequency response. By applying a cost term such as that described just above, in some examples the flexible renderer may automatically build a crossover between the two drivers based on their relative capabilities at different frequencies;

The above-described example uses of frequency response focus on the inherent capabilities of the speakers but may not accurately reflect the capability of the speakers as placed in the listening environment. In certain cases, the frequencies responses of the speakers as measured in the intended listening position may be available through some calibration procedure. Such measurements may be used instead of precomputed responses to better optimize use of the speakers. For example, a certain speaker may be inherently very capable at a particular frequency, but because of its placement (behind a wall or a piece of furniture for example) might produce a very limited response at the intended listening position. A measurement that captures this response and is fed into an appropriate cost term can prevent significant activation of such a speaker;

Frequency response is only one aspect of a loudspeaker's playback capabilities. Many smaller loudspeakers start to distort and then hit their excursion limit as playback level increases, particularly for lower frequencies. To reduce such distortion many loudspeakers implement dynamics processing which constrains the playback level below some limit thresholds that may be variable across frequency. In cases where a speaker is near or at these thresholds, while others participating in flexible rendering are not, it makes sense to reduce signal level in the limiting speaker and divert this energy to other less taxed speakers. Such behavior can be automatically achieved in accordance with some embodiments by properly configuring an associated cost term. Such a cost term may involve one or more of the following:

Monitoring a global playback volume in relation to the limit thresholds of the loudspeakers. For example, a loudspeaker for which the volume level is closer to its limit threshold may be penalized more;

Monitoring dynamic signals levels, possibly varying across frequency, in relationship to loudspeaker limit thresholds, also possibly varying across frequency. For example, a loudspeaker for which the monitored signal level is closer to its limit thresholds may be penalized more;

Monitoring parameters of the loudspeakers' dynamics processing directly, such as limiting gains. In some such examples, a loudspeaker for which the parameters indicate more limiting may be penalized more; and/or Monitoring the actual instantaneous voltage, current, and power being delivered by an amplifier to a loudspeaker to determine if the loudspeaker is operating in a linear range. For example, a loudspeaker which is operating less linearly may be penalized more;

Smart speakers with integrated microphones and an interactive voice assistant typically employ some type of echo cancellation to reduce the level of audio signal playing out of the speaker as picked up by the recording microphone. The greater this reduction, the better chance the speaker has of hearing and understanding a talker in the space. If the residual of the echo canceller is consistently high, this may be an indication that the speaker is being driven into a non-linear region where prediction of the echo path becomes challenging. In such a case it may make sense to divert signal energy away from the speaker, and as such, a cost term taking into account echo canceller performance may be beneficial. Such a cost term may assign a high cost to a speaker for which its associated echo canceller is performing poorly;

In order to achieve predictable imaging when rendering spatial audio over multiple loudspeakers, it is generally required that playback over the set of loudspeakers be reasonably synchronized across time. For wired loudspeakers this is a given, but with a multitude of wireless loudspeakers synchronization may be challenging and the end-result variable. In such a case it may be possible for each loudspeaker to report its relative degree of synchronization with a target, and this degree may then feed into a synchronization cost term. In some such examples, loudspeakers with a lower degree of synchronization may be penalized more and therefore excluded from rendering. Additionally, tight synchronization may not be required for certain types of audio signals, for example components of the audio mix intended to be diffuse or non-directional. In some implementations, components may be tagged as such with metadata and a synchronization cost term may be modified such that the penalization is reduced.

We next describe additional examples of embodiments. Similar to the proximity cost defined in Equations 9a and 9b, it may also be convenient to express each of the new cost function terms $C_j(g,\{\{\hat{o}\},\{\hat{s}_i\},\{\hat{e}\}\}_j)$ as a weighted sum of the absolute values squared of speaker activations, e.g. as follows:

$$C_j(g,\{\{\hat{o}\},\{\hat{s}_i\},\{\hat{e}\}\}_j)=g^*W_j(\{\{\hat{o}\},\{\hat{s}_i\},\{\hat{e}\}\}_j)g, \quad (13a)$$

where $W_j$ is a diagonal matrix of weights $w_{ij}=w_{ij}(\{\{\hat{o}\},\{\hat{s}_i\},\{\hat{e}\}\}_j)$ describing the cost associated with activating speaker i for the term j:

$$W_j = \begin{bmatrix} w_{1j} & \cdots & 0 \\ \vdots & \ddots & \vdots \\ 0 & \cdots & w_{Mj} \end{bmatrix} \quad (13b)$$

Combining Equations 13a and b with the matrix quadratic version of the CMAP and FV cost functions given in Equation 10 yields a potentially beneficial implementation of the general expanded cost function (of some embodiments) given in Equation 12:

$$C(g)=g^*Ag+Bg+C+g^*Dg+\Sigma_j g^*W_j g=g^*(A+D+\Sigma_j)g+Bg+C \quad (14)$$

With this definition of the new cost function terms, the overall cost function remains a matrix quadratic, and the optimal set of activations $g_{opt}$ can be found through differentiation of Equation 14 to yield $$g_{opt} = \frac{1}{2}(A + D + \Sigma_j W_j)^{-1}B \quad (15)$$

It is useful to consider each one of the weight terms $w_{ij}$ as functions of a given continuous penalty value $p_{ij} = p_{ij}(\{\vec{o}\}, \{\vec{s}_i\}, \{\vec{e}\}\}_j)$ for each one of the loudspeakers. In one example embodiment, this penalty value is the distance from the object (to be rendered) to the loudspeaker considered. In another example embodiment, this penalty value represents the inability of the given loudspeaker to reproduce some frequencies. Based on this penalty value, the weight terms $w_{ij}$ can be parametrized as:

$$w_{ij} = \alpha_j f_j\left(\frac{p_{ij}}{\tau_j}\right) \quad (16)$$

where $\alpha_j$ represents a pre-factor (which takes into account the global intensity of the weight term), where $\tau_j$ represents a penalty threshold (around or beyond which the weight term becomes significant), and where $f_j(x)$ represents a monotonically increasing function. For example, with $f_j(x) = x^{\beta_j}$ the weight term has the form:

$$w_{ij} = \alpha_j \left(\frac{p_{ij}}{\tau_j}\right)^{\beta_j} \quad (17)$$

where $\alpha_j$, $\beta_j$, $\tau_j$ are tunable parameters which respectively indicate the global strength of the penalty, the abruptness of the onset of the penalty and the extent of the penalty. Care should be taken in setting these tunable values so that the relative effect of the cost term $C_j$ with respect any other additional cost terms as well as $C_{spatial}$ and $C_{proximity}$ is appropriate for achieving the desired outcome. For example, as a rule of thumb, if one desires a particular penalty to clearly dominate the others then setting its intensity $\alpha_j$ roughly ten times larger than the next largest penalty intensity may be appropriate.

In case all loudspeakers are penalized, it is often convenient to subtract the minimum penalty from all weight terms in post-processing so that at least one of the speakers is not penalized:

$$w_{ij} \rightarrow w_{ij}' = w_{ij} - \min_i(w_{ij}) \quad (18)$$

As stated above, there are many possible use cases that can be realized using the new cost function terms described herein (and similar new cost function terms employed in accordance with other embodiments). Next, we describe more concrete details with three examples: moving audio towards a listener or talker, moving audio away from a listener or talker, and moving audio away from a landmark.

In the first example, what will be referred to herein as an "attracting force" is used to pull audio towards a position, which in some examples may be the position of a listener or a talker a landmark position, a furniture position, etc. The position may be referred to herein as an "attracting force position" or an "attractor location." As used herein an "attracting force" is a factor that favors relatively higher loudspeaker activation in closer proximity to an attracting force position. According to this example, the weight $w_{ij}$ takes the form of equation 17 with the continuous penalty value $p_{ij}$ given by the distance of the ith speaker from a fixed attractor location $\vec{l}_j$ and the threshold value $\tau_j$ given by the maximum of these distances across all speakers:

$$p_{ij} = \|\vec{l}_j - \vec{s}_i\|, \text{ and} \quad (19a)$$

$$\tau_j = \max_i \|\vec{l}_j - \vec{s}_i\| \quad (19b)$$

Figure 18:
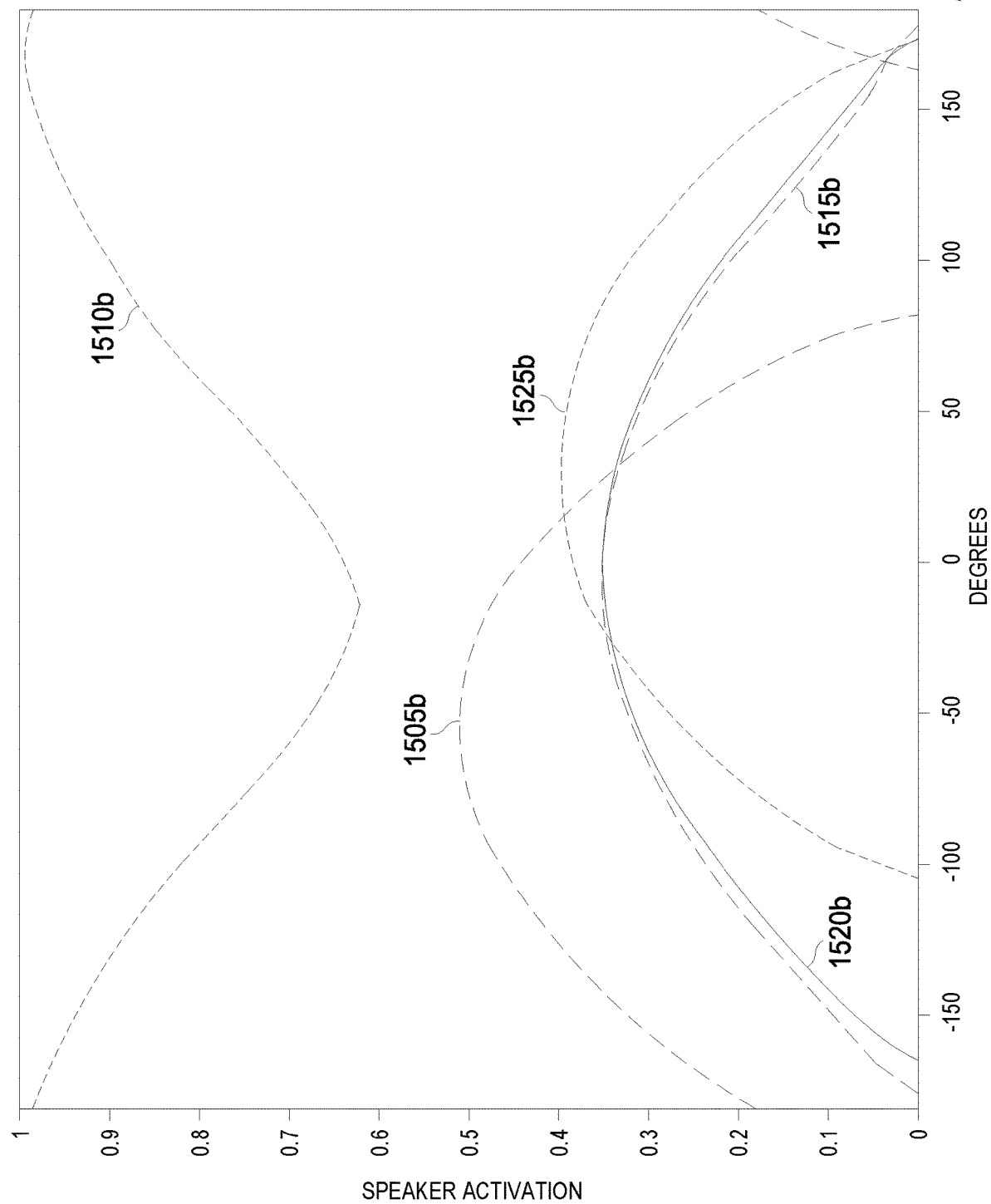
FIG. 18 is a graph of speaker activations in an example embodiment.
Figure 19:
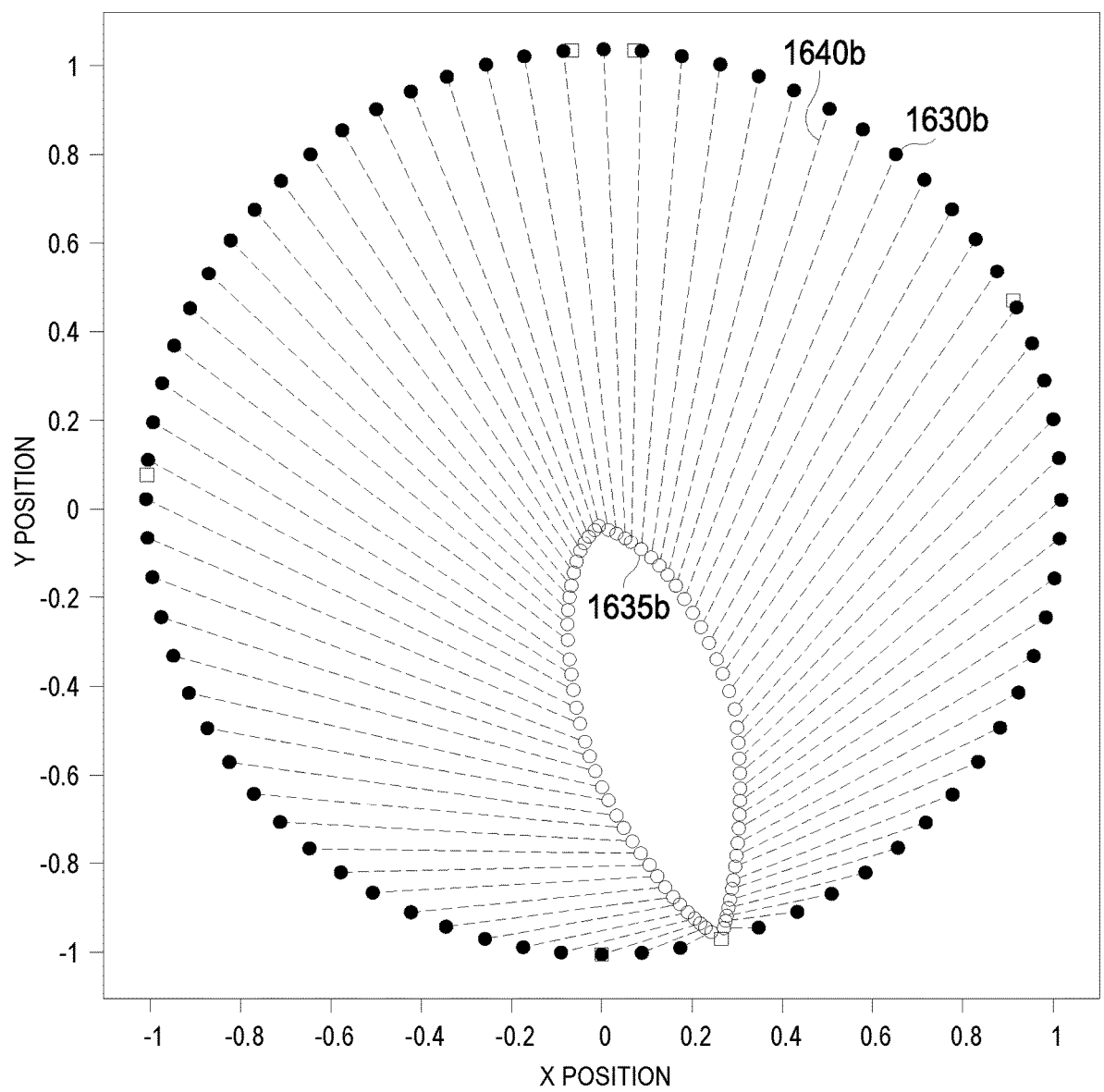
FIG. 19 is a graph of object rendering positions in an example embodiment.

To illustrate the use case of "pulling" audio towards a listener or talker, we specifically set $\alpha_j = 20$, $\beta_j = 3$, and $\vec{l}_j$ to a vector corresponding to a listener/talker position of 180 degrees (bottom, center of the plot). These values of $\alpha_j$, $\beta_j$, and $\vec{l}_j$ are merely examples. In some implementations, $\alpha_j$ may be in the range of 1 to 100 and $\beta_j$ may be in the range of 1 to 25. FIG. 18 is a graph of speaker activations in an example embodiment. In this example, FIG. 18 shows the speaker activations 1505*b*, 1510*b*, 1515*b*, 1520*b* and 1525*b*, which comprise the optimal solution to the cost function for the same speaker positions from FIGS. 15 and 16, with the addition of the attracting force represented by $w_{ij}$. FIG. 19 is a graph of object rendering positions in an example embodiment. In this example, FIG. 19 shows the corresponding ideal object positions 1630*b* for a multitude of possible object angles and the corresponding actual rendering positions 1635*b* for those objects, connected to the ideal object positions 1630*b* by dotted lines 1640*b*. The skewed orientation of the actual rendering positions 1635*b* towards the fixed position $\vec{l}_j$ illustrates the impact of the attractor weightings on the optimal solution to the cost function.

In the second and third examples, a "repelling force" is used to "push" audio away from a position, which may be a person's position (e.g., a listener position, a talker position, etc.) or another position, such as a landmark position, a furniture position, etc. In some examples, a repelling force may be used to push audio away from an area or zone of a listening environment, such as an office area, a reading area, a bed or bedroom area (e.g., a baby's bed or bedroom), etc. According to some such examples, a particular position may be used as representative of a zone or area. For example, a position that represents a baby's bed may be an estimated position of the baby's head, an estimated sound source location corresponding to the baby, etc. The position may be referred to herein as a "repelling force position" or a "repelling location." As used herein an "repelling force" is a factor that favors relatively lower loudspeaker activation in closer proximity to the repelling force position. According to this example, we define $p_{ij}$ and $\tau_j$ with respect to a fixed repelling location $\vec{l}_j$ similarly to the attracting force in Equation 19:

$$p_{ij} = \max_i \|\vec{l}_j - \vec{s}_i\| - \|\vec{l}_j - \vec{s}_i\|, \text{ and} \quad (19c)$$

$$\tau_j = \max_i \|\vec{l}_j - \vec{s}_i\| \quad (19d)$$

Figure 20:
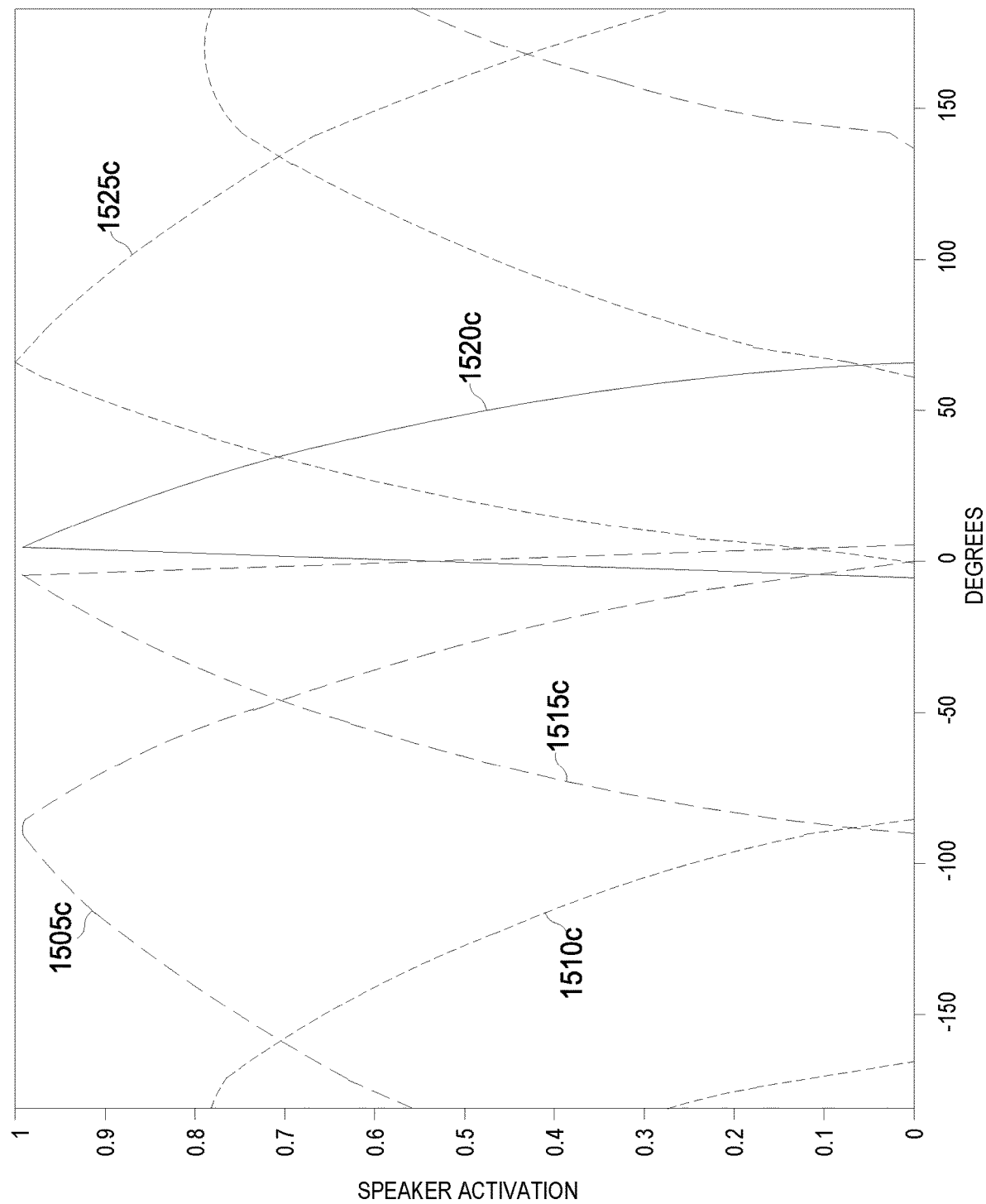
FIG. 20 is a graph of speaker activations in an example embodiment.
Figure 21:
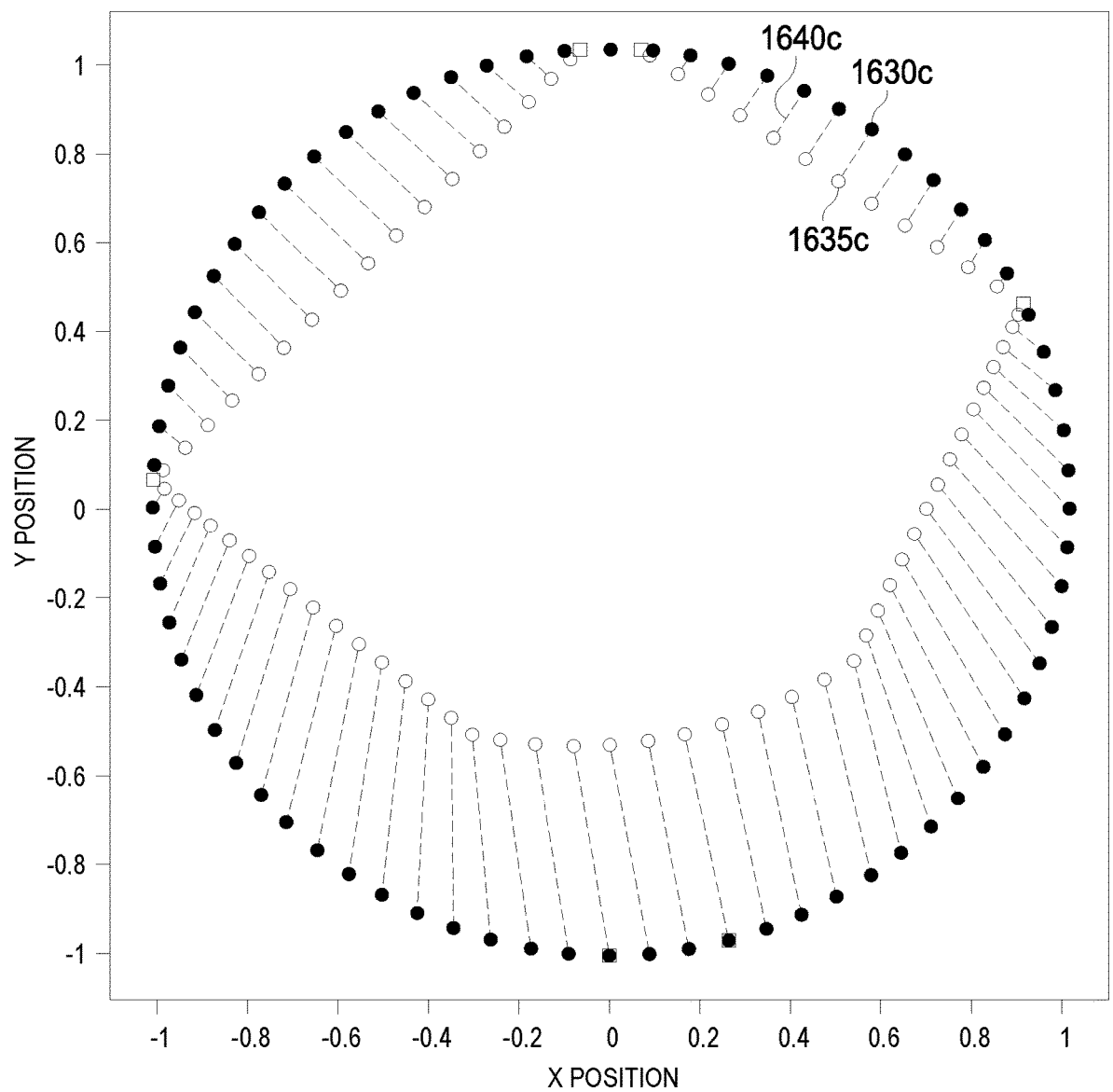
FIG. 21 is a graph of object rendering positions in an example embodiment.

To illustrate the use case of pushing audio away from a listener or talker, in one example we may specifically set $\alpha_j = 5$, $\beta_j = 2$, and $\vec{l}_j$ to a vector corresponding to a listener/talker position of 180 degrees (at the bottom, center of the plot). These values of $\alpha_j$, $\beta_j$, and $\vec{l}_j$ are merely examples. As noted above, in some examples $\alpha_j$ may be in the range of 1 to 100 and $\beta_j$ may be in the range of 1 to 25. FIG. 20 is a graph of speaker activations in an example embodiment. According to this example, FIG. 20 shows the speaker activations 1505*c*, 1510*c*, 1515*c*, 1520*c* and 1525*c*, which comprise the optimal solution to the cost function for the same speaker positions as previous figures, with the addition of the repelling force represented by $w_{ij}$. FIG. 21 is a graph of object rendering positions in an example embodiment. In this example, FIG. 21 shows the ideal object positions 1630*c* for a multitude of possible object angles and the corresponding actual rendering positions 1635*c* for those objects, connected to the ideal object positions 1630*c* by dotted lines 1640*c*. The skewed orientation of the actual rendering positions 1635c away from the fixed position $\vec{1}_j$ illustrates the impact of the repeller weightings on the optimal solution to the cost function.

Figure 22:
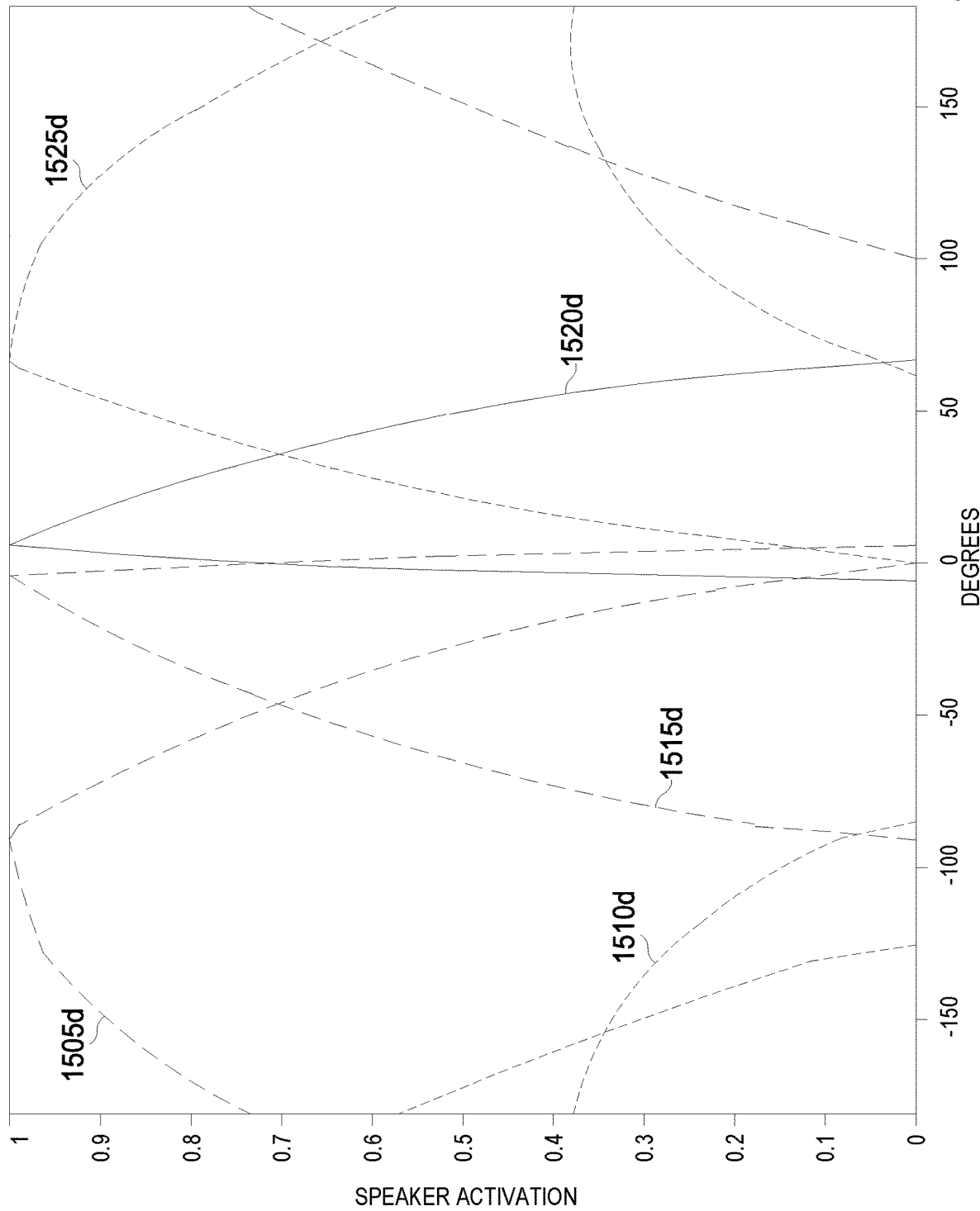
FIG. 22 is a graph of speaker activations in an example embodiment.
Figure 23:
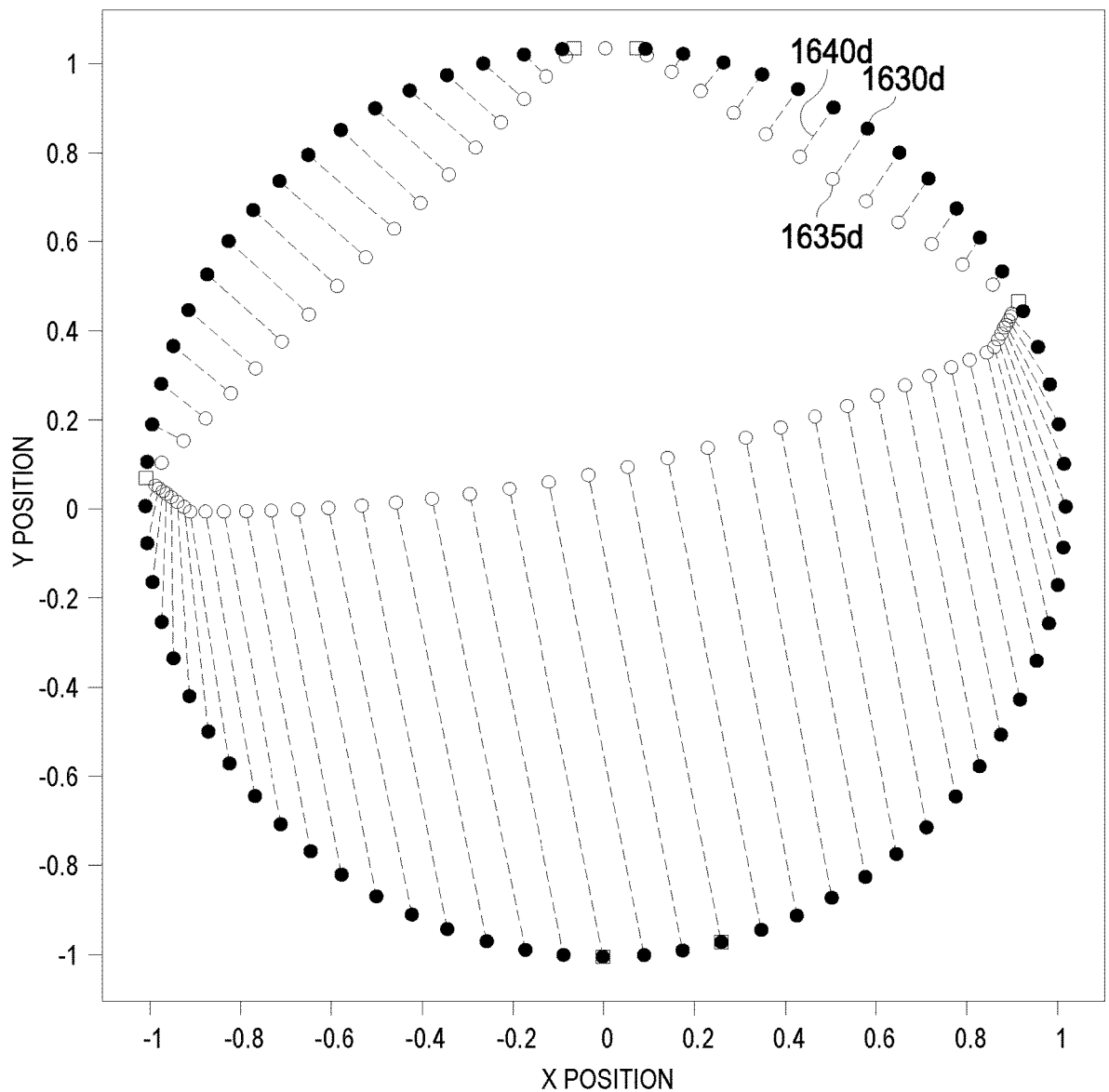
FIG. 23 is a graph of object rendering positions in an example embodiment.

The third example use case is "pushing" audio away from a landmark which is acoustically sensitive, such as a door to a sleeping baby's room. Similarly to the last example, we set $\vec{1}_j$ to a vector corresponding to a door position of 180 degrees (bottom, center of the plot). To achieve a stronger repelling force and skew the soundfield entirely into the front part of the primary listening space, we set $\alpha_j$=20, $\beta_j$=5. FIG. 22 is a graph of speaker activations in an example embodiment. Again, in this example FIG. 22 shows the speaker activations 1505d, 1510d, 1515d, 1520d and 1525d, which comprise the optimal solution to the same set of speaker positions with the addition of the stronger repelling force. FIG. 23 is a graph of object rendering positions in an example embodiment. And again, in this example FIG. 23 shows the ideal object positions 1630d for a multitude of possible object angles and the corresponding actual rendering positions 1635d for those objects, connected to the ideal object positions 1630d by dotted lines 1640d. The skewed orientation of the actual rendering positions 1635d illustrates the impact of the stronger repeller weightings on the optimal solution to the cost function.

In a further example of the method 250 of FIG. 2B, the use case is responding to a selection of two or more audio devices in the audio environment (block 265) and applying a "repelling" force to the audio (block 275). According to a previous example, the selection of two or more audio devices could in some embodiments take the form of values f_n, unitless parameters that control the degree to which audio processing changes occur. Many combinations are possible. In one simple example, the weights corresponding to the repelling force may be selected directly as $w_{ij}=\alpha_j f_i^{\beta_j}$, penalizing devices as selected by the "decision" aspect.

Further to previous examples of determining weights, in some implementations, weights may be determined as follows:

$$w_{ij} = \alpha_j \left( f_j + \left( \frac{p_{ij}}{\tau_j} \right) \right)^{\beta_j}$$

In the foregoing equation, $\alpha_j$, $\beta_j$, $\tau_j$ represent tunable parameters which respectively indicate the global strength of the penalty, the abruptness of the onset of the penalty and the extent of the penalty, as described above with reference to Equation 17. Accordingly, the foregoing equation may be understood as the combination of multiple penalization terms, arising from multiple simultaneous use cases. For instance, audio could be "pushed away" from a sensitive landmark using the terms $p_{ij}$ and $\tau_j$ as described in an earlier example, whilst still also being "pushed away" from a microphone location where it is desirable for the SER to be improved using the term $f_i$ as determined by the decision aspect.

Previous examples also introduced s_n, expressed directly in speech to echo ratio improvement decibels. Some embodiments may involve selecting values of $\alpha$ and $\beta$ (the strength of the penalty, and the abruptness of the onset of the penalty respectively) in some part based on the value of s_n in dB, and the previously indicated formulae for $w_{ij}$ could use $\alpha_{ij}$ and $\beta_{ij}$ in place of $\alpha_j$ and $\beta_j$, respectively. For instance, a value of s_i=−20 dB would correspond to a high cost of activating the $i^{th}$ speaker. In some such embodiments, $\alpha_{ij}$ may be set to a number many times higher than typical values of the other terms in the cost function $C_{spatial}$ and $C_{proximity}$. For instance, a new value of alpha could be determined by $$\alpha'_{ij} = \alpha_j * 10^{-\frac{s_i}{20}},$$

which for a value of s_i=−20 dB, would result in $\alpha_{ij}$ taking on a value 10 times larger than it usually would in the cost function. Modifying $\beta_{ij}$ to be set in the range $0.5<\beta_{ij}<1.0$ could in some instances be a suitable modification based on large negative values of s_i, "pushing" audio away from an even larger region around the $i^{th}$ speaker. For instance, the values of s_i could be mapped to $\beta_{ij}$ according to:

$$\beta_{ij} = \max\left(0.5, \min\left(1.0, 1.5 + \frac{s_i}{30.0}\right)\right)$$

In this example, for s_i=−20.0 dB, $\beta_{ij}$ would be 0.8333.

Aspects of example embodiments include the following enumerated example embodiments ("EEEs"):

EEE1. A method (or system) for improving the signal to echo ratio for detection of voice commands from a user whereby
  a. There is a plurality of devices in use for creating output audio program material
  b. There is a known set of distances or ordered relationship for the devices from the listener
  c. The system selectively lowers the volume of the device with the lowest distance from the user EEE2 The method or system of EEE1 wherein the detection of a signal includes that from any noise emitting object or desired point of audio surveillance that has a known relationship of distance to the set of devices.

EEE3. The method or system of EEE1 or EEE2 with the ordering of devices includes a consideration of the distance and the signal to echo ration of the device for a nominal source distance.

EEE4. The method or system of any one of EEE1-EEE3, with the ordering considering the generalized proximity of the device to the user, and the approximate reciprocity of this to estimate most effective signal to echo ratio improvement and ordering the devices in this sense Aspects of some disclosed implementations include a system or device configured (e.g., programmed) to perform one or more disclosed methods, and a tangible computer readable medium (e.g., a disc) which stores code for implementing one or more disclosed methods or steps thereof. For example, the system can be or include a programmable general purpose processor, digital signal processor, or microprocessor, programmed with software or firmware and/or otherwise configured to perform any of a variety of operations on data, including one or more disclosed methods or steps thereof. Such a general purpose processor may be or include a computer system including an input device, a memory, and a processing subsystem that is programmed (and/or otherwise configured) to perform one or more disclosed methods (or steps thereof) in response to data asserted thereto.

Some disclosed embodiments are implemented as a configurable (e.g., programmable) digital signal processor (DSP) that is configured (e.g., programmed and otherwise configured) to perform required processing on audio signal(s), including performance of one or more disclosed methods. Alternatively, some embodiments (or elements thereof) may be implemented as a general purpose processor (e.g., a personal computer (PC) or other computer system or microprocessor, which may include an input device and a memory) which is programmed with software or firmware and/or otherwise configured to perform any of a variety of operations including one or more disclosed methods or steps thereof. Alternatively, elements of some disclosed embodiments are implemented as a general purpose processor or DSP configured (e.g., programmed) to perform one or more disclosed methods or steps thereof, and the system also includes other elements (e.g., one or more loudspeakers and/or one or more microphones). A general purpose processor configured to perform one or more disclosed methods or steps thereof would typically be coupled to an input device (e.g., a mouse and/or a keyboard), a memory, and a display device.

Another aspect of some disclosed implementations is a computer readable medium (for example, a disc or other tangible storage medium) which stores code for performing (e.g., coder executable to perform) any embodiment of one or more disclosed methods or steps thereof.

While specific embodiments and applications have been described herein, it will be apparent to those of ordinary skill in the art that many variations on the embodiments and applications described herein are possible without departing from the scope of the material described and claimed herein. It should be understood that while certain implementations have been shown and described, the present disclosure is not to be limited to the specific embodiments described and shown or the specific methods described.

The invention claimed is:

1. An audio session management method, comprising:
receiving output signals from each microphone of a plurality of microphones in an audio environment, each microphone of the plurality of microphones residing in a microphone location of the audio environment, the output signals including signals corresponding to a current utterance of a person;
determining, based on the output signals, one or more aspects of context information relating to the person, the context information including at least one of an estimated current location of the person or an estimated current proximity of the person to one or more microphone locations;
determining a closest loudspeaker-equipped audio device that is closest to the microphone location closest to the estimated current location of the person;
selecting two or more audio devices of the audio environment based, at least in part, on the one or more aspects of the context information, the two or more audio devices each including at least one loudspeaker and wherein the two or more audio devices include the closest loudspeaker-equipped audio device;
determining one or more types of audio processing changes to apply to audio data being rendered to loudspeaker feed signals for the two or more audio devices, the audio processing changes having an effect of increasing a speech to echo ratio at the microphone closest to the estimated current location of the person, wherein the echo comprises at least some of audio outputted by the two or more audio devices, and wherein at least one of the audio processing changes for the closest audio device is different from an audio processing change for a second audio device of said at least two audio devices, and wherein the one or more types of audio processing changes cause a reduction in loudspeaker reproduction level for the closest audio device; and
causing the one or more types of audio processing changes to be applied.

2. The method of claim 1, wherein the one or more types of audio processing changes involve spectral modification.

3. The method of claim 2, wherein the spectral modification involves reducing a level of audio data in a frequency band between 500 Hz and 3 KHz.

4. The method of any one of the claim 1, wherein the one or more types of audio processing changes cause a reduction in loudspeaker reproduction level for the loudspeakers of the two or more audio devices.

5. The method of claim 1, wherein selecting two or more audio devices of the audio environment comprises selecting N loudspeaker-equipped audio devices of the audio environment, N being an integer greater than 2.

6. The method of claim 1, wherein selecting the two or more audio devices of the audio environment is based, at least in part, on an estimated current location of the person relative to at least one of a microphone location or a loudspeaker-equipped audio device location.

7. The method of claim 1, wherein the one or more types of audio processing changes involve changing a rendering process to warp a rendering of audio signals away from the estimated current location of the person.

8. The method of claim 1, wherein the one or more types of audio processing changes involve inserting at least one gap into at least one selected frequency band of an audio playback signal.

9. The method of claim 1, wherein the one or more types of audio processing changes involve dynamic range compression.

10. The method of claim 1, wherein selecting the two or more audio devices is based, at least in part, on a signal-to-echo ratio estimation for one or more microphone locations.

11. The method of claim 10, wherein selecting the two or more audio devices is based, at least in part, on determining whether the signal-to-echo ratio estimation is less than or equal to a signal-to-echo ratio threshold.

12. The method of claim 10, wherein determining the one or more types of audio processing changes is based on an optimization of a cost function that is based, at least in part, on the signal-to-echo ratio estimation.

13. The method of claim 12, wherein the cost function is based, at least in part, on rendering performance.

14. The method of claim 1, wherein selecting the two or more audio devices is based, at least in part, on a proximity estimation.

15. The method of claim 1, further comprising:
determining multiple current acoustic features from the output signals of each microphone;
applying a classifier to the multiple current acoustic features, wherein applying the classifier involves applying a model trained on previously-determined acoustic features derived from a plurality of previous utterances made by the person in a plurality of user zones in the environment; and
wherein determining one or more aspects of context information relating to the person involves determining, based at least in part on output from the classifier, an estimate of a user zone in which the person is currently located.

16. The method of claim 15, wherein the estimate of the user zone is determined without reference to geometric locations of the plurality of microphones.

17. The method of claim 15, wherein the current utterance and the previous utterances comprise wakeword utterances.

18. The method of claim 1, further comprising selecting at least one microphone according to the one or more aspects of the context information.

19. The method of claim 1, wherein the one or more microphones reside in multiple audio devices of the audio environment.

20. The method of claim 1, wherein the one or more microphones reside in a single audio device of the audio environment.

21. The method of claim 1, wherein at least one of the one or more microphone locations corresponds to multiple microphones of a single audio device.

22. An apparatus configured to perform the method of claim 1.

23. A system configured to perform the method of claim 1.

24. One or more non-transitory media having software stored thereon, the software including instructions for controlling one or more devices to perform the method of claim 1.

* * * * *

UNITED STATES PATENT AND TRADEMARK OFFICE
CERTIFICATE OF CORRECTION

PATENT NO. : 12,003,673 B2
APPLICATION NO. : 17/628732
DATED : June 4, 2024
INVENTOR(S) : Glenn N. Dickins et al.

It is certified that error appears in the above-identified patent and that said Letters Patent is hereby corrected as shown below:

In the Claims

Column 64, Line 11, in Claim 4, after "of", delete "any one of the"

Signed and Sealed this
Nineteenth Day of November, 2024

Katherine Kelly Vidal
*Director of the United States Patent and Trademark Office*